US012103296B2

(12) United States Patent
Itabashi et al.

(10) Patent No.: US 12,103,296 B2
(45) Date of Patent: Oct. 1, 2024

(54) LAYER TRANSFER FILM CARTRIDGE AND LAYER TRANSFER DEVICE

(71) Applicant: BROTHER KOGYO KABUSHIKI KAISHA, Nagoya (JP)

(72) Inventors: Nao Itabashi, Nagoya (JP); Tomoya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 374 days.

(21) Appl. No.: 17/763,335

(22) PCT Filed: Sep. 23, 2020

(86) PCT No.: PCT/JP2020/035706
§ 371 (c)(1),
(2) Date: Jul. 22, 2022

(87) PCT Pub. No.: WO2021/060248
PCT Pub. Date: Apr. 1, 2021

(65) Prior Publication Data

US 2022/0388299 A1 Dec. 8, 2022

(30) Foreign Application Priority Data

Sep. 26, 2019 (JP) ................................ 2019-175518
Sep. 26, 2019 (JP) ................................ 2019-175526
(Continued)

(51) Int. Cl.
*B41F 13/02* (2006.01)
*B41F 13/64* (2006.01)
*B41F 16/00* (2006.01)

(52) U.S. Cl.
CPC ............ *B41F 16/006* (2013.01); *B41F 13/02* (2013.01); *B41F 13/64* (2013.01)

(58) Field of Classification Search
CPC ............................... B41F 13/02; B41F 16/006
See application file for complete search history.

(56) References Cited

U.S. PATENT DOCUMENTS 5,026,276 A 6/1991 Hirabayashi et al.
2012/0312909 A1 12/2012 Nishihiro
(Continued)

FOREIGN PATENT DOCUMENTS

JP 2-113277 A 4/1990
JP 2-113278 A 4/1990
(Continued)

OTHER PUBLICATIONS

International Search Report issued in related PCT/JP2020/035706, mailed Dec. 15, 2020.
(Continued)

*Primary Examiner* — Jeffry H Aftergut
(74) *Attorney, Agent, or Firm* — Merchant & Gould P.C.

(57) ABSTRACT

A foil transfer film cartridge includes a supply reel on which a foil film including a transfer layer containing foil is wound, a take-up reel on which to take up the foil film, a first connecting portion extending in a direction perpendicular to a first axial direction along a rotation axis of the supply reel and connecting the supply reel and the take-up reel at a position apart from the foil film, and a film guide member extending in a second axial direction along a rotation axis—of the take-up reel the film guide member being capable of assuming an out-of-contact state and an in-contact state with the foil film extended between the supply reel and the take-up reel.

40 Claims, 42 Drawing Sheets

(30) Foreign Application Priority Data

| | | | |
|---|---|---|---|
| Sep. 26, 2019 | (JP) | ................................ | 2019-175540 |
| Sep. 26, 2019 | (JP) | ................................ | 2019-175549 |
| Feb. 27, 2020 | (JP) | ................................ | 2020-031434 |

(56) References Cited

U.S. PATENT DOCUMENTS

| | | | |
|---|---|---|---|
| 2013/0167742 | A1 | 7/2013 | Tamura et al. |
| 2015/0145940 | A1 | 5/2015 | Suzuki |

FOREIGN PATENT DOCUMENTS

| | | | | |
|---|---|---|---|---|
| JP | 2-131270 | A | | 5/1990 |
| JP | 5-116417 | A | | 5/1993 |
| JP | 6-320766 | A | | 11/1994 |
| JP | 7-290685 | A | * | 11/1995 |
| JP | 2001-1619 | A | * | 1/2001 |
| JP | 2007-136893 | A | * | 6/2007 |
| JP | 2010-2844 | A | | 1/2010 |
| JP | 2012-025019 | A1 | | 2/2012 |
| JP | 2012-139979 | A | | 7/2012 |
| JP | 2012-252298 | A | | 12/2012 |
| JP | 2014-232146 | A | | 12/2014 |
| JP | 2015-100965 | A | | 6/2015 |
| JP | 2019-045653 | A | | 3/2019 |
| JP | 2019-172452 | A | | 10/2019 |
| JP | 2020-117258 | A | * | 8/2020 |
| WO | WO02020/136939 | A1 | * | 7/2020 |
| WO | WO-2020/136940 | A1 | * | 7/2020 |
| WO | WO-2020/158004 | A1 | * | 8/2020 |

OTHER PUBLICATIONS

International Preliminary Report on Patentability and Written Opinion of the International Searching Authority issued in corresponding International Patent Application No. PCT/JP2020/035706, dated Mar. 15, 2022.

* cited by examiner (a)

(b)

(a)

(b)

(a)

(b)

(a)

(b)

LAYER TRANSFER FILM CARTRIDGE AND LAYER TRANSFER DEVICE

CROSS-REFERENCE TO RELATED APPLICATIONS

This application is a National Stage Application of PCT/JP2020/035706, filed Sep. 23, 2020, which further claims priority to Japanese Patent Application No. 2019-175518, filed Sep. 26, 2019, Japanese Patent Application No. 2019-175526, filed Sep. 26, 2019, Japanese Patent Application No. 2019-175540, filed Sep. 26, 2019, Japanese Patent Application No. 2019-175549, filed Sep. 26, 2019, and Japanese Patent Application No. 2020-031434, filed Feb. 27, 2020, all of which are incorporated herein by reference in their entirety. To the extent appropriate, a claim of priority is made to the above disclosed application.

TECHNICAL FIELD

The present invention relates to a layer transfer film cartridge installable into and removable from a housing of a layer transfer device for transferring a transfer layer onto a sheet, and a layer transfer device.

BACKGROUND ART

A layer transfer film cartridge installable into and removable from a housing of a layer transfer device and comprising a supply reel on which a multilayer film is wound and a take-up reel for taking up the multilayer film is conventionally known in the art (see Patent Document 1). In this art, a structure for guiding the multilayer film to change a traveling direction of the multilayer film is provided at the layer transfer film cartridge.

CITATION LIST

Patent Literature

Patent Document 1: JPH 7-290685 A

SUMMARY OF INVENTION

In such a layer transfer film cartridge, after foil or the like is transferred onto a sheet laid on the multilayer film, a traveling direction of the multilayer sheet is changed to peel off the multilayer film from the sheet. The greater the change in the traveling direction, i.e., the smaller the peeling angle at which the multilayer sheet is peeled from the sheet, the easier the sheet is separated from the multilayer sheet.

Accordingly, it is an object of the present invention to provide a layer transfer film cartridge and a layer transfer device that can more easily peel off a multilayer film from a sheet.

To solve the above problem, the foil transfer film cartridge according to the present invention comprises: a supply reel on which a foil film including a transfer layer containing foil is wound; a take-up reel on which to take up the foil film; a first connecting portion extending in a direction perpendicular to a first axial direction along a rotation axis of the supply reel, and connecting the supply reel and the take-up reel at a position apart from the foil film; and a film guide member extending in a second axial direction along a rotation axis of the take-up reel, the film guide member being capable of assuming an out-of-contact state and an in-contact state with the foil film extended between the supply reel and the take-up reel.

According to this configuration, the multilayer film can be more easily peeled off from the sheet.

The film guide member may be movable between a first position and a second position closer, than the first position, to the supply reel.

Further, the inventors of the present application are contemplating to reduce the weight of the layer transfer film cartridge by providing a part of a structure for guiding the multilayer film at a housing of the layer transfer device and providing the rest of the structure for guiding the multilayer film at the layer transfer film cartridge. However, in this case there is a possibility that the structure provided at the layer transfer film cartridge will interfere with the structure provided at the housing during installation and removal of the layer transfer film cartridge which causes a problem that flexibility in design will be limited.

To solve the above problem the layer transfer film cartridge according to the present invention comprises: a supply reel on which a multilayer film including a transfer layer and a supporting layer which supports the transfer layer is wound; a take-up reel on which to take up the multilayer film; a first connecting portion extending in a direction perpendicular to a first axial direction along a rotation axis of the supply reel, and connecting the supply reel and the take-up reel at a position apart from the multilayer film; and a film guide member extending in a second axial direction along a rotation axis of the take-up reel, the film guide member being capable of assuming an out-of-contact state and an in-contact state with the multilayer film extended between the supply reel and the take-up reel.

The film guide member is movable relative to the first connecting portion.

According to this configuration, since the film guide member is movable relative to the first connecting portion, the film guide member may be kept from interfering with other members provided in the housing during installation and removal of the layer transfer film cartridge FC. As a result, flexibility in design can be increased.

The layer transfer film cartridge may be configured to comprise a support member that supports the film guide member, wherein the support member is rotatably connected to the take-up reel.

The film guide member may be a shaft, and the layer transfer film cartridge may be configured to comprise a take-up case which houses the take-up reel, wherein the support member comprises a first side plate that supports one axial end of the shaft, and a second side plate that supports another axial end of the shaft, and wherein the first side plate and the second side plate are connected to the take-up reel in such a manner that the first side plate and the second side plate are positioned on opposite sides of the take-up case in the second axial direction.

The layer transfer film cartridge may be configured to comprise: a supply case which houses the supply reel; and a second connecting portion extending in a direction perpendicular to the first axial direction, the second connecting portion connecting the supply reel and the take-up reel at a position apart from the multilayer film, wherein the first connecting portion and the second connecting portion are each formed in a shape of a plate, wherein the supply case and the take-up case are located between the first connecting portion and the second connecting portion in the first axial direction, wherein the first side plate is connected to the take-up reel at a position between the first connecting portion and the take-up case, and wherein the second side plate is connected to the take-up reel at a position between the second connecting portion and the take-up case.

The layer transfer film cartridge may be configured to comprise a take-up case which houses the take-up reel, wherein the take-up case is rotatably supported by the take-up reel, and wherein the support member is fixed to the take-up case and is thereby rotatably connected to the take-up reel.

The film guide member may be a shaft, and the take-up case may be configured to comprise a first side plate, at one end of the take-up case in the second axial direction, that protrudes from the one end of the take up case and supports one axial end of the shaft, and a second side plate, at another end of the take-up case in the second axial direction, that protrudes from the another end of the take-up case and supports the other axial end of the shaft.

The layer transfer film cartridge may be configured to comprise a support member that supports the film guide member, wherein the support member is movable in an inter-axial direction along a straight line connecting the rotation axis of the supply reel and the rotation axis of the take-up reel.

The layer transfer film cartridge may be configured to comprise a take-up case which houses the take-up reel, wherein the take-up case is supported by the first connecting portion movably in the inter-axial direction, and wherein the support member is fixed to the take-up case.

The take-up case may comprise a guided portion protruding from one end of the take-up case in the second axial direction, the guided portion having a first flat surface extending along the second axial direction and the inter-axial direction, and the first connecting portion may have a guide hole by which the guided portion is supported movably in the inter-axial direction, the guide hole including a second flat surface in contact with the first flat surface.

The film guide member may be movable between a first position and a second position closer, than the first position, to the supply reel.

A dimension of the film guide member in the second axial direction may be greater than a dimension of multilayer film in the second axial direction.

To solve the above problem, the layer transfer film cartridge according to the present invention comprises: a supply reel on which a multilayer film including a transfer layer and a supporting layer which supports the transfer layer is wound; a take-up reel on which to take up the multilayer film; and a film guide member extending in an axial direction along a rotation axis of the take-up reel, the film guide member being capable of assuming an out-of-contact state and an in-contact state with the multilayer film extended between the supply reel and the take-up reel.

The film guide member is movable in an inter-axial direction along a straight line connecting a rotation axis of a supply reel and the rotation axis of the take-up reel.

According to this configuration, since the film guide member is movable in the inter-axial direction, the film guide member can be kept from interfering with other members provided at the housing during the installation and removal of the layer transfer film cartridge. As a result, flexibility in design can be increased.

The layer transfer film cartridge may be configured to comprise a first connecting portion that connects one axial end of the supply reel and one axial end of the take-up reel, and is movable in the inter-axial direction relative to the take-up reel.

The layer transfer film cartridge may be configured to comprise a take-up case which houses the take-up reel, wherein the first connecting portion supports the take-up case in such a manner that allows the take-up case to move in the inter-axial direction, and wherein the film guide member is provided at the take-up case.

The film guide member may be a shaft, and may comprise a support member that supports the shaft at a position apart from the take-up case, and the support member may be fixed to the take-up case.

The film guide member may be provided at the first connecting portion.

The first connecting portion may be movable in the inter-axial direction relative to the supply reel.

The first connecting portion may be configured to comprise a first member connected to one axial end of the supply reel; and a second member connected to one axial end of the take-up reel; wherein the first member supports the second member in such a manner that allows the second member to move in the inter-axial direction, and wherein the film guide member is provided at the second member.

The foil transfer film cartridge according to any one of claims 17 to 19, wherein the film guide member is a shaft, The film guide member may be a shaft, and may be configured to comprise a support member that supports the shaft in a position apart from the first connecting portion, wherein the support member is fixed to the first connecting portion.

The layer transfer film cartridge may further comprise a first spring that biases the film guide member in a direction away from the supply reel.

The layer transfer film cartridge may further comprise a second spring that biases the take-up reel in a direction toward the supply reel.

The film guide member may be movable between a first position and a second position closer, than the first position, to the supply reel.

The film guide member may be movable between a first position and a second position farther, than the first position, from the rotation axis of the take-up reel.

The first connecting portion may be configured to comprise a long hole elongate in the inter-axial direction, the long hole supporting one axial end of the take-up reel in a manner that allows the one axial end of the take-up reel to move in the inter-axial direction, and wherein the long hole limits a moving range of the film guide member to a range from the first position to the second position.

The layer transfer film cartridge may further comprise a second connecting portion that connects another axial end of the supply reel and another axial end of the take-up reel.

A dimension of the film guide member in an axial direction of the take-up reel may be greater than a width of the multilayer film in the axial direction of the take-up reel.

In order to solve the above problem, the layer transfer device according to the present invention is a layer transfer device for transferring a transfer layer onto a sheet, and comprises: a housing including a housing main body having an opening; and a layer transfer film cartridge installable into and removable from the housing main body through the opening, and supporting a multilayer film that includes the transfer layer and a supporting layer that supports the transfer layer.

The layer transfer film cartridge comprises a supply reel on which a multilayer film is wound; a take-up reel on which to take up the multilayer film; a film guide member extending in an axial direction along a rotation axis of the take-up reel, the film guide member being capable of assuming an out-of-contact state and an in-contact state relative to the multilayer film extended between the supply reel and the take-up reel, and movable between a first position and a second position closer, than the first position, to the supply reel.

The housing comprises a pressing member that presses the film guide member from the first position toward the second position.

According to this configuration, since the film guide member is movable, the film guide member can be kept from interfering with other members in the layer transfer device during installation and removal of the layer transfer film cartridge. As a result, flexibility in design can be increased. Further, since the film guide member is movable from the first position to the second position by the pressing member, the film guide member can be restrained from being positioned in an improper position (the first position) when the transfer layer is to be transferred onto a sheet.

The layer transfer device may be configured such that the layer transfer film cartridge is installable into and removable from the housing main body in an installation/removal direction perpendicular to the axial direction.

The housing main body may comprise a guide shaft that changes a traveling direction of the multilayer film, and the film guide member may contact a surface formed by a supported layer including the transfer layer of the multilayer film bent at the guide shaft.

The film guide member located in the first position may not overlap the guide shaft when projected in the installation/removal direction, and the film guide member located in the second position may overlap the guide shaft when projected in the installation/removal direction.

The housing may further comprise a cover to open and close the opening, and the pressing member may press the film guide member from the first position toward the second position when the cover is being closed.

According to this, since the film guide member moves to the second position when the cover is closed, the film guide member can be surely positioned in a proper position when a transfer layer is to be transferred onto a sheet.

The cover may comprise the pressing member.

The pressing member may be a third spring.

The pressing member may be the cover.

The pressing member may press the film guide member from the first position toward the second position in a process of the cover being closed.

The housing main body may comprise a driving mechanism configured to actuate the pressing member.

The layer transfer film cartridge may be configured to further comprise a rotatable support member that supports the film guide member, wherein the pressing member presses the film guide member via the support member.

The film guide member may be a shaft, and the support member may be configured to comprise: a first side plate supporting one axial end of the shaft; a second side plate supporting another axial end of the shaft; a first protrusion formed on the first side plate, the first protrusion being located on a side of the first side plate opposite to a side on which the second side plate is positioned in the axial direction; and a second protrusion formed on the second side plate, the second protrusion being located on a side of the second side plate opposite to a side on which the first side plate is positioned in the axial direction; wherein the pressing member may press the first protrusion and the second protrusion.

According to this, the film guide member can be pressed in a balanced way.

The layer transfer film cartridge may be configured to further comprise: a take-up case which houses the take-up reel and is rotatably supported by the take-up reel; and a handle protruding from an outer peripheral surface of the take-up case and graspable by a user, wherein the support member is fixed to the take-up case, and wherein the pressing member presses the handle and thereby presses the film guide member via the handle, the take-up case, and the support member.

The layer transfer device may further comprise a fourth spring that biases the film guide member from the second position toward the first position.

According to this, when the pressing member presses the film guide member, the film guide member moves from the first position to the second position against a biasing force of the fourth spring. Then, when the pressing force of the pressing member applied to the film guide member is released, the film guide member moves from the second position to the first position by the biasing force of the fourth spring. Therefore, when the layer transfer film cartridge is removed, the film guide member is located in a position that is not in the way of removal of the layer transfer film cartridge, thus the procedure of removing the layer transfer film cartridge can be easily performed.

To solve the above problem, the layer transfer device according to the present invention is a layer transfer device for transferring a transfer layer onto a sheet, and comprises: a housing main body having an opening; and a layer transfer film cartridge installable into and removable from the housing main body through the opening, and supporting a multilayer film including the transfer layer and a supporting layer that supports the transfer layer.

The housing main body comprises a guide shaft that guides the multilayer film and is movable between a third position and a fourth position farther, than the third position, from a portion of the layer transfer film cartridge, in a state in which the layer transfer film cartridge is installed in the housing main body.

According to this configuration, by moving the guide shaft to the fourth position when the layer transfer film cartridge is installed or removed, the layer transfer film cartridge can be kept from interfering with the guide shaft. As a result, flexibility in design can be increased.

Another feasible configuration may be such that the guide shaft positioned in the third position overlaps a portion of the layer transfer film cartridge when projected in a direction perpendicular to an axial direction along the guide shaft, and the guide shaft positioned in the fourth position does not overlap a portion of the layer transfer film cartridge when projected in the direction perpendicular to the axial direction along the guide shaft.

The housing main body may be configured to further comprise a holding member that holds the guide shaft, wherein the holding member is rotatably supported by the housing main body.

The layer transfer device may be configured to further comprise a cover to open and close the opening, wherein the guide shaft moves from the fourth position to the third position when the cover is closed.

According to this, since the guide shaft moves to the third position when the cover is closed, the guide shaft can be surely positioned in a proper position when the transfer layer is to be transferred onto a sheet.

In a process of the cover being closed, the cover may press the holding member, causing the guide shaft to move from the fourth position to the third position.

The holding member may be configured to comprise: a first arm rotatably supported by the housing main body and supporting one end of the guide shaft; a second arm rotatably supported by the housing main body and supporting another end of the guide shaft; a first lever formed on the first arm, the first lever being located on a side of the first arm opposite to a side on which the second arm is positioned in an axial direction along the guide shaft; and a second lever formed on the second arm, the second lever being located on a side of the second arm opposite to a side on which the first arm is positioned in the axial direction; wherein, in the process of the cover being closed, the cover presses the first lever and the second lever, causing the guide shaft to move from the fourth position to the third position.

In a process of the layer transfer film cartridge being removed from the housing main body, the guide shaft may move from the third position to the fourth position.

Since the guide shaft moves to the fourth position in the process of the layer transfer film cartridge being removed, when the layer transfer film cartridge is installed the next time, the guide shaft may be kept from getting in the way.

In the process of the layer transfer film cartridge being removed from the housing main body, the layer transfer film cartridge may press the holding member, thereby causing the guide shaft to move from the third position to the fourth position.

A fifth spring that biases the guide shaft from the third position toward the fourth position may be further provided.

According to this, when the cover being closed presses the holding member, the guide shaft moves from the fourth position to the third position against the biasing force of the fifth spring. When the cover is opened and the cover moves away from the holding member, the guide shaft moves from the third position to the fourth position by the biasing force of the fifth spring. Therefore, since the guide shaft is located in a position that is not in the way of removal of the layer transfer film cartridge when the layer transfer film cartridge is removed, the procedure of removing the layer transfer film cartridge can be easily performed.

The housing main body may be configured to comprise: a first guide shaft that contacts the multilayer film and changes a traveling direction of the multilayer film; and a second guide shaft that contacts the multilayer film guided by the first guide shaft and changes a traveling direction of the multilayer film, wherein the layer transfer film cartridge comprises a film guide member that contacts the multilayer film guided by the second guide shaft and changes a traveling direction of the multilayer film, wherein the guide shaft is the second guide shaft, and wherein the part of the layer transfer film cartridge is the film guide member.

The layer transfer film cartridge may be configured to comprise: a supply reel on which a multilayer film is wound; a take-up reel on which to take up the multilayer film; the film guide member may be a shaft extending in an axial direction along the rotation axis of the take-up reel, the shaft being unmovable in a direction in which the distance between the shaft and the supply reel changes.

By the way, since the layer transfer film cartridge is a replacement member, it is desirable for the layer transfer film cartridge to have a configuration as simple as possible.

Therefore, a further object of the present invention is to provide a layer transfer device which allows the layer transfer film cartridge to be configured by a simple structure.

A layer transfer device for accomplishing the above object is a layer transfer device for transferring a transfer layer onto a sheet, comprising: a housing including a housing main body; and a layer transfer film cartridge installable into and removable from the housing main body and comprising a multilayer film including the transfer layer and a supporting layer that supports the transfer layer.

The housing main body comprises: a first guide shaft that contacts the multilayer film and changes a traveling direction of the multilayer film; and a second guide shaft that contacts the multilayer film guided by the first guide shaft and changes a traveling direction of the multilayer film.

The housing comprises a third guide shaft that contacts the multilayer film guided by the second shaft and changes a traveling direction of the multilayer film.

According to this configuration, since the housing comprising the housing main body includes the guide shaft, the layer transfer film cartridge can be configured to have a simple structure.

In the layer transfer device described above, the third guide shaft may be movable relative to the housing main body between a fifth position in which the third guide shaft contacts the multilayer film guided by the second guide shaft and changes a traveling direction of the multilayer film and a sixth position different from the fifth position.

According to this, since the third guide shaft moves from a fifth position which is an in-use position to a sixth position different from the fifth position, interference between the layer transfer film cartridge and the third guide shaft can be restrained during installation and removal of the layer transfer film cartridge. Accordingly, flexibility in design can be increased.

In the layer transfer device described above, the housing main body may be configured to have an opening through which the layer transfer film cartridge passes when the layer transfer film cartridge is installed into or removed from the housing main body, wherein the housing comprises a housing cover supported by the housing main body in such a manner that the housing cover is movable between an open position in which the opening is uncovered and a close position in which the opening is covered, and wherein the third guide shaft is supported by the housing cover.

According to this, since the third guide shaft is retracted from an inside of the housing main body by opening the cover, a structure provided at the housing main body for installation and removal of the layer transfer film cartridge can be configured in a simple structure.

The layer transfer device described above may be configured to comprise a first support member supported by the housing cover and supporting the third guide shaft, wherein the first support member supports the third guide shaft at a position outward, in an axial direction of the third guide shaft, of a position of a sheet with a maximum width in the axial direction among sheets conveyable in the housing, and supports the third guide shaft at a position apart from the housing cover.

According to this, a sheet can be passed through between the third guide shaft and the housing cover.

In the layer transfer device described above, the first supporting member may be configured to comprise a third arm supporting one end of the third guide shaft, and a fourth arm supporting another end of the third guide shaft, wherein the distance between the third arm and the fourth arm is greater than a width of the sheet with the maximum width in the axial direction among sheets conveyable in the housing According to this, by passing the sheet through between the third guide shaft and the housing cover while both ends of the third guide shaft are supported by the arms, the third guide shaft can be made to uniformly contact the multilayer film F.

In the layer transfer device described above, the second guide shaft may be fixed to the housing main body, and the third guide shaft may be supported by the housing cover movably between a fifth position and a sixth position, overlap the second guide shaft when the third guide shaft is located in the fifth position and projected in an installation/removal direction of the layer transfer film cartridge into or from the housing main body, and not overlap the second guide shaft when the third guide shaft is located in the sixth position and projected in the installation/removal direction.

According to this, by the third guide shaft moving to the sixth position, the third guide shaft does not interfere with the second guide shaft when the housing cover is opened or closed, whereby the structure for supporting the housing cover on the housing main body can be configured in a simple structure allowing the cover 22 to be smoothly opened or closed.

The layer transfer device described above may be configured to comprise a sixth spring that biases the third guide shaft from the sixth position toward the fifth position, wherein the housing main body comprises a pressing portion which is contacted by the third guide shaft or a member supporting the third guide shaft on the housing cover in such a manner that the third guide shaft is movable, at a midway of movement of the housing cover from the open position to the close position, the pressing portion causing the third guide shaft to move from the fifth positon to the sixth position against a biasing force of the sixth spring in accordance with the movement of the housing cover from the open position to the close position, and wherein the third guide shaft moves from the sixth position to the fifth position by the biasing force of the sixth spring when the third guide shaft or the member supporting the third guide shaft on the housing cover in such a manner that the third guide shaft is movable moves out of contact with the pressing member in accordance with the movement of the housing cover from the open position to the close position.

According to this, the time it takes until the layer transfer device 1 is ready to be used can be made shorter. Further, the operability of layer transfer device can be improved In the layer transfer device described above, the third guide shaft may be fixed to the housing cover and configured to move from the sixth position to the fifth position in accordance with movement of the housing cover from the open position to the close position.

According to this, the structure for supporting the third guide shaft on the cover can be configured to have a simple structure.

In the layer transfer device described above, the second guide shaft may be configured to be movably supported by the housing main body between a seventh position and an eighth position, to overlap the third guide shaft in the fifth position when the second guide shaft is located in the seventh position and projected in an installation/removal direction of the layer transfer film cartridge into or from the housing main body, and not to overlap the third guide shaft in the fifth position when the second guide shaft is located in the eighth position and projected in the installation/removal direction.

According to this, by virtue of configuration of the second guide shaft movable to the eighth position, the third guide shaft does not interfere with the second guide shaft when the housing cover is opened or closed, allowing the structure for supporting the third guide shaft on the cover to be configured by a simple structure and the housing cover to be smoothly opened or closed.

The layer transfer device described above may be configured to comprise a second support member supporting the second guide shaft on the housing main body movably between a seventh position and an eighth position; and a seventh spring that biases the second guide shaft from the eighth position toward the seventh position; wherein the second support member moves the second guide shaft from the seventh position to the eighth position against a biasing force of the seventh spring when pressed by the housing cover moving from the open position toward the close position, and when the second support member is not being pressed anymore by the housing cover at a later time, the second guide shaft is moved from the eighth positon to the seventh position by the biasing force of the seventh spring.

According to this, the time it takes until the layer transfer device is ready to be used can be made shorter.

In the layer transfer device described above, the third guide shaft may be supported by the housing main body.

According to this, since it is not necessary to provide the third guide shaft or supporting structures and the like for the third guide shaft on the housing cover, the weight of the housing cover can be reduced. As a result, the procedure of opening and closing the housing cover may be easily performed.

DESCRIPTION OF EMBODIMENTS

A detailed description will be given of a first embodiment of the present invention with reference made to the drawings where appropriate. In the following description, the entire configuration of the layer transfer device will be briefly described first and the configuration of distinctive parts of the present invention will be described thereafter.

Figure 1:
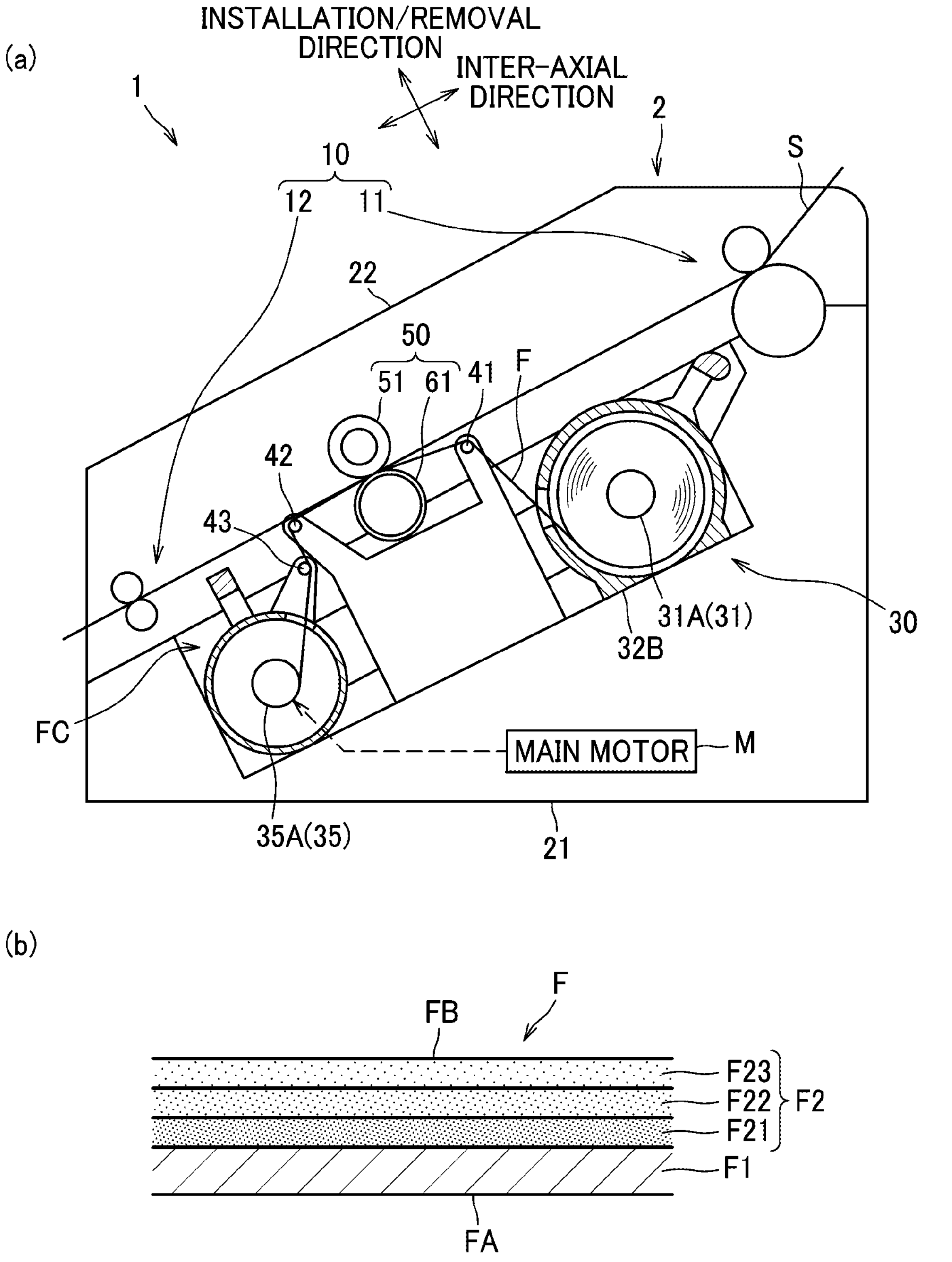
FIG. 1 includes a view (a) showing a layer transfer device according to a first embodiment of the present invention, and a sectional view (b) showing a configuration of a multilayer film.

As shown in FIG. 1(*a*), a layer transfer device 1 is a device for transferring a transfer layer containing foil such as aluminum onto a toner image formed on a sheet S after the toner image is formed on the sheet S in an image forming device such as, for example, a laser printer or the like. In other words, the layer transfer device 1 forms a foil image on a sheet S by transferring foil onto a toner image on the sheet S. The layer transfer device 1 includes a housing 2, a sheet conveyor unit 10, a film supply unit 30 and a transfer unit 50.

The housing 2 is made of plastic or the like, and comprises a housing main body 21 and a cover 22 (housing cover). The housing main body 21 has an opening 21A (see FIG. 2) at an upper portion thereof. The opening 21A is an opening for installing and removing a layer transfer film cartridge FC described below into or from the housing main body 21. The cover 22 is a member for opening and closing the opening 21A. The cover 22 is rotatably supported by the housing main body 21. The cover 22 is rotatable between a close position for closing the opening 21A (position of FIG. 1(*a*)) and an open position for opening the opening 21A (position of FIG. 2).

The sheet conveyor unit 10 includes a sheet feed mechanism 11 and a sheet ejection mechanism 12. The sheet conveyor unit 10 is driven to rotate by a main motor M described below. The sheet feed mechanism 11 is a mechanism that conveys sheets S on a sheet tray (not shown) one by one toward the transfer unit 50.

The sheet ejection mechanism 12 is a mechanism that ejects a sheet S having passed through the transfer unit 50, to the outside of the housing 2.

The film supply unit 30 is a unit that supplies and lays a multilayer film F onto a sheet S conveyed from the sheet feed mechanism 11. The film supply unit 30 includes the layer transfer film cartridge FC, a first guide shaft 41, a second guide shaft 42 as an example of a guide shaft, and a main motor M as a driving source. The first guide shaft 41 and the second guide shaft 42 are provided at the housing main body 21 (see FIG. 2).

Figure 2:
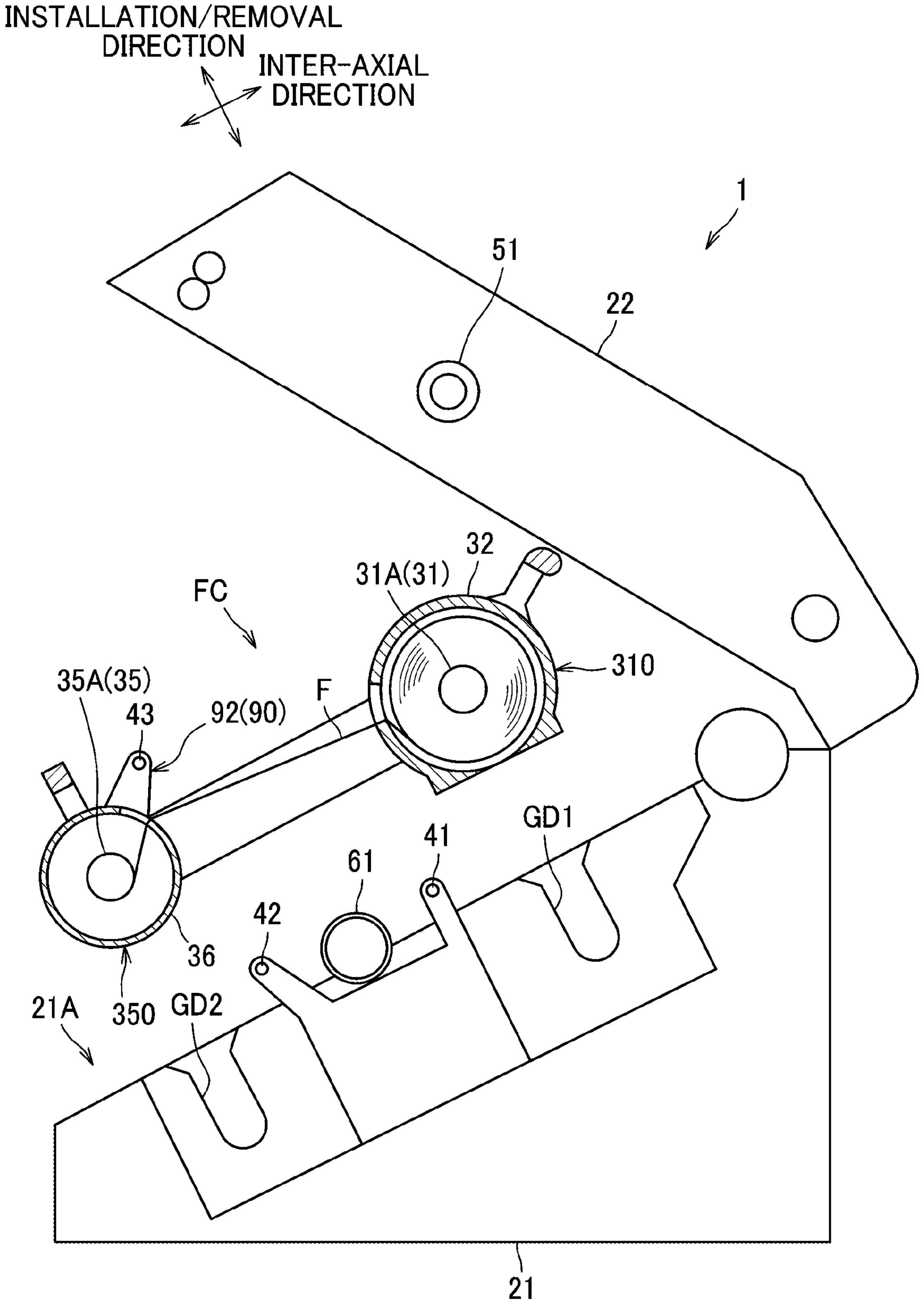
FIG. 2 is a view showing the layer transfer device in a state in which a cover is open.

The layer transfer film cartridge FC is configured, as shown in FIG. 2, to be installable into and removable from the housing main body 21 through the opening 21A. The layer transfer film cartridge FC is a cartridge for supporting the multilayer film F and mainly comprises a supply unit 310, a take-up unit 350, and a shaft 43 as one example of a film guide member. The supply unit 310 mainly includes a supply reel 31. The take-up unit 350 mainly includes a take-up reel 35. The multilayer film F is wound on the supply reel 31.

As shown in FIG. 1(*b*), the multilayer film F is a film consisting of a plurality of layers.

Specifically, the multilayer film F includes a supporting layer F1 and a supported layer F2. The supporting layer F1 is a transparent substrate in the form of a tape made of polymeric material and supports the supported layer F2. The supported layer F2 includes, for example, a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image, and contains foil. Foil is a thin sheet of metal such as gold, silver, copper, aluminum, etc. The transfer layer F22 contains a colorant of gold-colored, silver-colored, red-colored, or other colorant, and a thermoplastic resin. The transfer layer F22 is interposed between the release layer F21 and the adhesive layer F23. A multilayer film F with a transfer layer F22 containing foil is particularly referred to as a foil film, a device for transferring foil is referred to as a foil transfer device, and a layer transfer film cartridge used in the foil transfer device is referred to as a foil transfer film cartridge.

The adhesive layer F23 is a layer for facilitating adhesion of the transfer layer F22 to a toner image. The adhesive layer F23 contains a material, for example, such as vinyl chloride resin or acrylic resin, which tends to adhere to a toner image heated by the transfer unit 50 which will be described below.

The supply reel 31 is made of plastic or the like, and includes a supply shaft 31A on which a multilayer film F is wound. One end of the multilayer film F is fixed to the supply shaft 31A.

The take-up reel 35 is made of plastic or the like, and includes a take-up shaft 35A on which to take up the multilayer film F. The other end of the multilayer film F is fixed to the take-up shaft 35A. The take-up shaft 35A is driven to rotate by the main motor M.

It is to be understood that layer transfer film cartridge FC in a new condition has its multilayer film F wound on the supply reel 31 in a roll of a maximum diameter, while no multilayer film F is wound on the take-up reel 35, or the multilayer film F is wound on the take-up reel 35 in a roll of a minimum diameter. When the layer transfer film cartridge FC is at the end of its life (the multilayer film F has been exhausted), the multilayer film F is wound on the take-up reel 35 in a roll of a maximum diameter, while no multilayer film F is wound on the supply reel 31, or the multilayer film F is wound on the supply reel 31 in a roll of a minimum diameter.

The first guide shaft 41 is a shaft for guiding the multilayer film F. More specifically, the first guide shaft 41 contacts the multilayer film F drawn out from the supply reel 31 and changes a traveling direction of the multilayer film F. The first guide shaft 41 is made of SUS (stainless steel). The second guide shaft 42 is a shaft for guiding the multilayer film F. More specifically, the second guide shaft 42 contacts the multilayer film F guided by the first guide shaft 41 and changes a traveling direction of the multilayer film F. The second guide shaft 42 is made of SUS.

When the layer transfer film cartridge FC is installed in the housing main body 21, the first guide shaft 41 and the second guide shaft 42 contact a first surface FA (see FIG. 1(*b*)) formed by the supporting layer F1, of the surfaces of the multilayer film F. When the layer transfer film cartridge FC is installed in the housing main body 21, a second surface FB (see FIG. 1(*b*)) opposite to the first surface FA, of the surfaces of the multilayer film F extended and stretched between the first guide shaft 41 and the second guide shaft 42, and formed by the supported layer F2 including the transfer layer F22, contacts a sheet S conveyed by the sheet conveyor unit 10, and a pressure roller 51.

The shaft 43 is a member made of SUS or the like for adjusting an angle of the multilayer film F being peeled off the sheet S, and contacts the second surface FB of the multilayer film F. The shaft 43 may assume an out-of-contact state and an in-contact state with the multilayer film F extended over the supply reel 31 and the take-up reel 35. The shaft 43 extends in a second axial direction. The shaft 43 is pressed against the second surface FB of the multilayer film F extended and stretched between the second guide shaft 42 and the take-up reel 35, thereby changing a traveling direction of the multilayer film F, and causing the angle of the multilayer film F bent at the second guide shaft 42 (also referred to as "peeling angle" in the following description) to be adjusted to a more acute angle. More specifically, the peeling angle is an angle formed by portions of the multilayer film F extended and stretched between the first guide shaft 41 and the second guide shaft 42, and extended and stretched between the second guide shaft 42 and the shaft 43. The more acute the peeling angle, i.e., the smaller the peeling angle, the easier the separation of the sheet S having passed the second guide shaft 42 from the multilayer film F. The first guide shaft 41 and the second guide shaft 42 may either be rotatably or non-rotatably supported by the housing main body 21. The shaft 43 may be either rotatably or non-rotatably supported by support members 90 described below.

The first guide shaft 41 guides the multilayer film F drawn out from the supply reel 31 in such a manner that the multilayer film F is laid under a sheet S being conveyed with a surface with a toner image formed thereon facing downward. The first guide shaft 41 changes a direction of conveyance of the multilayer film F drawn out from the supply reel 31, and guides the multilayer film F in a direction substantially parallel to a direction of conveyance of the sheet S.

The second guide shaft 42 is a separator roller that contacts the multilayer film F having passed through the transfer unit 50, and changes a direction of conveyance of the multilayer film F having passed through the transfer unit 50 to a direction different from a direction of conveyance of a sheet S, to thereby guide the multilayer film F in a direction away from the sheet S. The multilayer film F having passed through the transfer unit 50 and conveyed with the sheet S laid thereon is guided in a direction different from a direction of conveyance of the sheet S upon passing the second guide shaft 42, and peeled off from the sheet S.

The transfer unit 50 is a unit that heats and pressurizes a sheet S and the multilayer film F laid on each other, to transfer the transfer layer F22 onto a toner image formed on the sheet S. The transfer unit 50 includes a pressure roller 51 and a heating roller 61. The transfer unit 50 applies heat and pressure to the sheet S and the multilayer film F laid on each other in a nip between the pressure roller 51 and the heating roller 61.

The pressure roller 51 is a roller comprising a cylindrical metal core with its cylindrical surface coated with a rubber layer made of silicone rubber. The pressure roller 51 is located above the multilayer film F, and is contactable with a reverse side (opposite to a side on which a toner image is formed) of the sheet S.

The pressure roller 51 has end portions rotatably supported by the cover 22. The pressure roller 51 nips the sheet S and the multilayer film F in combination with the heating roller 61, and is driven to rotate by the main motor M, causing the heating roller 61 to rotate accordingly. In this way, as the pressure roller 51 and the heating roller 61 rotates with the sheet S and the multilayer film F nipped therebetween, the sheet S and the multilayer film F are conveyed.

The heating roller 61 is a roller comprising a cylindrical metal tube with a heater located inside, and heats the multilayer film F and the sheet S. The heating roller 61 is located under the multilayer film F, and contacts the first surface FA of the multilayer film F.

With the layer transfer device 1 configured as described above, sheets S stacked on the sheet tray (not shown) with front surfaces facing downward are conveyed one by one toward the transfer unit 50 by the sheet feed mechanism 11. The sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F passing through the nip between the pressure roller 51 and the heating roller 61 are heated and pressurized by the heating roller 61 and the pressure roller 51, so that the transfer layer F22 is transferred onto a toner image. In the following description, transfer of the transfer layer F22 onto a toner image will also be simply referred to as "layer transfer".

After layer transfer is finished, the sheet S and the multilayer film F adhered to each other are conveyed to the second guide shaft 42. When the sheet S and the multilayer film F travel past the second guide shaft 42, the direction of conveyance of the multilayer film F is changed to a direction different from the direction of conveyance of the sheet S; thereby the multilayer film F is peeled off from the sheet S.

The multilayer film F peeled off from the sheet S is taken up on the take-up reel 35. On the other hand, the sheet S from which the multilayer film F is peeled off is ejected to the outside of the housing 2 by the sheet ejection mechanism 12 with a foil transferred surface facing downward.

Figure 3:
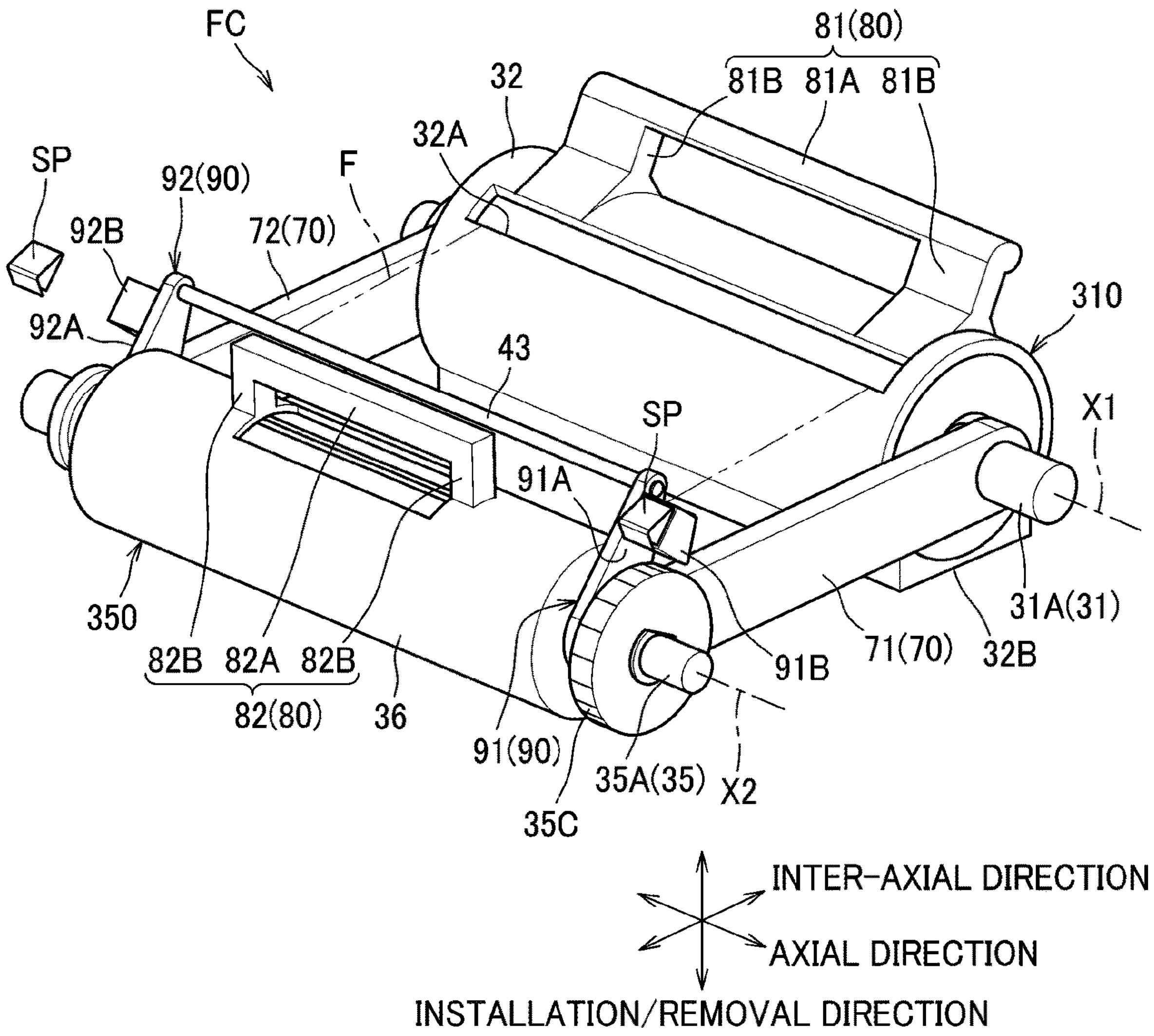
FIG. 3 is a perspective view of a layer transfer film cartridge.

As shown in FIG. 3, the layer transfer film cartridge FC comprises connecting portions 70, handles 80, and support members 90 in addition to the supply unit 310 and the take-up unit 350 described above. The supply unit 310 comprises a supply case 32 in addition to the supply reel 31 described above. The take-up unit 350 comprises a take-up case 36 in addition to the take-up reel 35 described above. In the following description, a first axial direction along a rotation axis X1 of the supply reel 31 and a second axial direction along a rotation axis X2 of the take-up reel 35 will also be simply referred to as "axial direction". Further, in the following description, an inter-axial direction along a straight line connecting the rotation axes X1, X2 will also be simply referred to as "inter-axial direction".

The supply case 32 is a case which houses the supply reel 31 and is formed in a hollow near cylindrical shape. More specifically, the supply case 32 houses the multilayer film F wound on the supply shaft 31A of the supply reel 31. The supply shaft 31A of the supply reel 31 protrudes outward from the end surfaces of the supply case 32 in the axial direction.

The supply case 32 is engaged with or fixed to the connecting portions 70 so that the supply case 32 does not rotate about the rotation axis X1 relative to the connecting portions 70. The supply case 32 has a flat surface 32B on part of an outer peripheral surface thereof. The flat surface 32B extends in the axial direction and the inter-axial direction. The flat surface 32B is in contact with a planar portion of the housing main body 21, whereby the layer transfer film cartridge FC is supported by the housing main body 21 (see FIG. 1).

The supply reel 31 is rotatably supported by the supply case 32 and the connecting portions 70. The supply reel 31 is located between the flat surface 32B and a first base portion 81A which will be described later in a direction perpendicular to both the axial direction and the inter-axial direction.

The take-up case 36 is a case which houses the take-up reel 35 and is formed in a hollow cylindrical shape. More specifically, the take-up case 36 houses the multilayer film F wound on the take-up shaft 35A of the take-up reel 35. The take-up shaft 35A of the take-up reel 35 protrudes outward from the end surfaces of the take-up case 32 in the axial direction.

The take-up case 36 is engaged with or fixed to the connecting portions 70 so that the take-up case 36 does not rotate about the rotation axis X2 relative to the connecting portions 70. The take-up reel 35 is rotatably supported by the take-up case 36 and the connecting portions 70. The take-up reel 35 comprises the take-up shaft 35A described above and a take-up gear 35C. The take-up gear 35C is a gear for receiving a driving force from the main motor M. The take-up gear 35C is provided at one axial end of the take-up shaft 35A. More specifically, a part of the take-up shaft 35A is formed in a D-shape and fits into a D-shaped hole opened in the take-up gear; thus the take-up gear 35C is non-rotatably fixed to the take-up shaft 35A.

The connecting portions 70 are members that connect the supply unit 310 and the take-up unit 350. The connection portions 70 include a first connecting portion 71 and a second connecting portion 72. The first connecting portion 71 and the second connecting portion 72 extend in a direction perpendicular to the first axial direction. More specifically, the first connecting portion 71 and the second connecting portion 72 are formed in shapes of long plates elongate in the inter-axial direction along a straight line connecting the rotation axis X1 of the supply reel 31 and the rotation axis X2 of the take-up reel 35. The first connecting portion 71 and the second connecting portion 72 are located in positions apart from the multilayer film F.

The first connecting portion 71 connects one end of the supply unit 310 in the axial direction and one end of the take-up unit 350 in the axial direction. Specifically, the first connecting portion 71 connects one end of the supply shaft 31A and one end of the take-up shaft 35A. More specifically, the connecting portion 71 has holes on both ends in the inter-axial direction through which the supply shaft 31A or the take-up shaft 35A extends. The first connecting portion 71 is located between the take-up gear 35C and the take-up case 36 in the axial direction.

The second connecting portion 72 connects another end of the supply unit 310 in the axial direction and another end of the take-up unit 350 in the axial direction. Specifically, the second connecting portion 72 connects another end of the supply shaft 31A and another end of the take-up shaft 35A. More specifically, the second connecting portion 72 has holes on both ends in the inter-axial direction through which the supply shaft 31A or the take-up shaft 35A extends.

The supply case 32 and the take-up case 36 are located between the first connecting portion 71 and the second connecting portion 72 in the axial direction.

The handles 80 are parts which allow user's fingers to be hooked. The handles 80 include a first handle 81 and a second handle 82 positioned apart from the first handle 81 in the inter-axial direction.

The first handle 81 is made of plastic or the like and is provided at the supply unit 310 in such a manner as to extend in the axial direction. More specifically, the first handle 81 is supported by the supply case 32. The first handle 81 protrudes from the outer peripheral surface of the supply case 32 in a direction non-parallel to the rotation axis X1, more specifically, in a direction perpendicular to the rotation axis X1. The first handle 81 includes a first base portion 81A extending in the axial direction and two first leg portions 81B extending from both ends, in the axial direction, of the first base portion 81A toward the supply reel 31. The two first leg portions 81B are connected to the supply case 32.

The second handle 82 is made of plastic or the like and is provided at the take-up unit 350 in such a manner as to extend in the axial direction. More specifically, the second handle 82 is supported by the take-up case 36. The second handle 82 protrudes from the outer peripheral surface of the take-up case 36 in a direction non-parallel to the rotation axis X1, more specifically, in a direction perpendicular to the rotation axis X1. The second handle 82 includes a second base portion 82A extending in the axial direction and two second leg portions 82B extending from both ends, in the axial direction, of the second base portion 82A toward the take-up reel 35. The two second leg portions 82B are connected to the take-up case 36.

The length of the first handle 81 in the axial direction is longer than the length of the second handle 82 in the axial direction. The second handle 82 is positioned within an extent of the first handle 81 in the axial direction.

The shaft 43 is provided at the take-up unit 350. The shaft 43 has a circular shaft shape which extends along the axial direction. The shaft 43 is positioned apart from the take-up reel 35, more specifically, from the take-up case 36.

The support members 90 are members supporting the shaft 43. The support members 90 include a first side plate 91 and a second side plate 92. The first side plate 91 and the second side plate 92 are plate-shaped members that extend in a radial direction of the take-up reel 35 outward from the rotation axis X2 of the take-up reel 35, and are formed in a near-fan shape tapering toward an outer side in the radial direction. The first side plate 91 and the second side plate 92 are rotatably connected to the take-up shaft 35A of the take-up reel 35. More specifically, the first side plate 91 and the second side plate 92 each have a hole through which the take-up shaft 35A extends. The first side plate 91 and the second side plate 92 are connected to the take-up shaft 35A and positioned on opposite sides of the take-up case in the axial direction.

The first side plate 91 supports one axial end of the shaft 43. The first side plate 91 is located between the take-up case 36 and the first connecting portion 71 in the axial direction. The first side plate 91 has an outer surface 91A facing the first connecting portion 71 and a protrusion 91B protruding from the outer surface 91A. The protrusion 91B is formed on a side of the first side plate 91 opposite to a side on which the second side plate 92 is positioned in the axial direction. The protrusion 91B is also referred to as first protrusion 91B in the following description.

The protrusion 91B is located between the first connecting portion 71 and the shaft 43 in a radial direction of the take-up reel 35. A leaf spring SP is provided at the protrusion 91B. The leaf spring SP is provided on a side of the protrusion 91B opposite a side on which the supply reel 31 is positioned in the inter-axial direction.

The second side plate 92 supports another axial end of the shaft 43. The second side plate 92 is located between the take-up case 36 and the second connecting portion 72 in the axial direction. The second side plate 92 has an outer surface 92A facing the second connecting portion 72 and a protrusion 92B protruding from the outer surface 92A. A leaf spring SP similar to the aforementioned leaf spring SP is provided at the protrusion 92B. The protrusion 92B is formed on a side of the second side plate 92 opposite to a side on which the first side plate 91 is positioned in the axial direction. The protrusion 92B is also referred to as second protrusion 92B in the following description.

Figure 4:
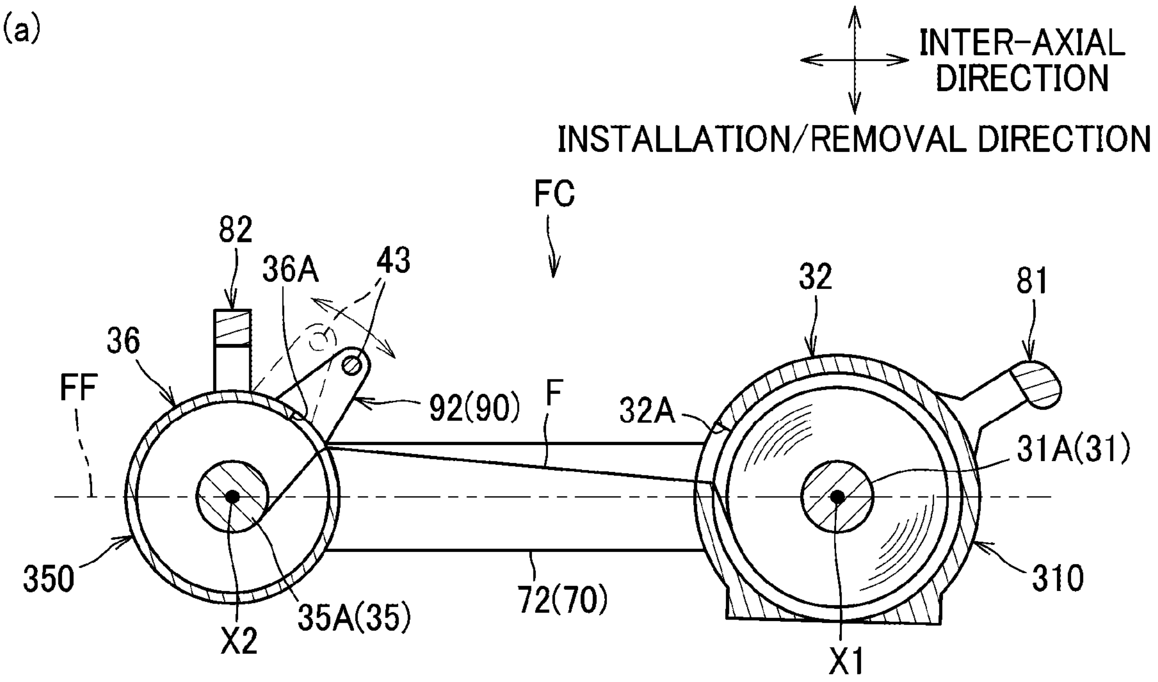
FIG. 4 includes a sectional view (a) of the layer transfer film cartridge, and a plan view (b) showing the relation between a shaft and the multilayer film.
Figure 4:
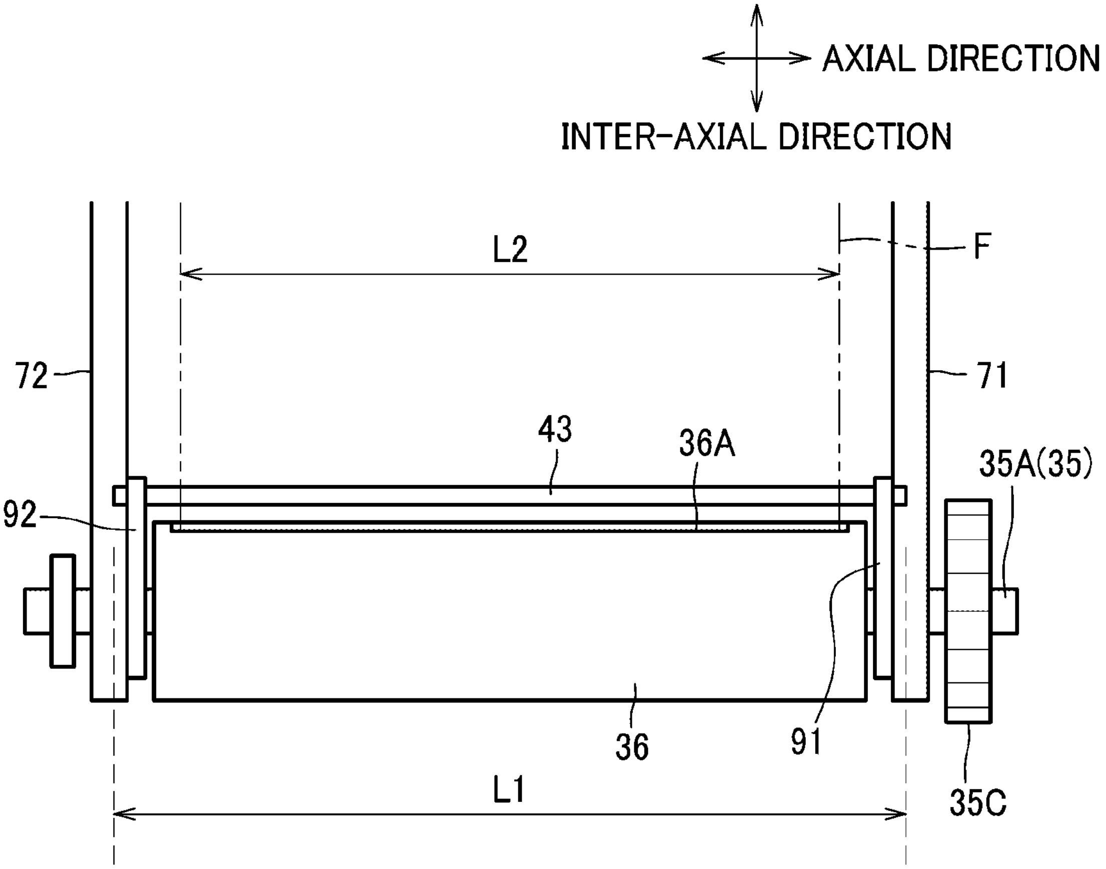

As shown in FIG. 4(*a*), the shaft 43 supported by the support members 90 is movable relative to the connecting portions 70. More specifically, the shaft 43 is movable relative to the connecting portions 70 in a direction approximately perpendicular to the second axial direction. Herein, approximately perpendicular to the second axial direction means that an angle defined by the second axial direction and the direction of movement of the shaft 43 is within a range of 80 to 100 degrees. More specifically, the shaft 43 is movable between a first position shown by dashed lines in the figure and a second position (shown by solid lines) closer than the first position to the supply reel 31. A restriction portion (not shown) is provided at the take-up case 36 or the connecting portions 70 for restricting the moving range of the shaft 43 within a range from the first position to the second position. Specifically, the restriction portion restricts the rotational range of the support members 90 so that the shaft 43 is movable only between the first positon and the second position.

The restriction portion may, for example, be provided at the connecting portions 70. The restriction portion may, for example, include a first restriction portion and a second restriction portion. In this case, when the shaft 43 moves from the first positon to the second position, the support members 90 contact the first restriction portion, and when the shaft 43 moves from the second position to the first position, the support members 90 contact the second restriction portion.

Further, one restriction portion may be provided. In this case, the support members 90 are biased by a torsion spring or the like toward a direction of contact with the restriction portion. In this way, when the shaft 43 moves from the second positon to the first position, the support members 90 contact the restriction portion. Further, when the support members 90 are pressed by lugs 22A which will be described below when the cover 22 is closed, the support members 90 move against the biasing force of the torsion spring and the shaft 43 moves from the first position to the second positon.

As shown in FIG. 4(*b*), the dimension L1 of the shaft 43 in the axial direction is greater than the width L2 of the multilayer film F.

As shown in FIG. 3 and FIG. 4(*a*), the supply case 32 has a supply opening 32A through which the multilayer film F passes. The supply opening 32A guides the multilayer film F from an inside to an outside of the supply case 32. The take-up case 36 has a take-up opening 36A through which the multilayer film F passes. The take-up opening 36A guides the multilayer film F from an outside to an inside of the take-up case 36. The multilayer film F is supported by the edge of the supply opening 32A and the edge of the take-up opening 36A, and extended and stretched between the supply reel 31 and the take-up reel 35, i.e., can be extended therebetween under tension. The first handle 81 and the second handle 82 are positioned on a side of the multilayer film F extended and stretched over the supply unit 310 (more specifically, the supply case 32) and the take-up unit 350 (more specifically, the take-up case 36), which is a side opposite to a side on which an imaginary plane FF including the rotation axis X1 of the supply reel 31 and the rotation axis X2 of the take-up reel 35 is positioned, in a direction perpendicular to the imaginary plane FF.

The first handle 81 provided at the supply unit 310 is positioned on a side of the imaginary plane FF which is the same side on which the supply opening 32A is positioned, in a direction perpendicular to the imaginary plane FF. The second handle 82 provided at the take-up unit 350 is positioned on a side of the imaginary plane FF which is the same side as a side on which the take-up opening 36A is positioned, in a direction perpendicular to the imaginary plane FF. The second handle 82 is positioned farther, than the take-up opening 36A, from the imaginary plane FF, in a direction perpendicular to the imaginary plane FF.

The second handle 82 provided at the take-up unit 350 is positioned on a side of the imaginary plane FF which is the same side as a side on which the shaft 43 is positioned, in the direction perpendicular to the imaginary plane FF.

The layer transfer film cartridge FC is installable into and removable from the housing main body 21 in the direction perpendicular to the imaginary plane FF. In other words, the layer transfer film cartridge FC is installable into and removable from the housing main body 21 in an installation/removal direction perpendicular to the axial direction. In the following description, the direction perpendicular to the imaginary plane FF, i.e., the installation/removal direction of the layer transfer film cartridge FC, is also simply referred to as “installation/removal direction”.

Figure 5:
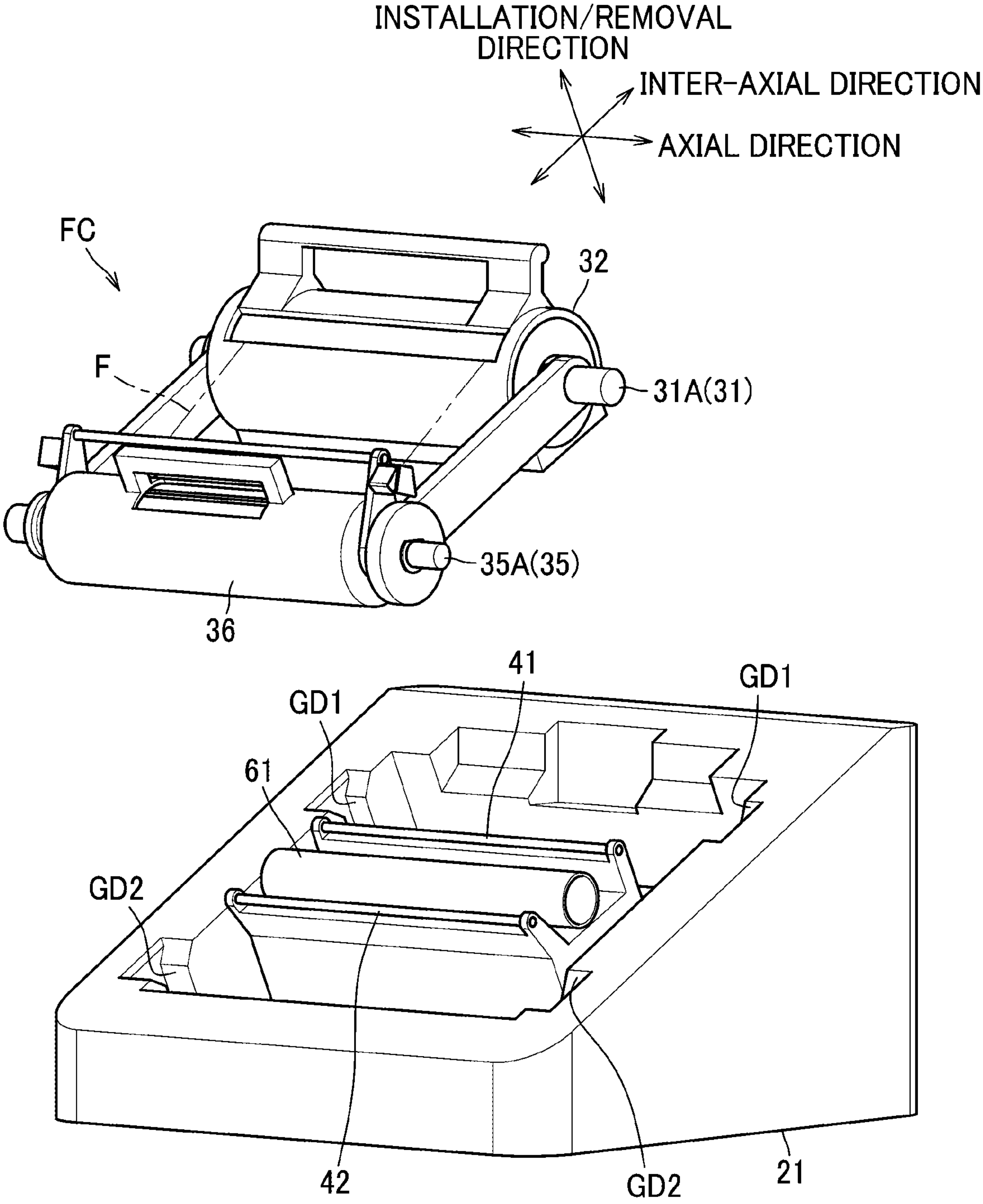
FIG. 5 is a perspective view of the layer transfer film cartridge and a housing main body.

As shown in FIG. 5, the housing main body 21 includes a first guide GD1 and a second guide GD2. The first guide GD1 is a groove that guides the supply shaft 31A of the supply reel 31 when the layer transfer film cartridge FC is installed into or removed from the housing main body 21. The first guide GD1 extends along the installation/removal direction described above (see FIG. 2) and guides the supply shaft 31A in the installation/removal direction. The first guide GD1 is provided at one end and another end of the housing main body 21 in the axial direction.

The second guide GD2 is a groove that guides the take-up shaft 35A of the take-up reel 35 when the layer transfer film cartridge FC is installed into or removed from the housing main body 21. The second guide GD2 extends along the installation/removal direction described above (see FIG. 2) and guides the take-up shaft 35A in the installation/removal direction. The second guide GD2 is provided at one end and another end of the housing main body 21 in the axial direction.

Figure 6:
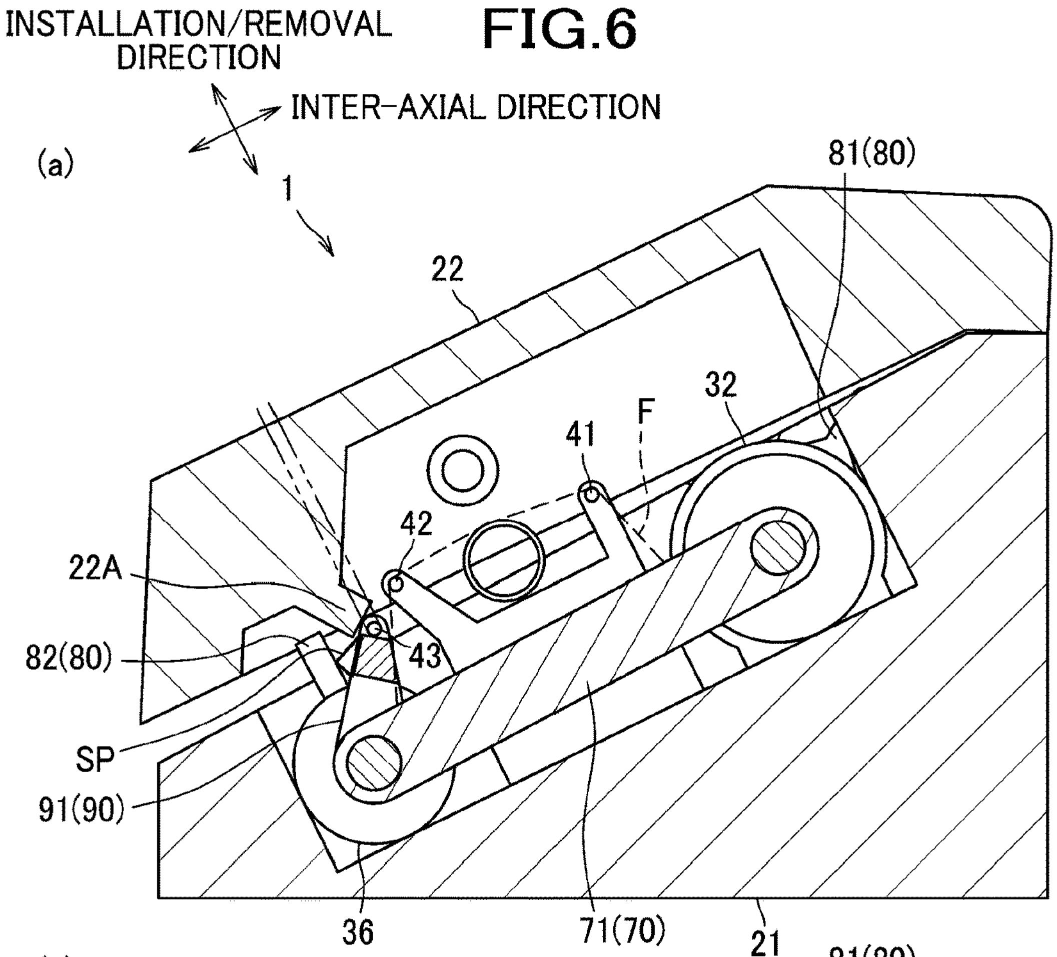
FIG. 6 includes sectional views (a), (b) showing motions of the shaft moving from a first position to a second position in conjunction with an action of closing the cover.
Figure 6:
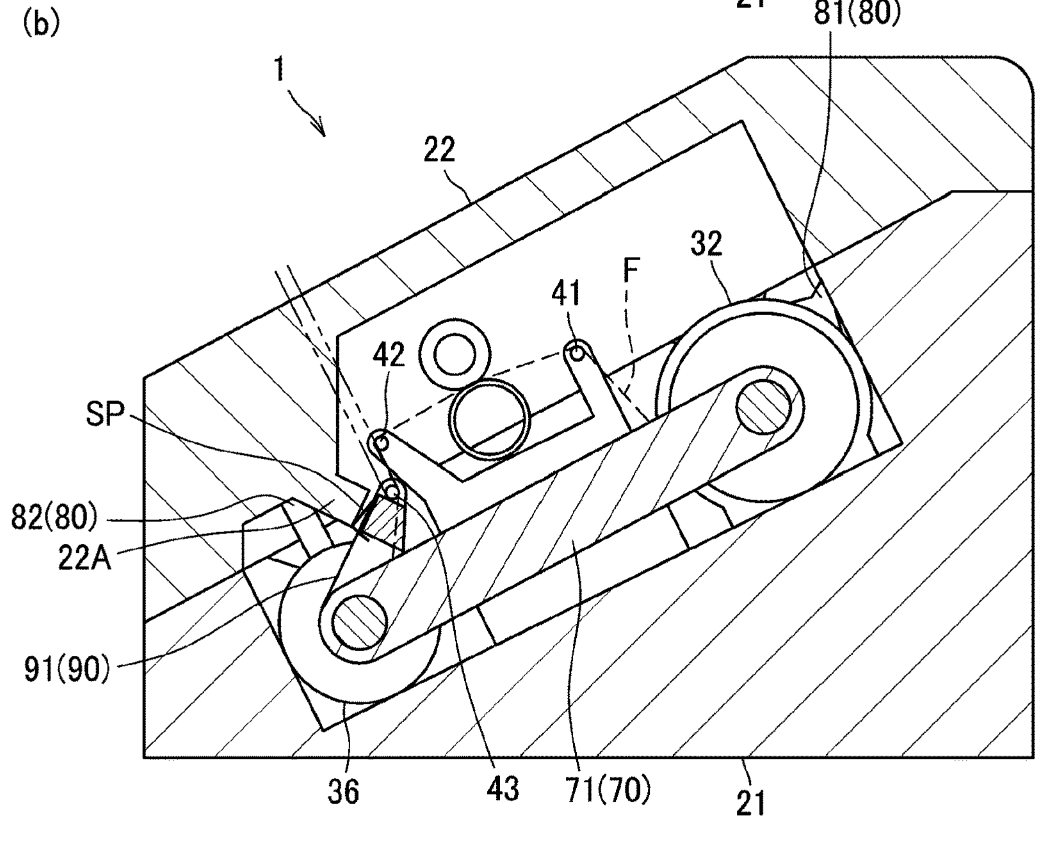

As shown in FIG. 6, the cover 22 includes lugs 22A as pressing members that press the shaft 43 from the first position shown in FIG. 6(*a*) toward the second position shown in FIG. 6(*b*). The lugs 22A are fixed to the cover 22 and press the shaft 43 from the first position toward the second position when the cover 22 is being closed. The pressing members may be the cover 22 itself, for example, lugs formed by making a part of the cover 22 protrude. In this case, the cover 22 presses the shaft 43 from the first position toward the second position via the support members 90 in the process of the cover 22 being closed.

The shaft 43 positioned in the first position does not overlap the second guide shaft 42 when projected in the installation/removal direction. As a result, when the shaft 43 is positioned in the first position, the layer transfer film cartridge FC can be installed and removed without interference of the shaft 43 with the second guide shaft 42.

The shaft 43 positioned in the second position overlaps the second guide shaft 42 when projected in the installation/removal direction. This allows the peeling angle of the multilayer film F at the second guide shaft 42 to be set at an appropriate angle.

The lugs 22A are respectively positioned at one axial end and another axial end of the shaft 43. The lug 22A at one end is located in such a position as to be contactable with the leaf spring SP provided at the first side plate 91 when the layer transfer film cartridge FC is installed in the housing main body 21. This allows the lug 22A at the one end to press the first protrusion 91B via the leaf spring SP. The lug 22A (not shown) at another end is located in such a position as to be contactable with the leaf spring SP provided at the second side plate 92 when the layer transfer film cartridge FC is installed in the housing main body 21. This allows the lug 22A at the other end to press the second protrusion 92B via the leaf spring SP. Thus, each of the lugs 22A are capable of pressing the shaft 43 via the leaf springs SP and the support members 90.

Next, the operation and advantages effects of the layer transfer device 1 of the present embodiment will be described.

As shown in FIG. 3, when a user holds the layer transfer film cartridge FC, the user can hold the layer transfer film cartridge FC in a balanced way by holding the first handle 81 with one hand and the second handle 82 with the other hand. In this condition, since the first handle 81 and the second handle 82 are positioned on the side of the multilayer film F extended and stretched between the supply reel 31 and the take-up reel 35 which is a side opposite to a side on which the imaginary plane FF is positioned, the user can hold the first handle 81 and the second handle 82 without touching the multilayer film F.

As shown in FIG. 5, when the user grasps the handle 80 and installs the layer transfer film cartridge FC into the housing main body 21 from above, the multilayer film F extended between the supply case 32 and the take-up case 36 contacts the first guide shaft 41 and the second guide shaft 42 of the housing main body 21. After that, as the layer transfer film cartridge FC is moved further toward the installation position, the multilayer film F is extended, as shown in FIG. 6(*a*), between adjacent members of the supply case 32, the first guide shaft 41, the second guide shaft 42, and the take-up case 36.

After the layer transfer film cartridge FC is installed in the housing main body 21, as the cover 22 is being closed, the lugs 22A contact the leaf springs SP. After that, as the user is further closing the cover 22, the lugs 22A press the shaft 43 from the first position toward the second position via the leaf springs SP and the support members 90.

The shaft 43 contacts the multilayer film F extended and stretched between the second guide shaft 42 and the take-up case 36 before reaching the second position. After that, as the user is further closing the cover 22, the shaft 43 presses the multilayer film F extended and stretched between the second guide shaft 42 and the take-up case 36 toward the supply case 32 and then reaches the second position.

When the shaft 43 is positioned in the second position, rotation of the support members 90 is limited by a restriction portion (not shown), thus as the user is further closing the cover 22, the leaf springs SP are compressed between the lugs 22A and the support members 90.

In this way, when the cover 22 is completely closed, as shown in FIG. 6(*b*), the biasing force of the leaf springs SP can be transmitted to the multilayer film F via the support members 90 and the shaft 43, whereby an appropriate tension can be applied to the multilayer film F.

When removing the layer transfer film cartridge FC from the housing main body 21, the user, after opening the cover 22, moves the shaft 43 from the second position to the first position by rotating the support members 90 by his/her hand. After that, the user can easily remove the layer transfer film cartridge FC from the housing main body 21 by holding the first handle 81 and the second handle 82 and drawing out the layer transfer film cartridge FC in the installation/removal direction.

Although the support members 90 are manually rotated to move the shaft 43 from the second position to the first position in the present embodiment, a spring that biases the shaft 43 from the second position to the first position may, for example, be provided between the support members 90 and the connecting portions 70 or between the support members 90 and the take-up case 36.

According to the above, the following advantageous effects may be obtained by the present embodiment.

Since the user can grasp the handle 80 by hooking his/her finger on the handle 80, the user can easily perform an installation/removal procedure of the layer transfer film cartridge FC even if the layer transfer film cartridge FC is heavy. Since the handle 80 is positioned on the side of the multilayer film F extended and stretched between the supply reel 31 and the take-up reel 35 which is a side opposite to a side on which the imaginary plane FF is positioned, it is possible to keep the user from touching the multilayer film F.

Since the layer transfer film cartridge FC includes the first handle 81 and the second handle 82 positioned apart from the first handle 81, the user can hold a relatively heavy layer transfer film cartridge FC more steadily.

Since the shaft 43 can be moved relative to the connecting portions 70, the shaft 43 can be kept from interfering with the second guide shaft 42 during installation and removal of the layer transfer film cartridge FC. Accordingly, flexibility in design can be increased.

Since the shaft 43 is movable from the first position to the second position by the lugs 22A, layer transfer performed at an improper peeling angle with the shaft 43 still in the first position can be restrained.

Since the lugs 22A move the shaft 43 to the second position when the cover 22 is closed, layer transfer performed at an improper peeling angle with the shaft 43 still in the first position can be further restrained.

Since the lugs 22A are respectively positioned at one axial end and another axial end of the shaft 43, the shaft 43 can be pressed in a balanced way.

It is to be understood that the first embodiment can be used in various embodiments as exemplified below. In the following description, members with structures approximately the same as the above-described embodiment are identified by the same reference characters, and explanation thereof is omitted.

Figure 7:
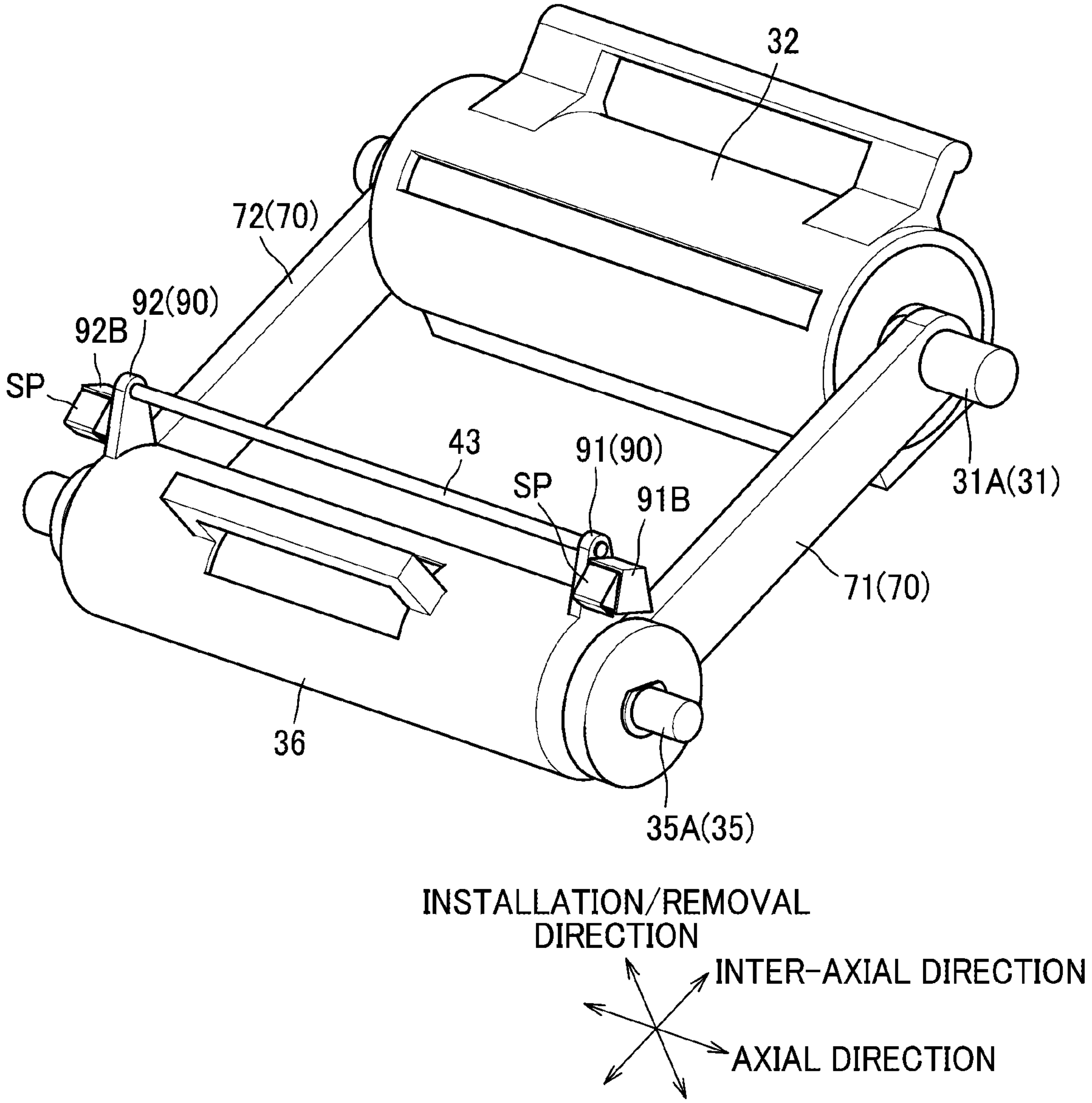
FIG. 7 is a perspective view showing the layer transfer film cartridge according to a first modification.

Although the support members 90 are rotatable independently (asynchronously) from the take-up case 36 in the first embodiment, the support members 90 may, for example, as shown in FIG. 7, be fixed to the take-up case 36. In such a structure, the take-up case 36 is not fixed to the connecting portions 70, but rotatably fixed to the take-up shaft 35A of the take-up reel 35. In other words, the support members 90 are rotatably connected to the take-up reel 35 by being fixed to the take-up case 36. The rotational range of the take-up case 36 is limited by a restriction portion (not shown).

Figure 8:
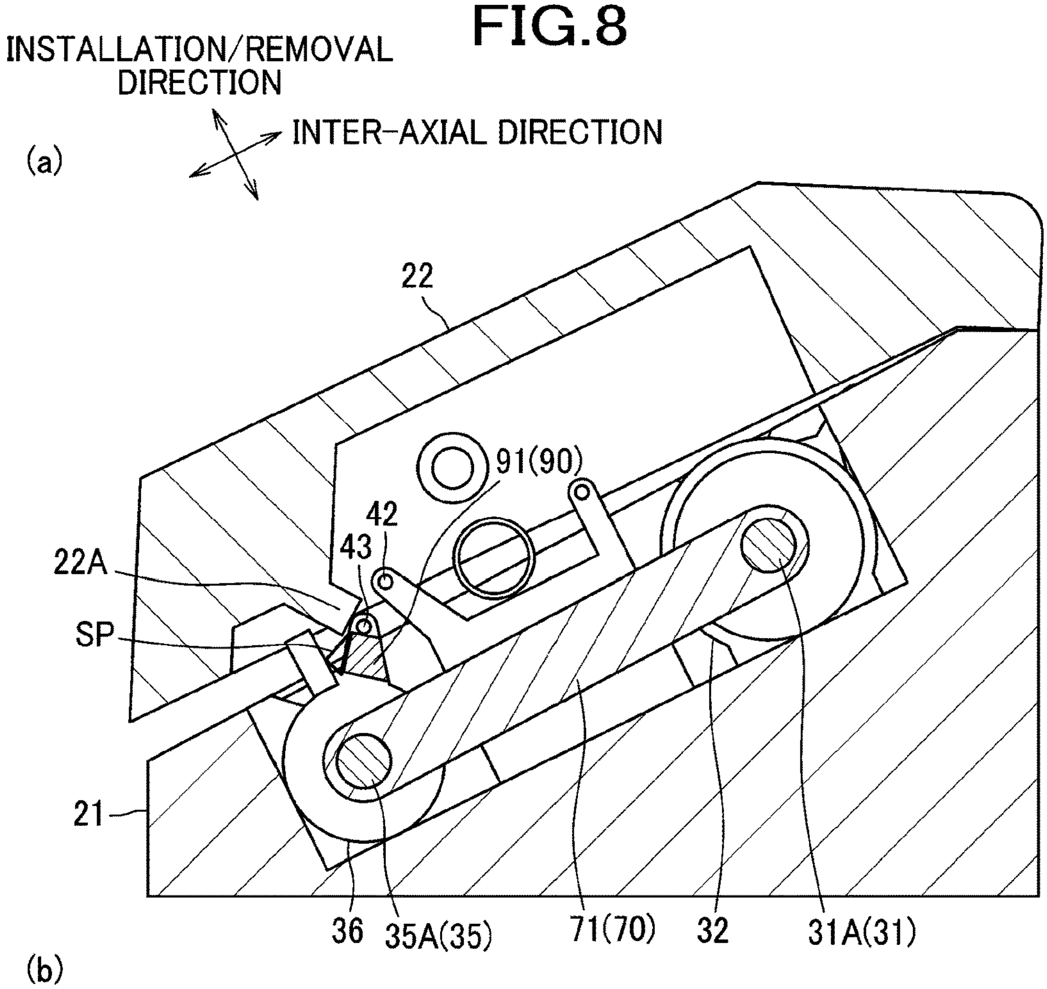
FIG. 8 includes sectional views (a), (b) of a layer transfer device according to the first modification.
Figure 8:
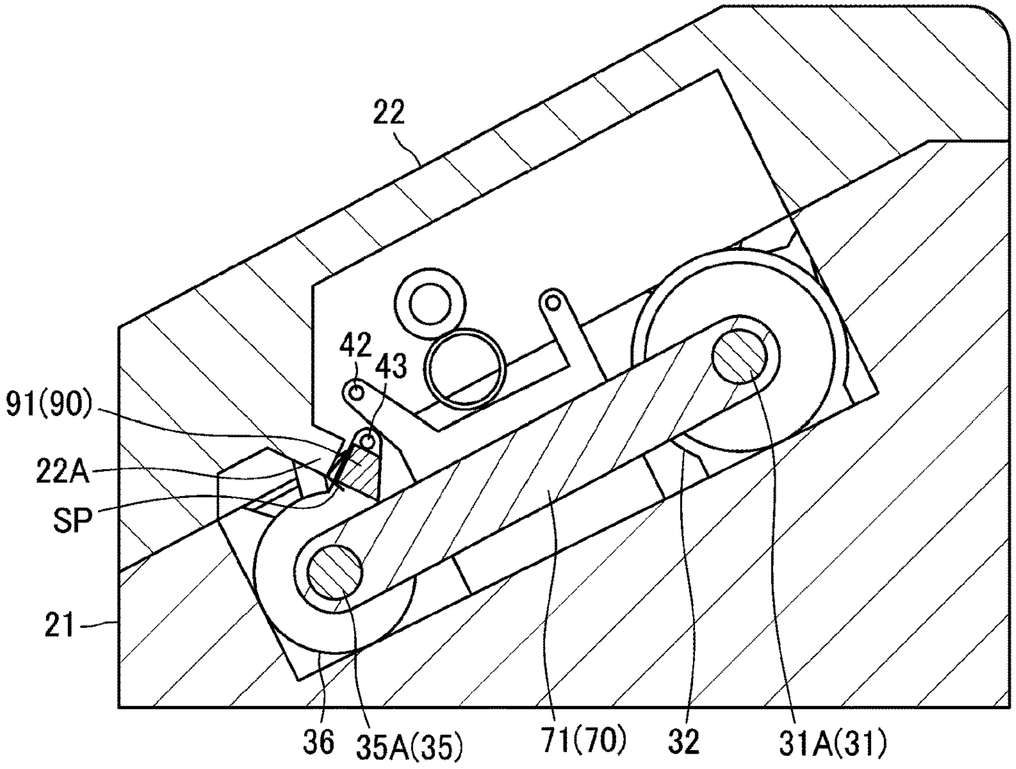

According to this configuration, the support members 90 are formed integrally with the take-up case 36. In other words, according to this configuration, the take-up case 36 includes a first side plate 91 protruding from one end in the second axial direction, and supporting one axial end of the shaft 43, and a second side plate 92 protruding from the other end in the second axial direction, and supporting another axial end of the shaft 43. According to this configuration, the support members 90 rotating together with the take-up case 36 allow the shaft 43 to move between the first position shown in FIG. 8(*a*) and the second position shown in FIG. 8(*b*) closer than the first position to the supply reel 31. More specifically, when the lugs 22A of the cover 22 contact the leaf springs SP as the cover 22 is being closed, as shown in FIG. 8(*a*), the lugs 22A press the support members 90 via the leaf springs SP, causing the support members 90 to rotate together with the take-up case 36 relative to the connecting portions 70. This causes the shaft 43 to move from the first position to the second position shown in FIG. 8(*b*). According to this configuration, advantageous effects similar to those of the first embodiment may be obtained.

Figure 9:
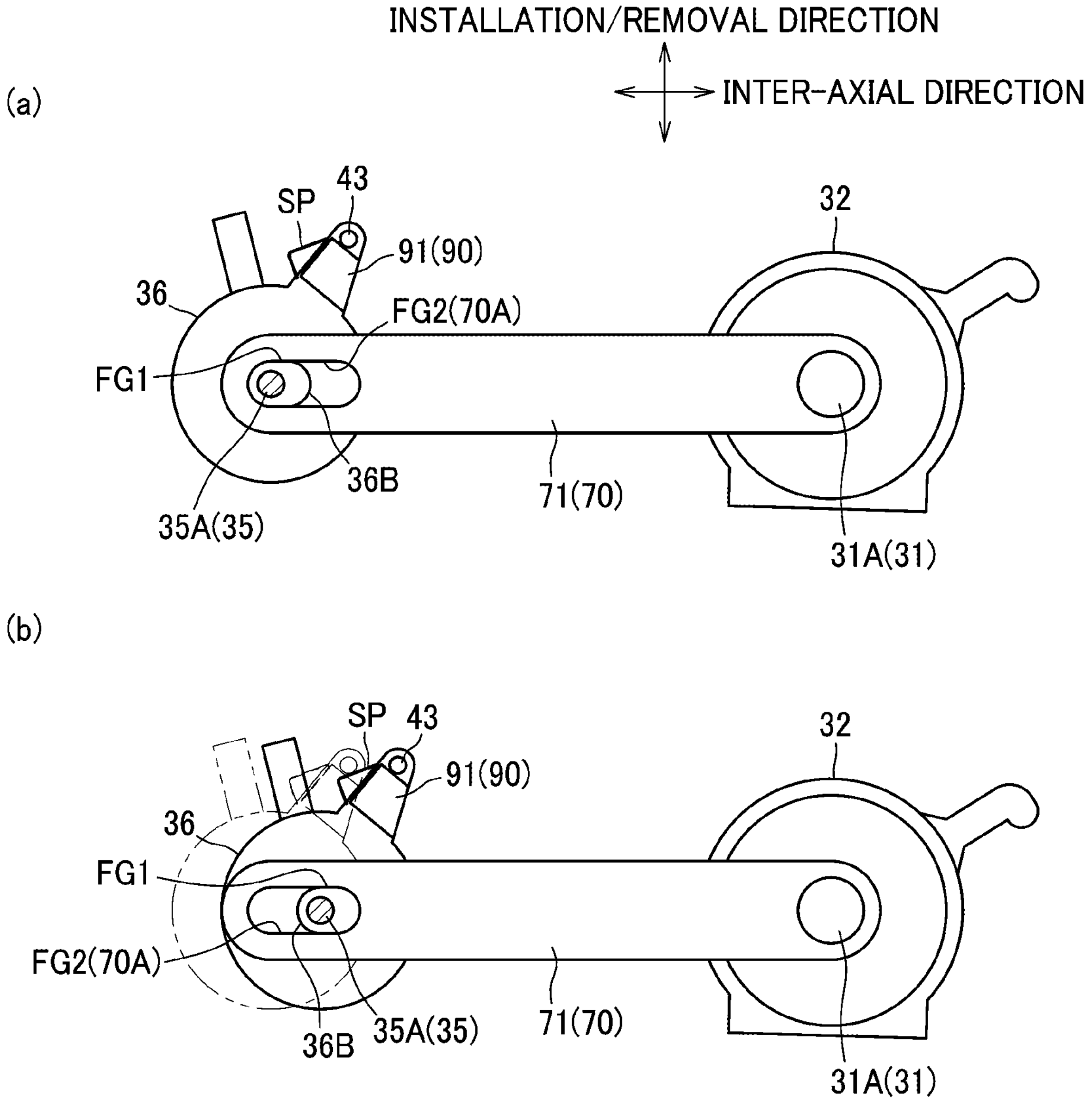
FIG. 9 includes side views (a), (b) of a layer transfer film cartridge according to a second modification.

Although the support members 90 are configured to be rotatable in the first embodiment, the support members 90 may, for example, as shown in FIG. 9, be configured to be movable in the inter-axial direction. Specifically, in this structure, the support members 90 are fixed to the take-up case 36, more specifically, formed integrally with the take-up case 36. Further, the take-up case 36 is supported by the connecting portions 70 movably in the inter-axial direction.

This structure will be described in detail in below. In the following description, only a structure at one end of the take-up case 36 will be described, and a description of a structure at the other end which will be configured similar to the structure at the one end of the take-up case 36 will be omitted as appropriate.

The take-up case 36 includes guided portions 36B which protrude outward from both end surfaces in the axial direction. Each guided portion 36B has a first flat surface FG1 extending along the axial direction and the inter-axial direction. The take-up shaft 35A of the take-up reel 35 is rotatably supported by the take-up case 36.

The first connecting portion 71 has a guide hole 70A supporting the guided portion 36B at one end of the take-up case 36 and movably in the inter-axial direction. The guide hole 70A is an example of a restriction portion and restricts the moving range of the shaft 43 in a range from the first position to the second position. The guide hole 70A has a second flat surface FG2 that is in contact with the first flat surface FG1 of the guided portion 36B.

According to this configuration, the support members 90 allowed to slide together with the take-up case 36 in the inter-axial direction causes the shaft 43 to move between the first position shown in FIG. 9(*a*) and the second position shown in FIG. 9(*b*) closer than the first position to the supply reel 31. Specifically, when the lugs provided at the cover contact the leaf springs SP, as the cover 22 is being closed, the lugs 22A press the support members 90 via the leaf springs SP causing the support members 90 move together with the take-up case 36 in the inter-axial direction relative to the connecting portions 70. This causes the shaft 43 to move from the first position to the second position shown in FIG. 9(*b*). According to this configuration, advantageous effects similar to those achieved in the first embodiment may be obtained.

Figure 10:
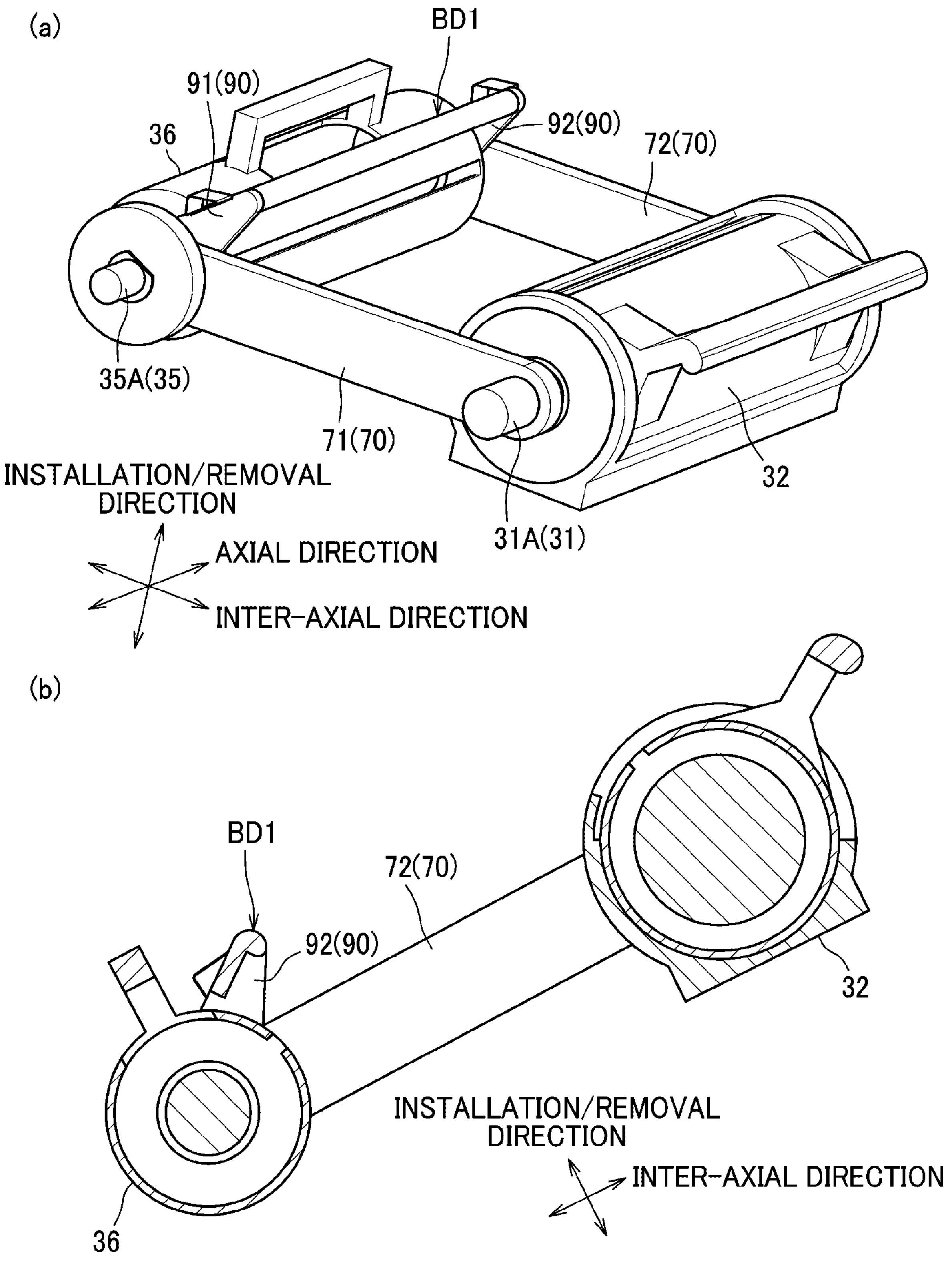
FIG. 10 includes a perspective view (a) and a sectional view (b) of a layer transfer film cartridge according to a third modification.
Figure 11:
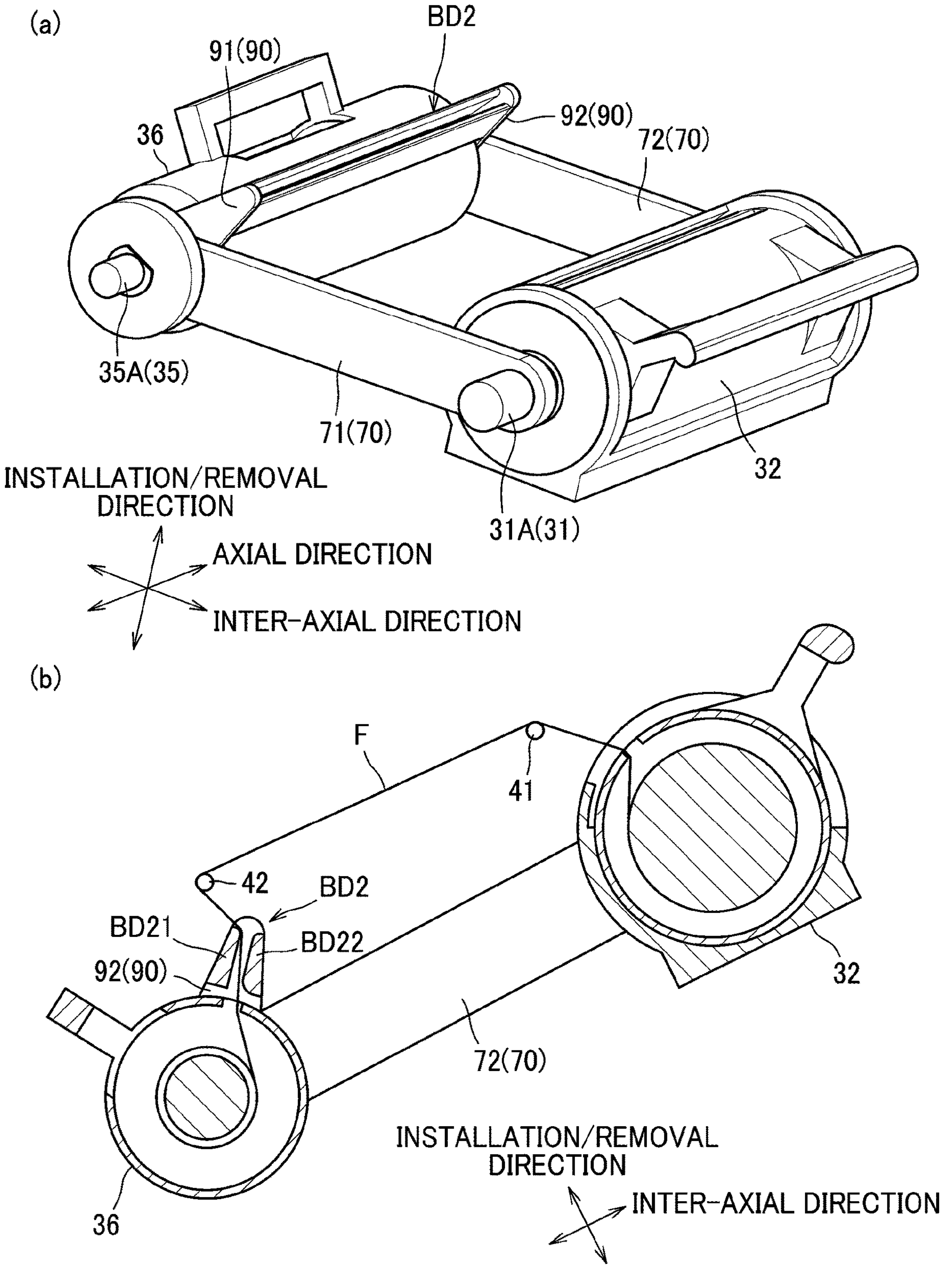
FIG. 11 includes a perspective view (a) and a sectional view (b) of a layer transfer film cartridge according to a fourth modification.

Although the cylindrical shaft 43 is given as an example of a film guide member in the first embodiment, the film guide member may, for example, be a plate-shaped blade BD1 as shown in FIG. 10(*a*) and FIG. 10(*b*). Further, it may also be, for example, a flat tube-shaped blade BD2 as shown in FIG. 11(*a*) and FIG. 11(*b*). The blade BD2 has a hole for passing the multilayer film F therethrough. In other words, the blade BD2 has a first wall BD21 opposed to the first surface FA of the multilayer film F (see FIG. 1) and a second wall BD22 opposed to the second surface FB of the multilayer film F (see FIG. 1). For example, in the layer transfer film cartridge FC removed from the housing main body 21, the multilayer film F extended over the supply reel 31 and the take-up reel 35 may not be stretched and may be hanging down to some extent. In such a case, the multilayer film F contacts the second wall BD22 and does not contact the first wall BD21. On the other hand, in the layer transfer film cartridge FC installed in the housing main body 21, for example, during execution of layer transfer, the multilayer film F extended over the supply reel 31 and the take-up reel 35 is stretched between the first guide shaft 41, the second guide shaft 42 and the blade BD2. At this point, the multilayer film F contacts the first wall BD21 and does not contact the second wall BD22. In other words, the first wall BD21 may assume an in-contact state or an out-of-contact state with the multilayer film F extended over the supply reel and the take-up reel 35. The first wall BD21 contacts the multilayer film F guided by the second guide shaft 42 and changes a traveling direction of the multilayer film F.

Although the leaf springs SP are provided at the support members 90 in the first embodiment, such leaf springs need not be provided. In this case, a configuration may be provided in which the support members 90 are directly pressed by the lugs 22A shown in FIG. 6. Further, leaf springs may be provided at the tips of the lugs 22A.

Although the connecting portions 70 are configured by two connecting portions 71, 72 in the first embodiment, one connecting portion (for example, only the first connecting portion) may be provided. Further, the connecting portion may be configured otherwise as long as it connects the supply unit and the take-up unit and may, for example, be a member that connects the supply case and the take-up case.

Although a device for transferring a transfer layer onto a toner image formed on a sheet S is given as an example of a layer transfer device in the first embodiment, the layer transfer device may, for example, be a device for transferring a transfer layer onto an ink image formed on a sheet, or a device for transferring a transfer layer onto a sheet by a thermal head.

Although the transfer layer F22 containing foil is given as an example in the first embodiment, the transfer layer may, for example, not contain foil or colorant and may be formed of a thermoplastic resin.

Although the multilayer film F is formed of four layers in the first embodiment, the multilayer film may have any number of layers as long as it includes a transfer layer and a supporting layer.

The connecting portions may be indirectly connected to the supply reel or the take-up reel via the supply case or the take-up case, by being integrally formed with the supply case or the take-up case. The connecting portions need not be formed in shapes of plates but may be formed in shapes of rods fixed to the supply case and the take-up case. The connecting portions may be made of plastic or metal. The support members may be rotatably connected to the connecting portions.

The structure for fixing the take-up case or the supply case to the connecting portions may be any structure. For example, the take-up case and the supply case may be directly fixed to the connecting portions. Further, for example, the connecting portions 91, 92 and the take-up case 36, shown in FIG. 4(*b*), may be connected by a hollow member so that the take-up case 36 does not rotate relative to the connecting portions 91, 92, and an end of the take-up shaft 35A of the take-up reel 35 may be passed through the hollow member and connected with a take-up gear 35C or the like. In this case, the take-up reel 35 is rotatably supported by the hollow member.

The structure for restricting rotation of the shaft may be any structure. For example, the structure may be a structure such as described below. As a premise for the structure described below, it is assumed that a torque is applied to the supply reel by friction whereby it is hard to draw out the multilayer film from the supply case. Further, it is assumed that a motor torque is applied to the take-up reel. In this case, if the support members 90 rotate in the clockwise direction of FIG. 4(*a*), when the shaft 43 contacts the multilayer film F, the shaft 43 receives a reaction force from the tension of the multilayer film F and is restrained from rotating. On the other hand, if the support members 90 rotate in a counterclockwise direction, the shaft 43 contacts the handle 82 and is restrained from rotating.

If the shaft 43 (take-up case 36) rotates in the clockwise direction of FIG. 8, when the shaft 43 contacts the multilayer film F, the shaft 43 receives a reaction force from the tension of the multilayer film F and its rotation is restricted. On the other hand, if the shaft 43 (take-up case 36) rotates in a counterclockwise direction, the tension in the multilayer film F restricts its rotation at the point where there is no more sag in the multilayer film F.

Figure 12:
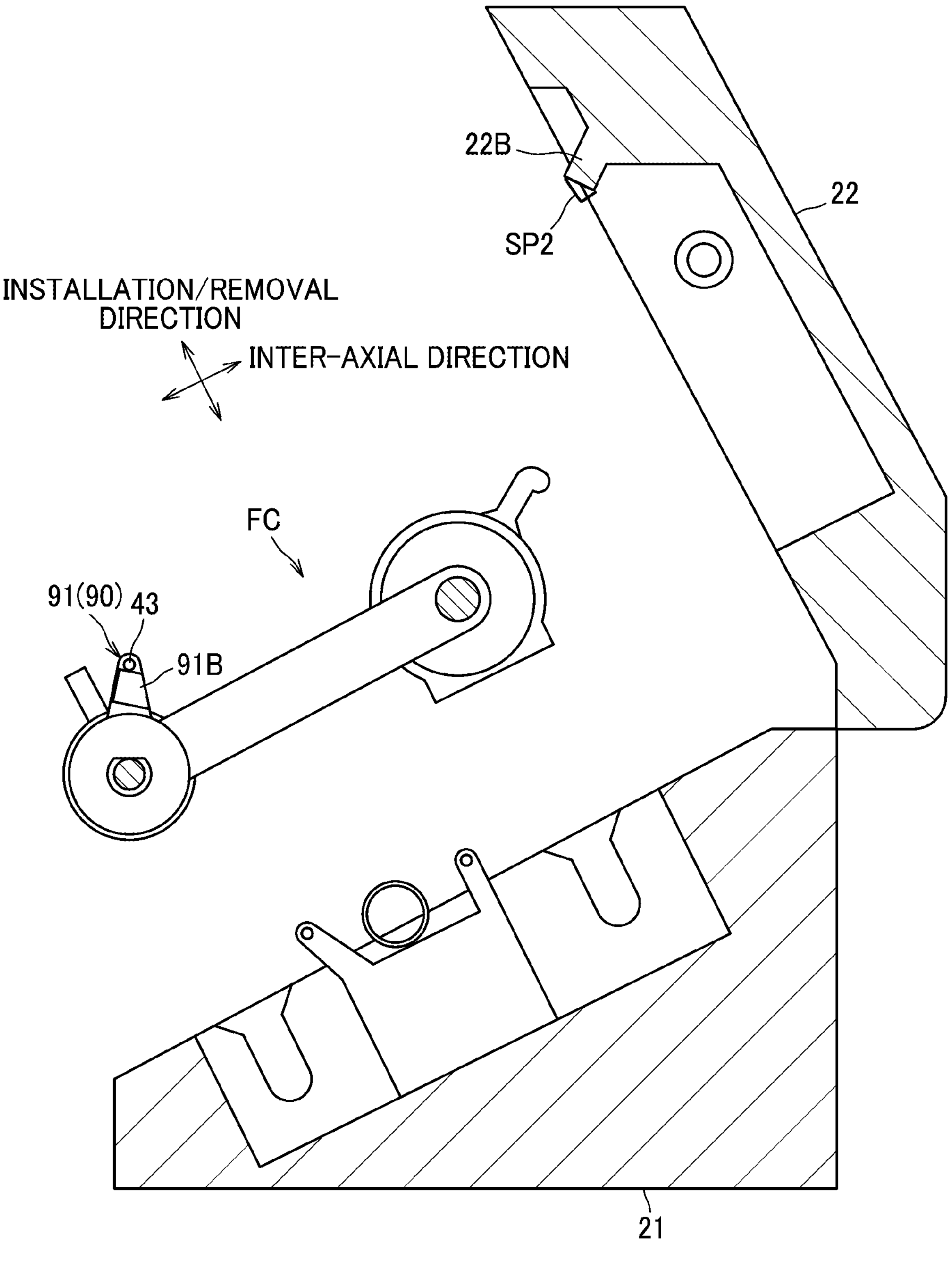
FIG. 12 is a sectional view of a pressing member according to a fifth modification.

Although the cover 22 including the lug 22A is given as an example of a pressing member in the first embodiment, the pressing member may, for example, as shown in FIG. 12, be a leaf spring SP2 as an example of a third spring. Specifically, according to this configuration, a convex portion 22B with the same shape as that of the lug 22A of the first embodiment is formed in the cover 22, and a leaf spring SP2 similar to the leaf spring SP of the first embodiment is provided at the tip of the convex portion. It is to be understood that the portion on which the leaf spring SP2 is provided need not be limited to the convex portion but may, for example, be a planer portion of the he cover 22. The layer transfer film cartridge FC has a structure in which the leaf spring SP is removed from the structure of the first embodiment.

According to this configuration, when the cover 22 is being closed, the leaf spring SP2 provided at the cover 2 presses the protrusions 91B, 92B of the support members 90, and thus the shaft 43 can be moved from the first position to the second position as is the case with the first embodiment, to apply an appropriate tension on the multilayer film F. The spring is not limited to the leaf spring SP2 and may be a coil spring, a torsion spring, or a wire spring, etc.

Figure 13:
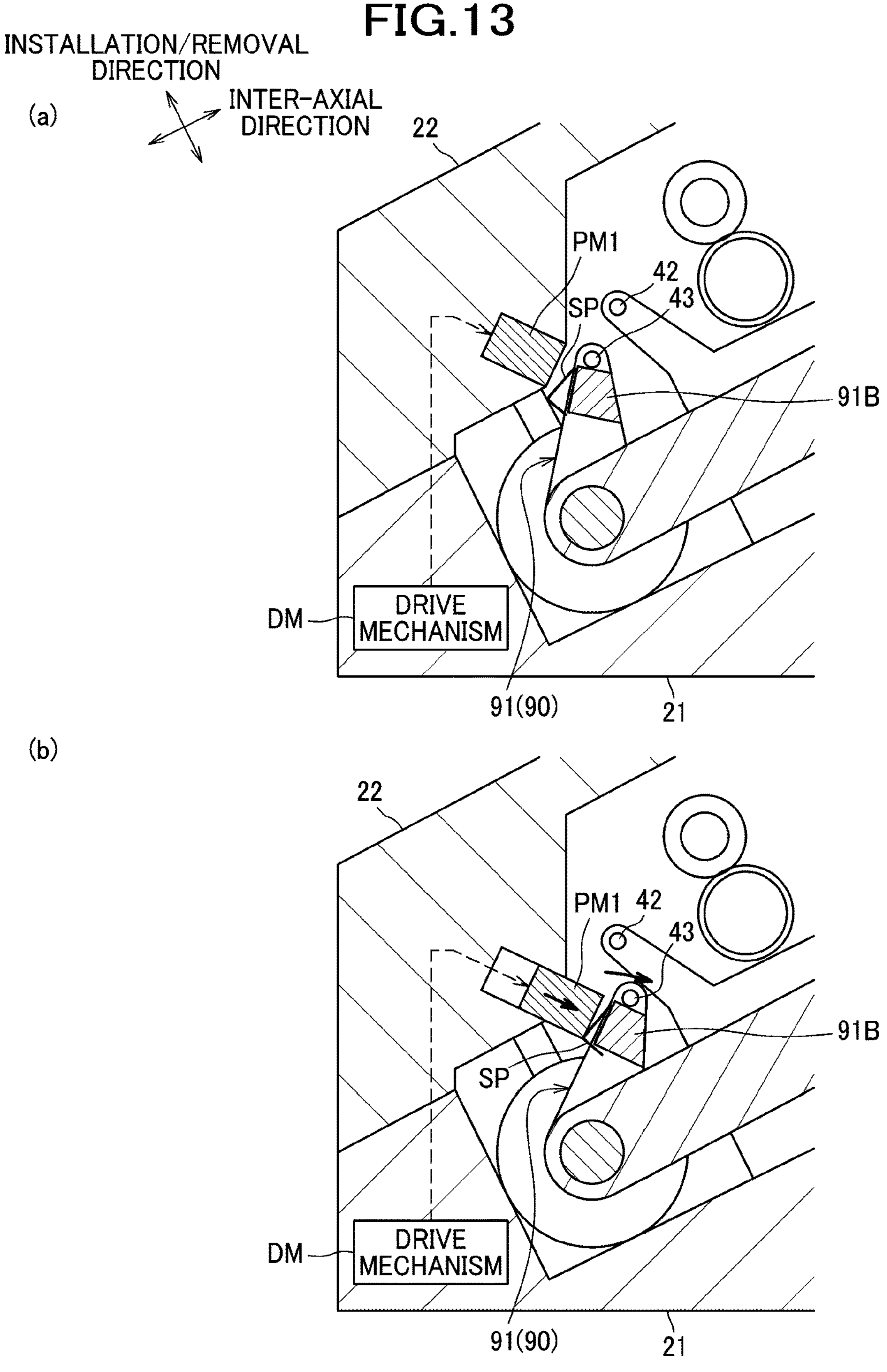
FIG. 13 includes sectional views (a), (b) of a pressing member according to a sixth modification.

As shown in FIG. 13, the pressing member PM1 may be configured to be movable forward and backward by a driving force of a drive mechanism DM. Specifically, in this embodiment, the pressing member PM1 is movable between a retracted position shown in FIG. 13(*a*) and a pressing positon shown in FIG. 13(*b*). The pressing member PM1 is movably supported by the cover 22.

The drive mechanism DM is a mechanism for actuating the pressing member PM1 and is provided at the housing main body 21. The drive mechanism DM comprises a drive source such as a motor or the like for producing a driving force, and a plurality of gears for transferring the driving force to the pressing member PM1. According to this configuration, the pressing member PM1 can be moved forward and backward even if the cover 22 is closed. Therefore, for example, a controller (not shown), upon receiving a layer transfer command, can cause the drive mechanism DM to move the pressing member PM1 from a retracted position to a pressing position and move the shaft 43 from the first position to the second position. On the other hand, for example, when layer transfer is finished, the controller causes the drive mechanism DM to move the pressing member PM1 from the pressing position to the retracted position. Further, for example, a sensor for detecting the closing of the cover 22 may be provided and the controller may actuate the drive mechanism DM to move the pressing member PM1 from the retracted position to the pressing position when the sensor detects that the cover 22 is closed.

The drive mechanism DM may, for example, be a gearing mechanism consisting of a plurality of gears that transmit, to the pressing member PM1, a force applied to the cover when the cover is closed. Specifically, the drive mechanism DM may be configured as a gearing mechanism connecting a gear fixed to a rotation shaft of the cover 22 and the pressing member PM1. In this case, the shaft 43 can be moved from the first position to the second position in conjunction with the closing action of the cover 22.

Figure 14:
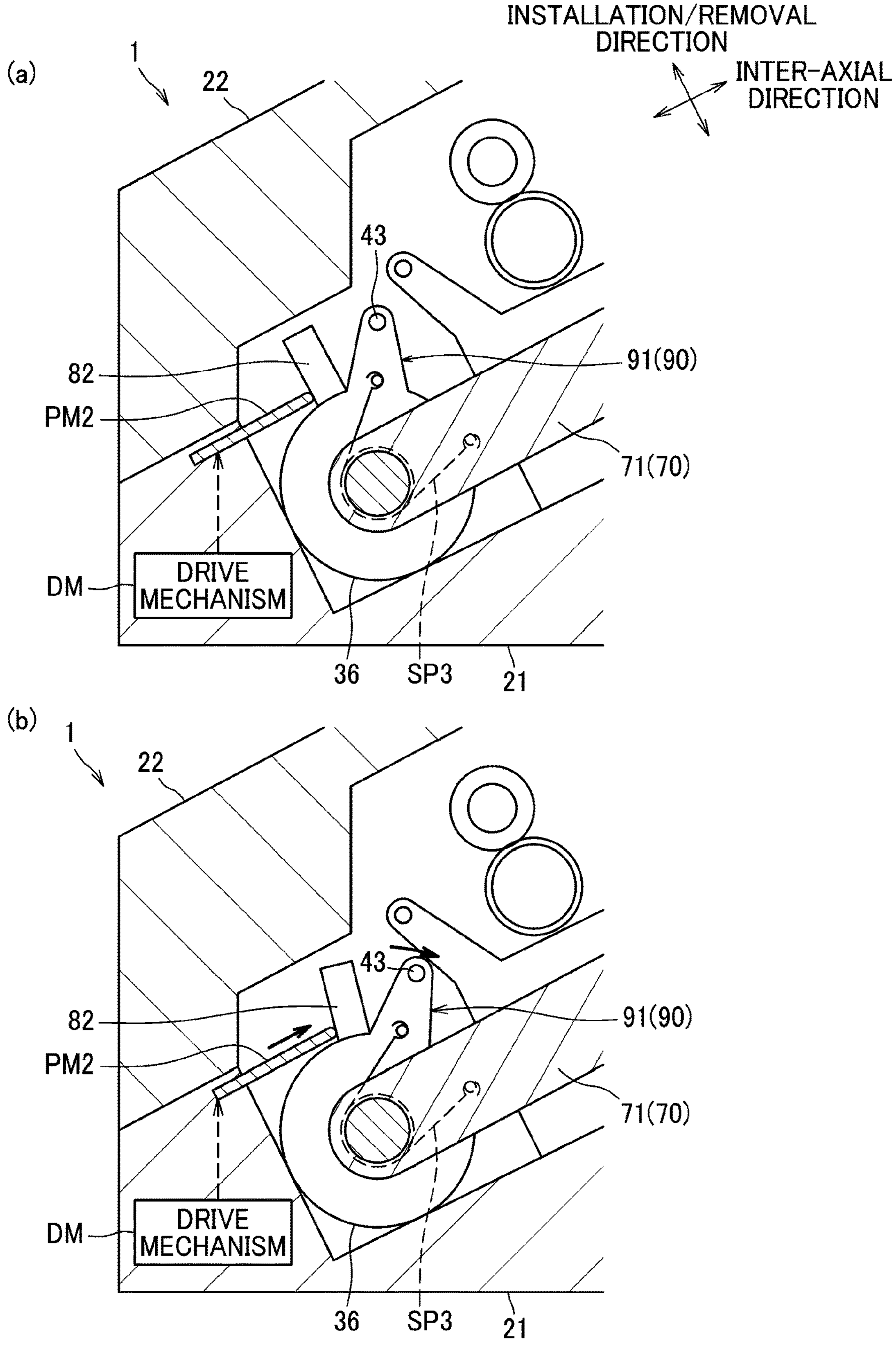
FIG. 14 includes sectional views (a), (b) of a pressing member according to a seventh modification.

Although the support members 90 are configured to be rotatable independently (asynchronously) from the take-up case 36 in the first embodiment, the support members 90 may, for example, as shown in FIG. 14, be fixed to the take-up case 36, more specifically, formed integrally with the take-up case 36. In such a structure, the take-up case 36 is not unrotatably engaged with or fixed to the connecting portions 70, but rotatable relative to the connecting portions 70 by being rotatably supported by the take-up shaft 35A of the take-up reel 35. The rotational range of the take-up case 36 is restricted by a restriction member (not shown). According to this configuration, since the support members 90 rotate together with the take-up case 36, the shaft 43 can be rotated between the first position shown in FIG. 14(*a*) and the second position shown in FIG. 14(*b*) closer than the first position to the supply reel 31. Further, according to this configuration, the pressing member PM2 presses the second handle 82 of the take-up case 36 and thereby presses the shaft 43 via the second handle 82, the take-up case 36 and the support members 90.

Specifically, the pressing member PM2 is movable between a retracted position shown in FIG. 14(*a*) and a pressing position shown in FIG. 14(*b*). The pressing member PM2 is movably supported by the housing main body 21. Further, a drive mechanism DM for applying a driving force to the pressing member PM2 is provided at the housing main body 21. According to this configuration, an advantageous effect similar to that of the configuration shown in FIG. 13 may be obtained.

As shown in FIG. 14, the layer transfer device 1 may further comprise a fourth spring SP3 for biasing the shaft 43 from the second position toward the first position. Specifically, in the configuration shown in FIG. 14, the fourth spring SP3 is a torsion spring. One end of the fourth spring SP3 is engaged with a portion of the support member 90. The other end of the fourth spring SP3 is engaged with a portion of the connecting portion 70.

According to this, when the pressing member PM2 presses the shaft 43 via the second handle 82, etc., as shown in FIG. 14(*b*), the shaft 43 moves from the first position to the second position against the biasing force of the fourth spring SP3. Then, as shown in FIG. 14(*a*), for example, if the controller (not shown) controls the drive mechanism DM to release the pressing force applied to the shaft 43 by the pressing member PM2 when layer transfer is finished, the shaft 43 moves from the second position to the first position by the biasing force of the fourth spring SP3. As a result, upon removal of the layer transfer film cartridge FC, the shaft 43 will be located in a position out of the way of removal of the layer transfer film cartridge FC, thus the procedure of removing the layer transfer film cartridge FC may be easily performed.

A detailed description will be given of a second embodiment of the present invention with reference made to the drawings where appropriate. Although the second embodiment has a structure somewhat different from that of the first embodiment, since the structure thereof is basically approximately the same, the approximately same members are identified by the same reference characters and explanation thereof is omitted as appropriate.

Figure 15:
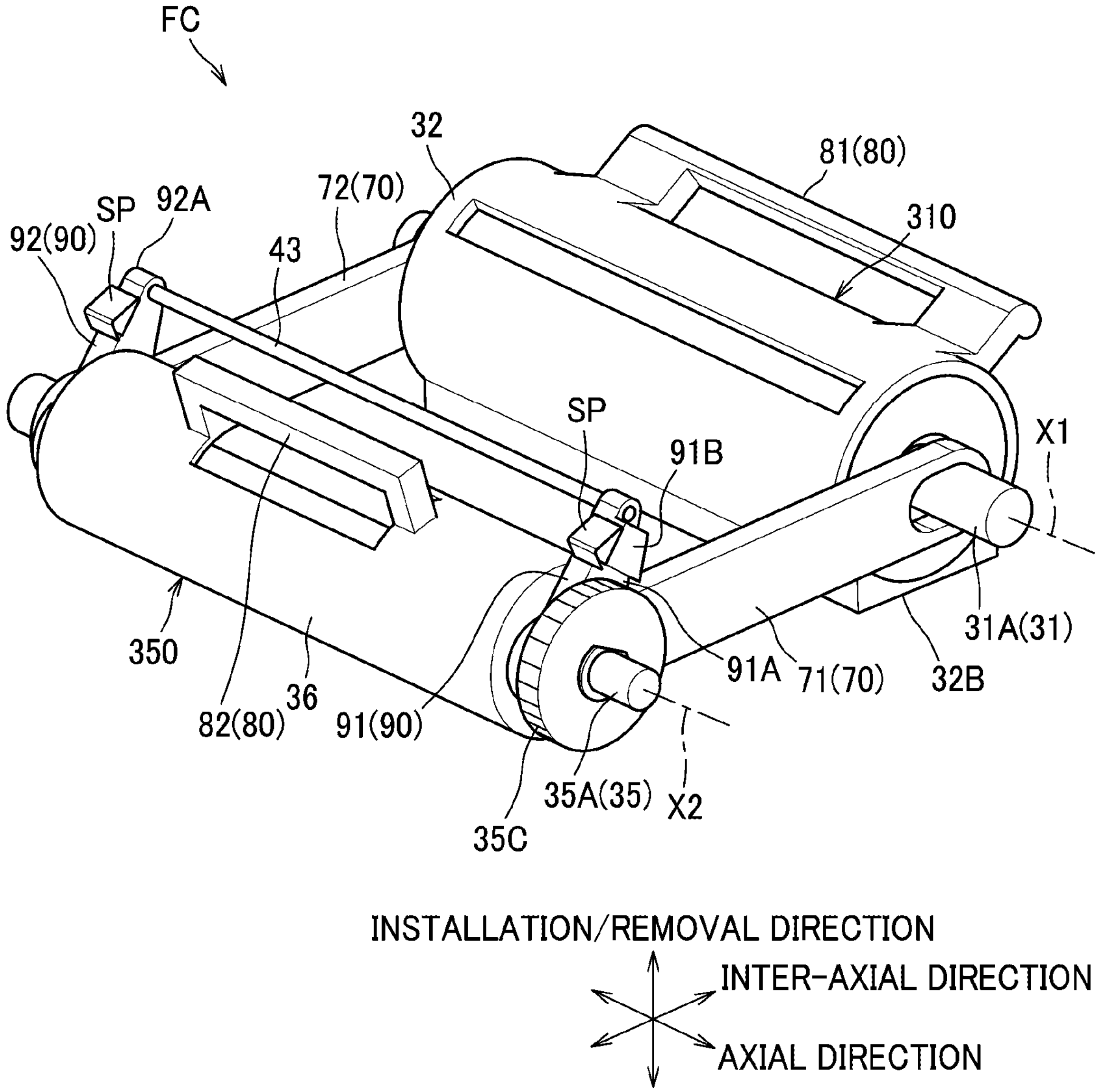
FIG. 15 is a perspective view of the layer transfer film cartridge according to a second embodiment of the present invention.

As shown in FIG. 15, a supply case 32 is restrained from rotating by connecting portions 70, and supported by the connecting portions 70 movably in the inter-axial direction along a straight line connecting a rotation axis X1 of a supply reel 31 and a rotation axis X2 of a take-up reel 35. The supply reel 31 is rotatably supported by the supply case 32 and the connecting portions 70.

A take-up case 36 is restrained from rotating by the connecting portions 70, and supported by the connecting portions 70 movably in the inter-axial direction.

Figure 16:
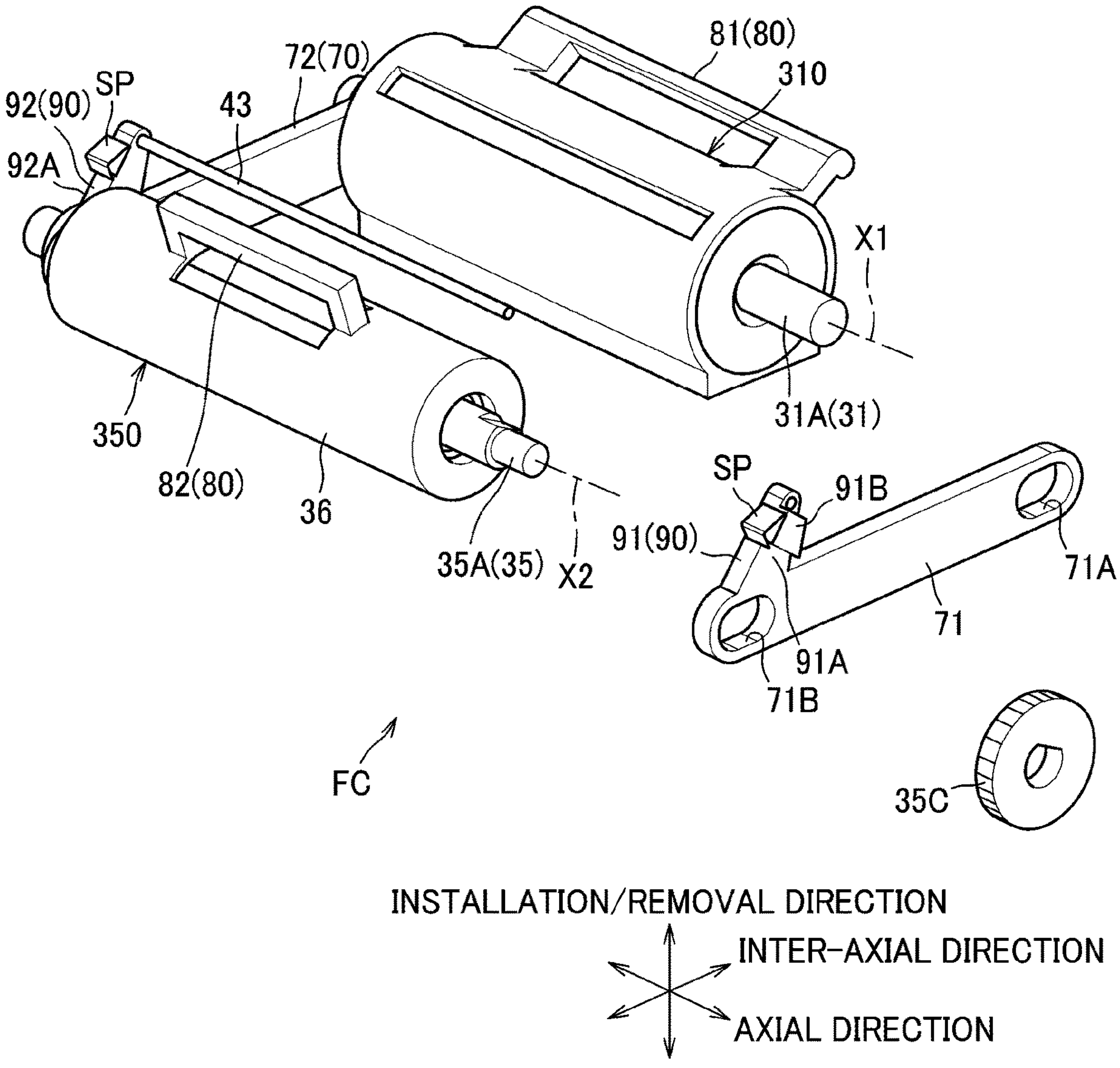
FIG. 16 is a perspective view showing the layer transfer film cartridge as disassembled.

As shown in FIG. 16, a first connecting portion 71 is movable relative to the take-up reel 35 and the supply reel 31 in the inter-axial direction. More specifically, the first connecting portion 71 has a first long hole 71A and a second long hole 71B. The first long hole 71A is a long hole elongate in the inter-axial direction and engaged with a supply shaft 31A of the supply reel 31, and is formed on one end of the first connecting portion 71 in the inter-axial direction. The second long hole 71B is a long hole elongate in the inter-axial direction and engaged with a take-up shaft 35A of the take-up reel 35, and is formed on the other end of the first connecting portion 71 in the inter-axial direction A second connecting portion 72 is movable in the inter-axial direction relative to the take-up reel 35 and the supply reel 31. More specifically, the second connecting portion 72 has long holes similar to the long holes 71A, 71B formed in the first connecting portion 71.

Support members 90 are members that support a shaft 43. The support members 90 include a first side plate 91 and a second side plate 92. The first side plate 91 is a plate-shaped member integrally provided with the first connecting portion 71 at the end of the first connecting portion 71 in which the second long hole 71B is formed, and is movable in the inter-axial direction together with the first connecting portion 71. The second side plate 92 is a plate-shaped member integrally provided with the second connecting portion 72 at the end of the second connecting portion 72 in which the second long hole is formed, and is movable in the inter-axial direction together with the second connecting portion 72. The first side plate 91 and the second side plate 92 are formed in near-fan shapes tapering toward an outer side of the take-up reel 35 in the radial direction.

The first side plate 91 supports one axial end of the shaft 43. The first side plate 91 includes an outer surface 91A facing away from the take-up case 36 in the axial direction, and a protrusion 91B that protrudes from the outer surface 91A.

The protrusion 91B is located between the second long hole 71B of the first connecting portion 71 and the shaft 43 in the radial direction of the take-up reel 35. A leaf spring SP is provided at the protrusion 91B of the first side plate 91. The leaf spring SP is positioned on a side of the protrusion 91B opposite to a side on which the supply reel 31 is positioned in the inter-axial direction.

The second side plate 92 supports the other end of the shaft 43 in the axial direction. The second side plate 92 includes an outer surface 92A facing away from the take-up case 36 in the axial direction, and a protrusion (not shown) that protrudes from the outer surface 92A. A leaf spring SP similar to the leaf spring SP described above is provided at the protrusion of the second side plate 92.

Figure 17:
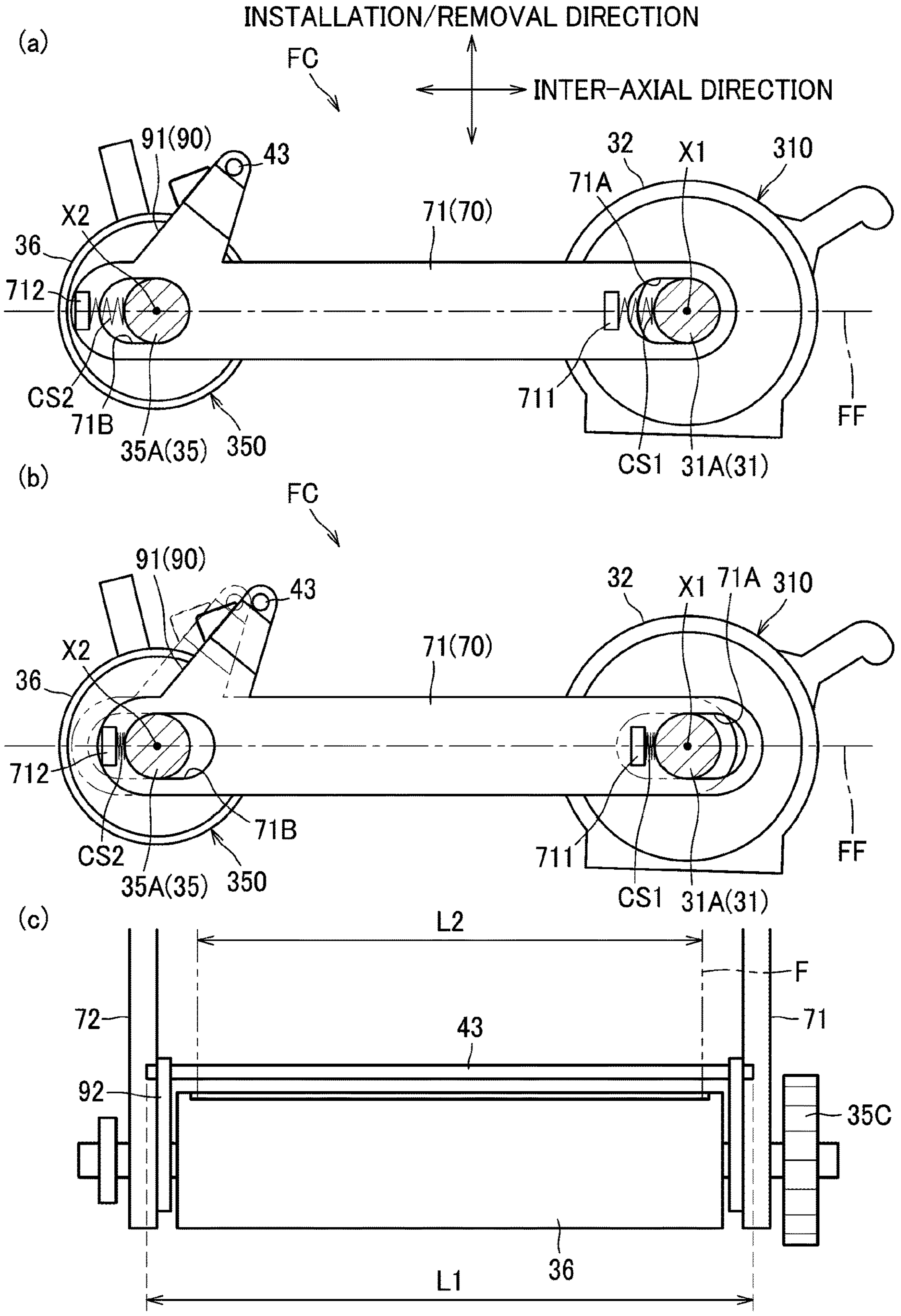
FIG. 17 includes a side view (a) which shows a state in which a shaft is positioned in the first position, a side view (b) which shows a state in which the shaft is positioned in the second position, and a plan view (c) showing the relation between the shaft and a multilayer film.

As shown in FIG. 17(*a*) and FIG. 17(*b*), the shaft 43 supported by the support members 90 is movable in the inter-axial direction relative to the supply reel 31 and the take-up reel 35. More specifically, the shaft 43 is movable between the first position shown in FIG. 17(*b*) by chain double-dashed lines and the second position (shown in FIG. 17(*b*) by solid lines) farther than the first position from the rotation axis X2 of the take-up reel 35. Herein, the long holes 71A, 71B of the connecting portions 70 are examples of restriction portions and restrict a moving range of the shaft 43 to a range from the first position to the second position. As shown in FIG. 17(*c*), a dimension L1 of the shaft 43 in the axial direction is greater than a width L2 of a multilayer film F.

As shown in FIG. 17(*a*), a first coil spring CS1 and a second coil spring CS2 as an example of a second spring are provided at the first connecting portion 71. More specifically, the first connecting portion 71 includes a first spring support portion 711 that supports the first coil spring CS1 and a second spring support portion 712 that supports the second coil spring CS2.

The first coil spring CS1 is located between the first spring support portion 711 and the supply shaft 31A. The first coil spring CS1 biases the supply reel 31 in a direction away from the take-up reel 35.

The second coil spring CS2 is located between the second spring support portion 712 and the take-up shaft 35A. The second coil spring CS2 biases the take-up reel 35 in a direction toward the supply reel 31.

Accordingly, in a state in which a layer transfer film cartridge FC is removed from a housing main body 21, rattling of the supply reel 31 and the take-up reel 35 relative to the first connecting portion 71 can be minimized. It should be understood that the first coil spring CS1 and the second coil spring CS2 may also be provided at the second connecting portion 72.

The layer transfer film cartridge FC is installable into and removable from the housing main body 21 in a direction perpendicular to an imaginary plane FF including the rotation axis X1 of the supply reel 31 and the rotation axis X2 of the take-up reel 35.

Figure 18:
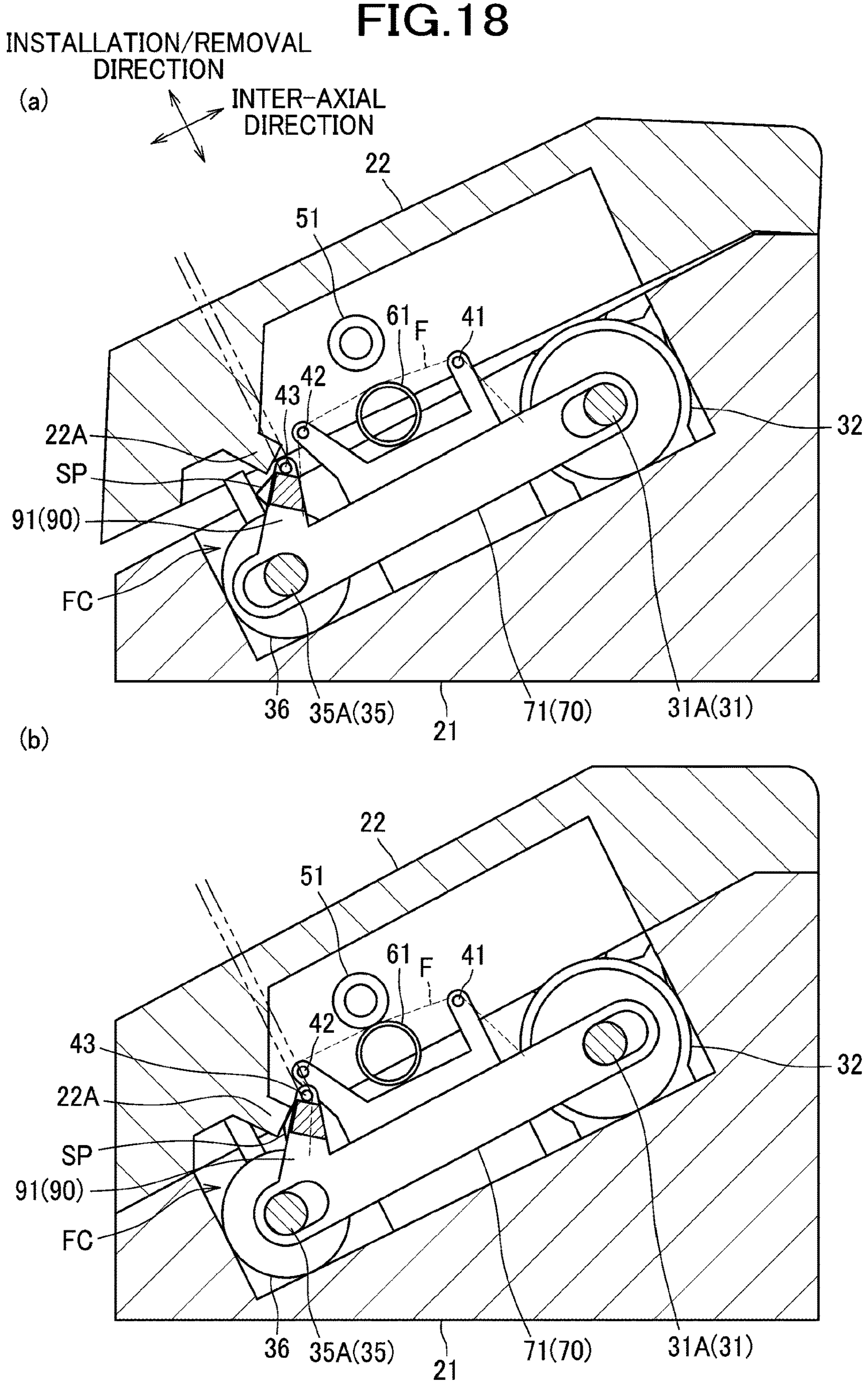
FIG. 18 includes sectional views (a), (b) which show motions of the shaft moving from the first position to the second position in conjunction with an action of closing a cover.

As shown in FIG. 18, the cover 22 includes lugs 22A which press the shaft 43 from the first position shown in FIG. 18(*a*) to the second position shown in FIG. 18(*b*). The lugs 22A are fixed to the cover 22 and press the shaft 43 from the first position toward the second position when the cover 22 is being closed. It is to be understood that pressing members may be the cover 22 itself, for example, lugs formed by making a part of the cover 22 protrude.

Herein, the shaft 43 positioned in the first position does not overlap a second guide shaft 42 when projected in the installation/removal direction. As a result, when the shaft 43 is positioned in the first position, the layer transfer film cartridge FC can be installed and removed without interference of the shaft 43 with the second guide shaft 42.

The shaft 43 positioned in the second position overlaps the second guide shaft 42 when projected in the installation/removal direction. This will allow the peeling angle of the multilayer film F at the second guide shaft 42 to be set at an appropriate angle.

The lugs 22A are respectively positioned at one axial end and another axial end of the shaft 43. The lug 22A at the one axial end is located in such a position as to be contactable with the leaf spring SP provided at the first side plate 91 when the layer transfer film cartridge FC is installed in the housing main body 21. Further, the lug 22A (not shown) at the another axial end is located in such a position as to be contactable with the leaf spring SP provided at the second side plate 92 when the layer transfer film cartridge FC is installed in the housing main body 21. As a result, each of the lugs 22A can press the shaft 43 via the leaf spring SP and the support member 90.

Next, the operation and advantageous effects of the layer transfer device 1 of the present embodiment will be described.

As shown in FIG. 2, when a user grasps the handle 80 and installs the layer transfer film cartridge FC into the housing main body 21 from above, the multilayer film F extended between the supply case 32 and the take-up case 36 contacts a first guide shaft 41 and the second guide shaft 42 of the housing main body 21. After that, as the layer transfer film cartridge FC is moved further toward an installation position, the multilayer film F is, as shown in FIG. 18(*a*), extended between adjacent members of the supply case 32, the first guide shaft 41, the second guide shaft 42 and the take-up case 36.

After the layer transfer film cartridge FC is installed in the housing main body 21, as the cover 22 is being closed, the lugs 22A contact the leaf springs SP. After that, as the user is further closing the cover 22, the lugs 22A press the shaft 43 from the first position toward the second position via the leaf springs SP and the support members 90. As a result, the shaft 43 moves together with the connecting portions 70 in the inter-axial direction against the biasing forces of the coil springs CS1, CS2 shown in FIG. 17(*a*). It is to be understood that the coil springs CS1, CS2 are omitted in FIG. 18 for the sake of convenience.

The shaft 43 contacts, before reaching the second position, the multilayer film F extended and stretched between the second guide shaft 42 and the take-up case 36. After that, as the user is further closing the cover 22, the shaft 43 presses the multilayer film F extended and stretched between the second guide shaft 42 and the take-up case 36 toward the supply case 32, and therefore reaches the second position.

When the shaft 43 is in the second position, the movements of the connecting portions 70 are restricted by the respective reels 31, 35. Subsequently, as the user is further closing the cover 22, the leaf springs SP are compressed between the lugs 22A and the support members 90.

In this way, when the cover 22 is completely closed, as shown in FIG. 18(*b*), the biasing forces of the leaf springs SP can be transmitted via the support members 90 and the shaft 43 to the multilayer film F, whereby an appropriate tension can be applied to the multilayer film F.

When removing the layer transfer film cartridge FC from the housing main body 21, upon opening the cover 22, the lugs 22A move apart from the leaf springs SP, whereby the connecting portions 70 move from a position shown in FIG. 18(*b*) to a position shown in FIG. 18(*a*) by the biasing force of the coil springs CS1, CS2 shown in FIG. 17(*a*). As a result, when the user opens the cover 22, the shaft 43 moves from the second position to the first position by the biasing forces of the coil springs CS1, CS2. After that, the user can easily remove the layer transfer film cartridge FC from the housing main body 21 by holding the first handle 81 and the second handle 82 and drawing out the layer transfer film cartridge FC in the installation/removal direction.

According to the above, the following advantageous effects may be obtained by the present embodiment.

Since the shaft 43 is movable in the inter-axial direction along a straight line connecting the rotation axes X1, X2 of the corresponding reels 31, 35, interference of the shaft 43 with the second guide shaft 42 can be restrained during installation and removal of the layer transfer film cartridge FC. Accordingly, flexibility in design can be increased.

Since the coil springs CS1, CS2 are provided for biasing the reels 31, 35, the rattling of the reels 31, 35 relative to the connecting portions 70 during installation and removal can be minimized.

It is to be understood that the second embodiment can be used in various embodiments as exemplified below. In the following description, the members with approximately the same structures as those of the above-described embodiment are identified by the same reference characters and explanation thereof is omitted.

Figure 19:
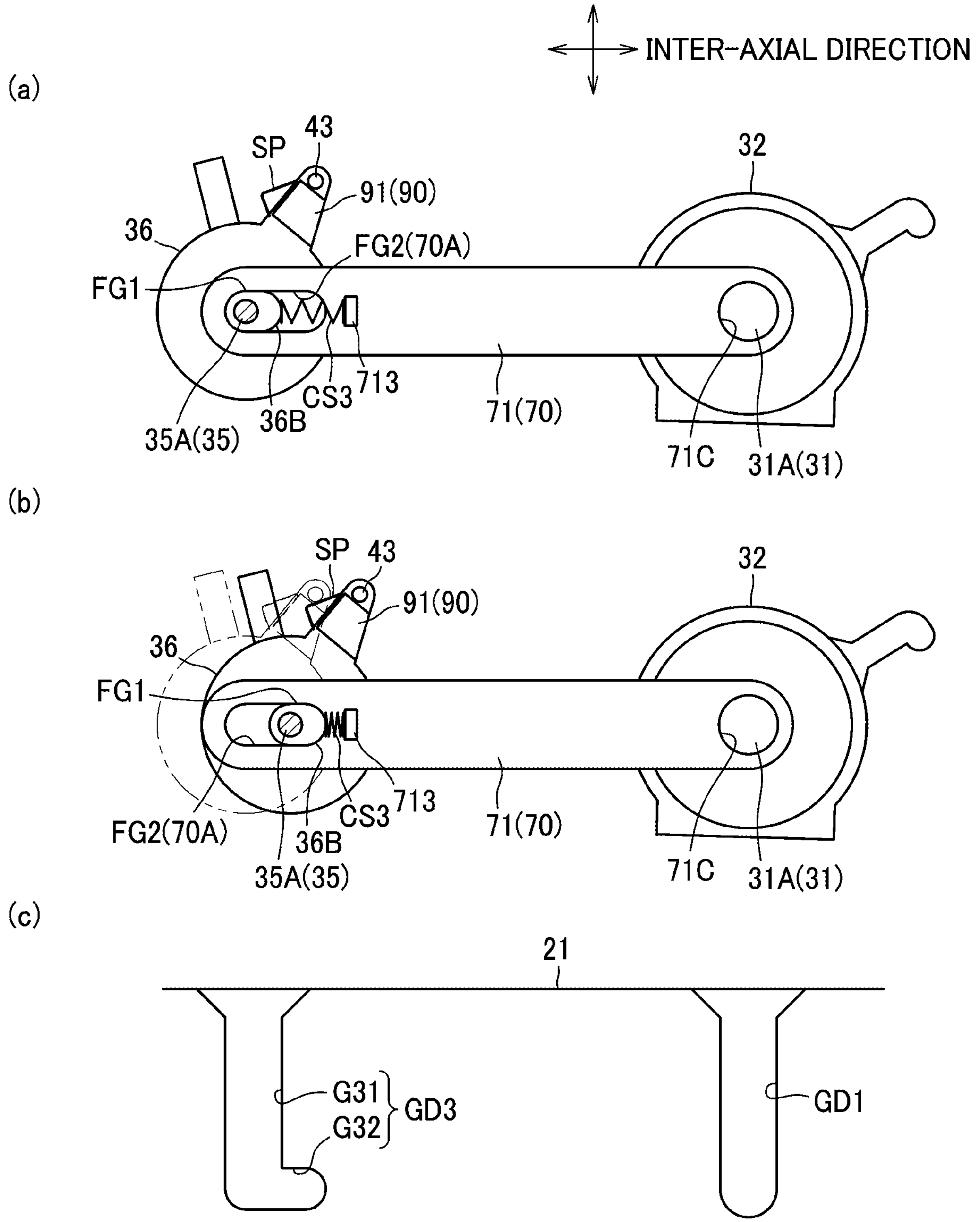
FIG. 19 includes views of a layer transfer film cartridge and a housing main body according to an eighth modification including a side view (a) showing a state in which a shaft is positioned in the first position, a side view (b) showing a state in which the shaft is positioned in the second position, and a view (c) showing a guide of the housing main body.

Although the support members 90 are provided integrally with the connecting portions 70 in the second embodiment, the support members 90 may, for example, as shown in FIG. 19, be provided integrally with the take-up case 36. Specifically, in such a structure, the take-up case 36 is supported by the connecting portions 70 movably in the inter-axial direction. Accordingly, the support members 90 are movable together with the take-up case 36 relative to the connecting portions 70 in the inter-axial direction.

This structure will be explained in detail below. In the following description, only a structure at one end of the take-up case 36 will be described, and a description of a structure at another end of the take-up case 36 configured similar to the structure at the one end will be omitted as appropriate.

The take-up case 36 includes guided portions 36B protruding outward from both end surfaces in the axial direction. Each guided portion 36B has a first flat surface FG1 extending along the axial direction and the inter-axial direction. It is to be understood that the take-up shaft 35A of the take-up reel 35 is rotatably supported by the take-up case 36.

The first connecting portion 71 has a guide hole 70A which supports a guided portion 36B at one end of the take-up case 36 movably in the inter-axial direction. The guide hole 70A is an example of a restriction portion and restricts the moving range of the shaft 43 within a range from the first position to the second position. The guide hole 70A has a second flat surface FG2 in contact with the first flat surface FG1 of the guided portion 36B.

According to this configuration, the support members 90 move slidably together with the take-up case 36 in the inter-axial direction causing the shaft 43 to move between the first position shown in FIG. 19(*a*) and the second position shown in FIG. 19(*b*) closer than the first position to the supply reel 31. More specifically, when lugs provided at the cover contact the leaf springs SP as the cover (not shown) is being closed, the lugs press the support members 90 via the leaf springs SP, causing the support members 90 to move together with the take-up case 36 relative to the connecting portions 70 in the inter-axial direction. Accordingly, the shaft 43 moves from the first position to the second position shown in FIG. 20(*b*). According to this configuration, advantageous effects similar to those of the second embodiment can be obtained.

Further, according to this configuration, the first connecting portion 71 includes a coil spring CS3 as an example of a first spring, and a spring support portion 713 that supports the coil spring CS3. The coil spring CS3 is located between the spring support portion 713 and the take-up shaft 35A. The coil spring CS3 biases the guided portion 36B in a direction away from the supply reel 31, and thus biases the shaft 43 in a direction away from the supply reel 31.

Accordingly, since the shaft 43 can be biased to the first position, as the cover is being opened, the shaft 43 can be returned from the second position to the first position by the biasing force of the coil spring CS3. Further, in a state in which the layer transfer film cartridge FC is removed from the housing main body 21, the rattling of the take-up reel 35 relative to the first connecting portion 71 can be minimized.

The first connecting portion 71 has a round hole 71C by which the supply shaft 31A of the supply reel 31 is rotatably supported. The supply case 32 is fixed to the first connecting portion 71.

According to this configuration, since a position of the take-up reel 35 in the inter-axial direction changes according to movement of the shaft 43, the second guide GD3 of the housing main body 21 has, as shown in FIG. 19(*c*), a shape different from that of the second guide GD3 in the second embodiment. More specifically, the second guide GD3 is a guide for guiding the take-up shaft 35A of the take-up reel 35 via the guided portion 36B. The second guide GD3 includes a first portion G31 extending in the installation/removal direction, and a second portion G32 extending from the lower end of the first portion G31 toward the first guide GD1 in the inter-axial direction.

Figure 20:
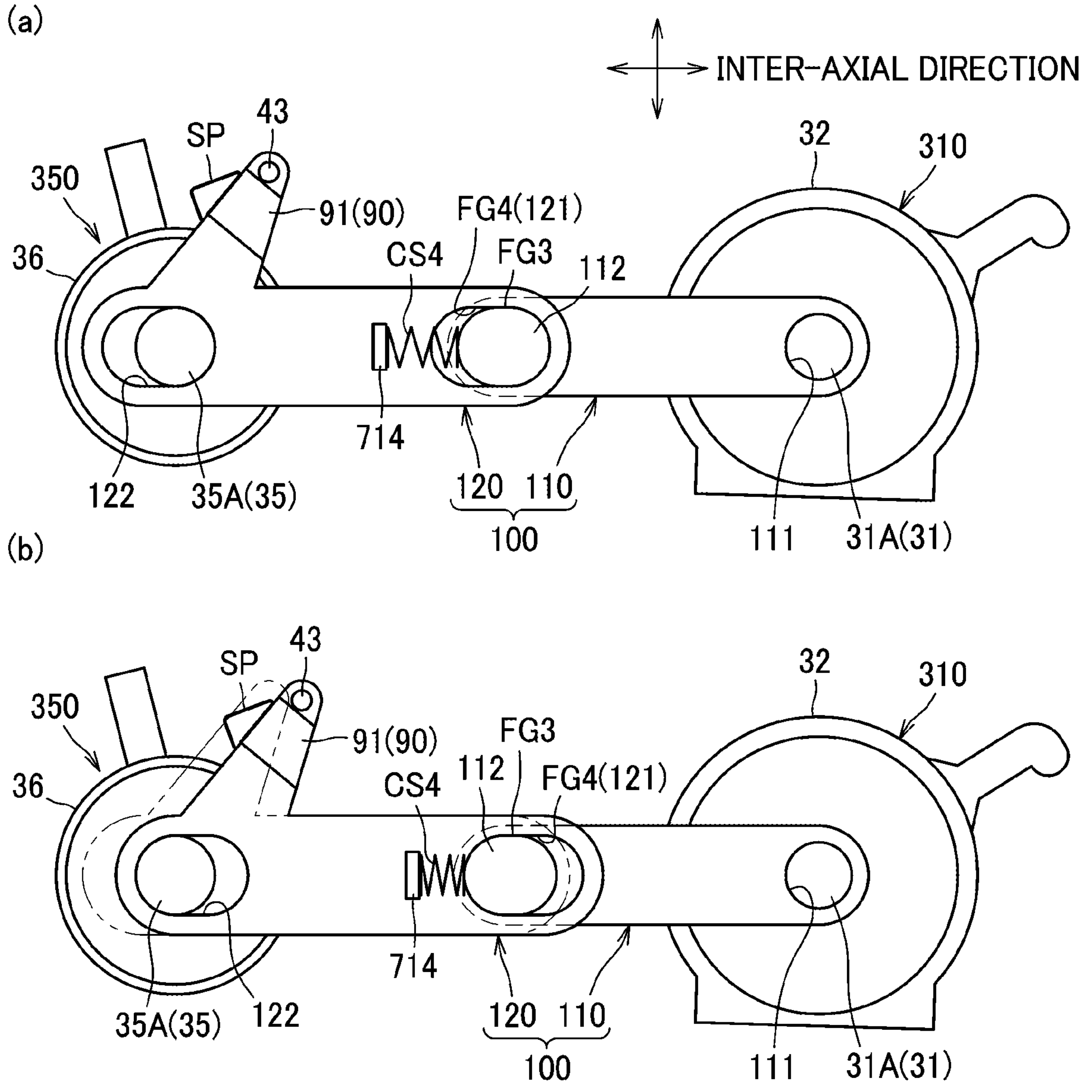
FIG. 20 includes views of a layer transfer film cartridge according to a ninth modification including a side view (a) which shows a state in which a shaft is positioned in the first position, and a side view (b) which shows a state in which the shaft is positioned in the second position FIG. 21 includes views of a layer transfer film cartridge and the housing main body according to a tenth modification including a view (a) of a state before the layer transfer film cartridge is installed into the housing main body, and views (b), (c) showing motions of a shaft moving from the first position to the second position after the layer transfer film cartridge is installed into the housing main body.

Although the first connecting portion 71 is composed of one member in the second embodiment, a first connecting portion 100 may, for example, as shown in FIG. 20, be configured to comprise two members. In the following description, the description for the second connecting portion configured as a member similar to the first connecting portion 100 will be omitted.

The first connecting portion 100 includes a first member 110 and a second member 120. The first member 110 and the second member 120 are each formed in the shape of a plate elongate in the inter-axial direction.

The first member 110 is connected to one end of the supply unit 310 in the axial direction. Specifically, the first member 110 has a round hole 111 which is provided at one end in the inter-axial direction and by which the supply shaft 31A of the supply reel 31 is rotatably supported. The supply case 32 is fixed to the first member 110.

The first member 110 has a guided portion 112, at another end in the inter-axial direction, which protrudes in the axial direction. The guided portion 112 has a flat surface FG3 extending along the inter-axial direction.

The second member 120 is connected to one end of the take-up unit 350 in the axial direction, and is supported by the first member 110 movably in the inter-axial direction. The first side plate 91 is provided integrally with the second member 120, and is movable together with the second member 120 relative to the first member 110 in the inter-axial direction. More specifically, the second member 120 has a guide hole 121 at one end in the inter-axial direction, and a long hole 122 at the other end in the inter-axial direction.

The guide hole 121 is a long hole elongate in the inter-axial direction and engages with the guided portion 112. The guide hole 121 has a flat surface FG4 in contact with the flat surface FG3 of the guided portion 112. The second member 120 having the guide hole 121 is supported by the guided portion 112 movably in the inter-axial direction. The guide hole 121 is an example of a restriction portion that restricts a moving range of the shaft 43 within a range from the first position to the second position.

The long hole 122 is a long hole elongate in the inter-axial direction that supports the take-up shaft 35A of the take-up reel 35 rotatably and movably in the inter-axial direction.

According to this configuration, the first side plate 91 moves slidably together with the second member 120 in the inter-axial direction causing the shaft 43 to move between the first position shown in FIG. 20(*a*) and the second position shown in FIG. 20(*b*) closer than the first position to the supply reel 31. Specifically, when the lug provided at the cover contacts the leaf spring SP as the cover (not shown) is being closed, the lug presses the first side plate 91 via the leaf spring SP, causing the first side plate 91 to move together with the second member 120 relative to the first member 110 in the inter-axial direction. As a result, the shaft 43 moves from the first position to the second position shown in FIG. 20(*b*). According to this configuration, advantageous effects similar to those of the second embodiment may be obtained.

Further, according to this configuration, the second member 120 includes a coil spring CS4 as an example of a first spring, and a spring support portion 714. The coil spring CS4 is located between the spring support portion 714 and the guided portion 112. The coil spring CS4 biases the second member 120 in a direction away from the supply reel 31, whereby the shaft 43 is biased in a direction away from the supply reel 31.

Accordingly, since the shaft 43 can be biased toward the first position, the shaft 43 can be returned from the second position to the first position by the biasing force of the coil spring CS4 when the cover 22 is opened. Further, in a state in which the layer transfer film cartridge FC is removed from the housing main body 21, the rattling of the second member 120 and the shaft 43 relative to the first member 110 can be minimized.

In this configuration, a second spring support portion 712 and a second coil spring CS2, as shown in FIG. 17(*a*), may be provided. Accordingly, in a state in which the layer transfer film cartridge FC is removed from the housing main body 21, the rattling of the take-up reel 35 relative to the second member 120 can be minimized.

Figure 21:
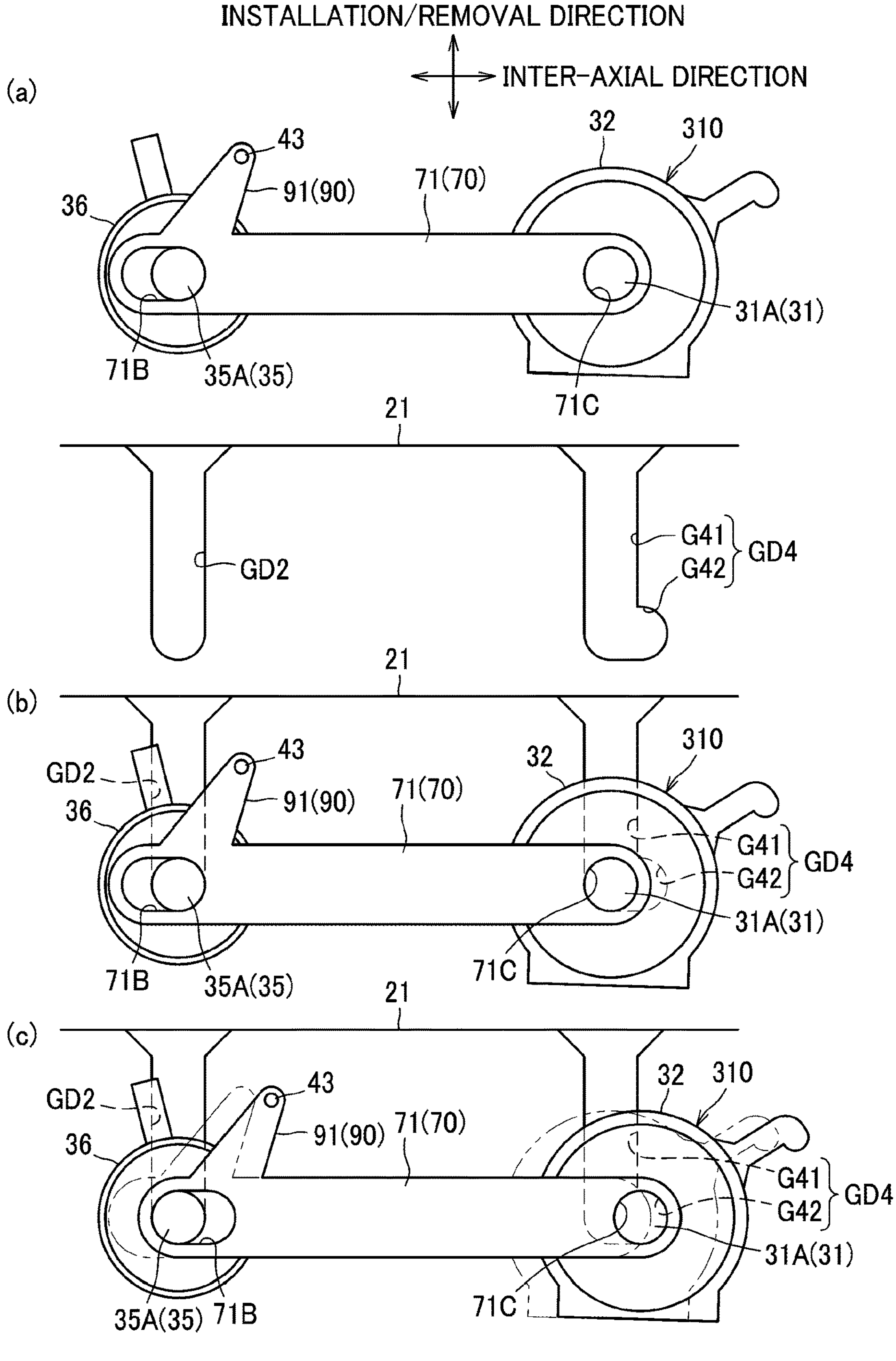

In the configuration shown in FIG. 17, although long holes 71A, 71B are provided at both ends of the first connecting portion 71 in the inter-axial direction, the hole connected to the supply shaft 31A of the supply reel 31, of the holes formed in the first connecting portion 71, may, for example, as shown in FIG. 21(*a*), be a round hole 71C.

In other words, the supply reel 31 may be movable together with the first connecting portion 71 in the inter-axial direction. According to this configuration, the supply case 32 is fixed to the first connecting portion 71. The second connecting portion 72 is configured in a manner similar to the first connecting portion 71.

According to this configuration, since the position of the supply reel 31 in the inter-axial direction changes according to the movement of the shaft 43, the first guide GD4 of the housing main body 21 has a shape different from that of the second embodiment. Specifically, the first guide GD4 is a guide that guides the supply shaft 31A of the supply reel 31. The first guide GD4 includes a first portion G41 extending in the installation/removal direction and a second portion GD2 extending from a lower end of the first portion G41 toward a side opposite to a side on which the second guide GD2 is positioned.

According to this configuration, the shaft 43 can be moved between the first position and the second position, as shown in FIGS. 21(*b*) and 21(*c*), whereby advantage effects similar to those of the second embodiment may be obtained.

In the second embodiment, the coil spring has been given as an example of a spring; however, the spring may, for example, be a leaf spring, a wire spring, a torsion spring, etc.

Although a cylinder-shaped shaft 43 has been given as an example of a film guide member in the second embodiment, the film guide member may, for example, as shown in FIG. 10(*a*) and FIG. 10(*b*), be a plate-shaped blade BD1 as in the first embodiment. It may also, for example, as shown in FIG. 11(*a*) and FIG. 11(*b*), be a flat tube-shaped blade BD2.

Although leaf springs SP are provided at the support members 90 in the second embodiment, leaf springs SP need not be provided. In such a case, a structure directly pressing the support members 90 by lugs 22A may be provided. Alternatively, leaf springs may be provided at tips of the lugs 22A.

Although the connecting portions 70 are comprised of two connecting portions 71, 72 in the second embodiment, one connecting portion (for example, only the first connecting portion) may be provided.

Although a device for transferring a transfer layer onto a toner image formed on a sheet S is given as an example of a layer transfer device in the second embodiment, the layer transfer device may, for example, be a device for transferring a transfer layer onto an ink image formed on a sheet or a device for transferring a transfer layer onto a sheet by a thermal head.

Although the transfer layer F22 containing foil is given as an example in the second embodiment, the transfer layer may, for example, not contain foil or colorant and may be formed of a thermoplastic resin.

Although the multilayer film F is formed of four layers in the second embodiment, the multilayer film may have any number of layers as long as it includes a transfer layer and a supporting layer.

The connecting portions need not be formed in shapes of plates but may be formed in shapes of rods. The connecting portions may be made of plastic or metal.

Although the supply shaft 31A and the take-up shaft 35A are movably supported by long holes 71A, 71B of the connecting portions 70 in the second embodiment, hollow lugs may, for example, be provided at both end surfaces of the supply case and the take-up case facing in the axial direction, and the outer peripheral surfaces of the hollow lugs may be movably supported by the long holes of the connecting portions. In this case, the supply case and the take-up case may be configured not to rotate with respect to the connecting portions, for example by forming the hollow lugs in an oval shape such that a part of an outward peripheral surface of the hollow lug is a surface along the inter-axial direction and the axial direction. Further, the supply reel and the shaft of the take-up case may be rotatably supported by an inner surface of the hollow lugs. In this case, the supply reel and the take-up reel are connected to the connecting portions via the supply case and the take-up case.

Although the supply case 32 and the take-up case 36 are configured not to rotate with respect to the connecting portions 70 in the second embodiment, the supply case and the take-up case may be configured to be rotatable with respect to the connecting portions.

A detailed description will be given of a third embodiment of the present invention with reference made to the drawings where appropriate. Although the third embodiment has a structure somewhat different from that of the first embodiment, since the structure thereof is basically approximately the same; therefore the approximately same members are identified by the same reference characters and explanation thereof is omitted as appropriate.

Figure 22:
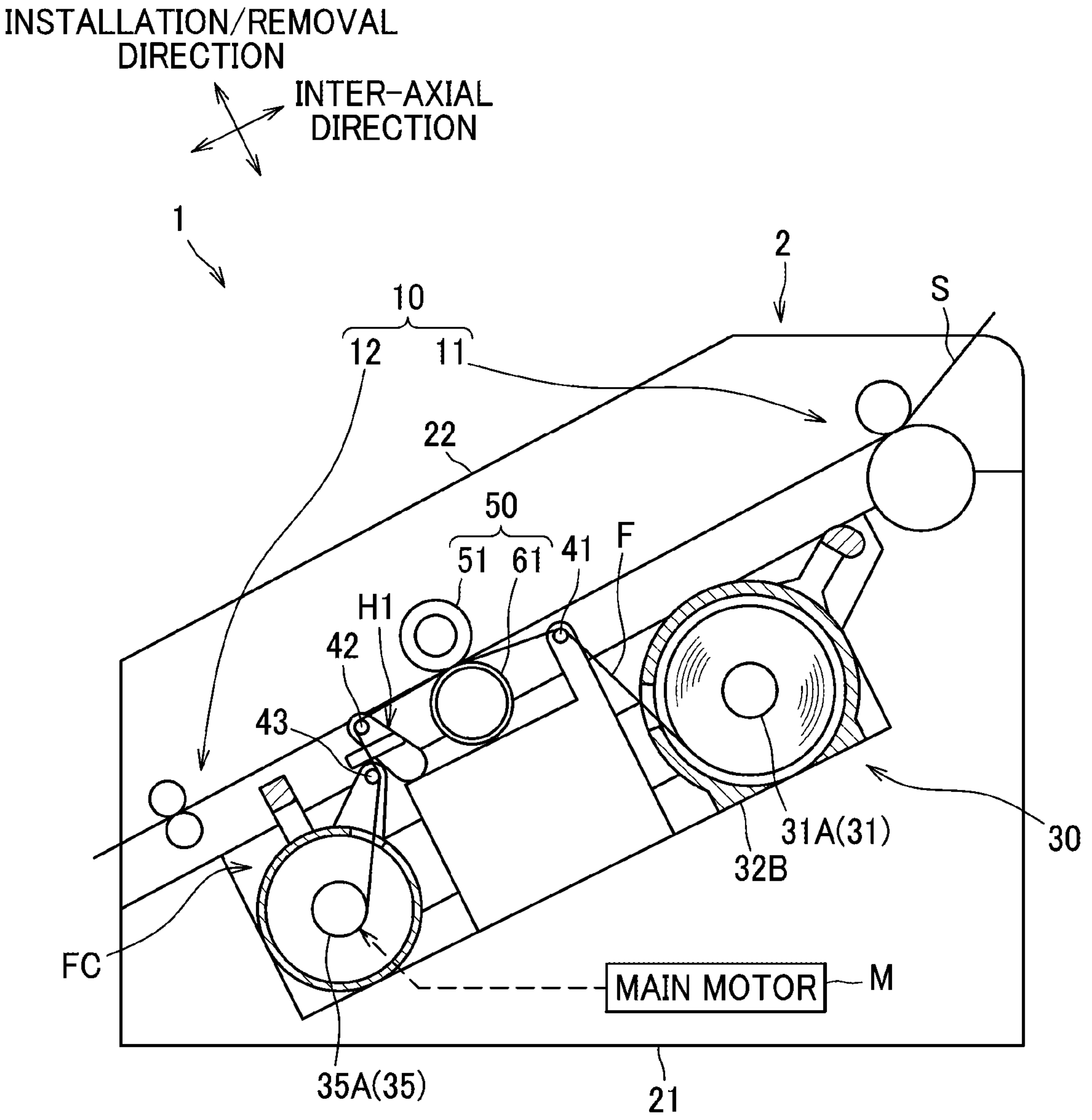
FIG. 22 is a view of a layer transfer device according to a third embodiment.
Figure 23:
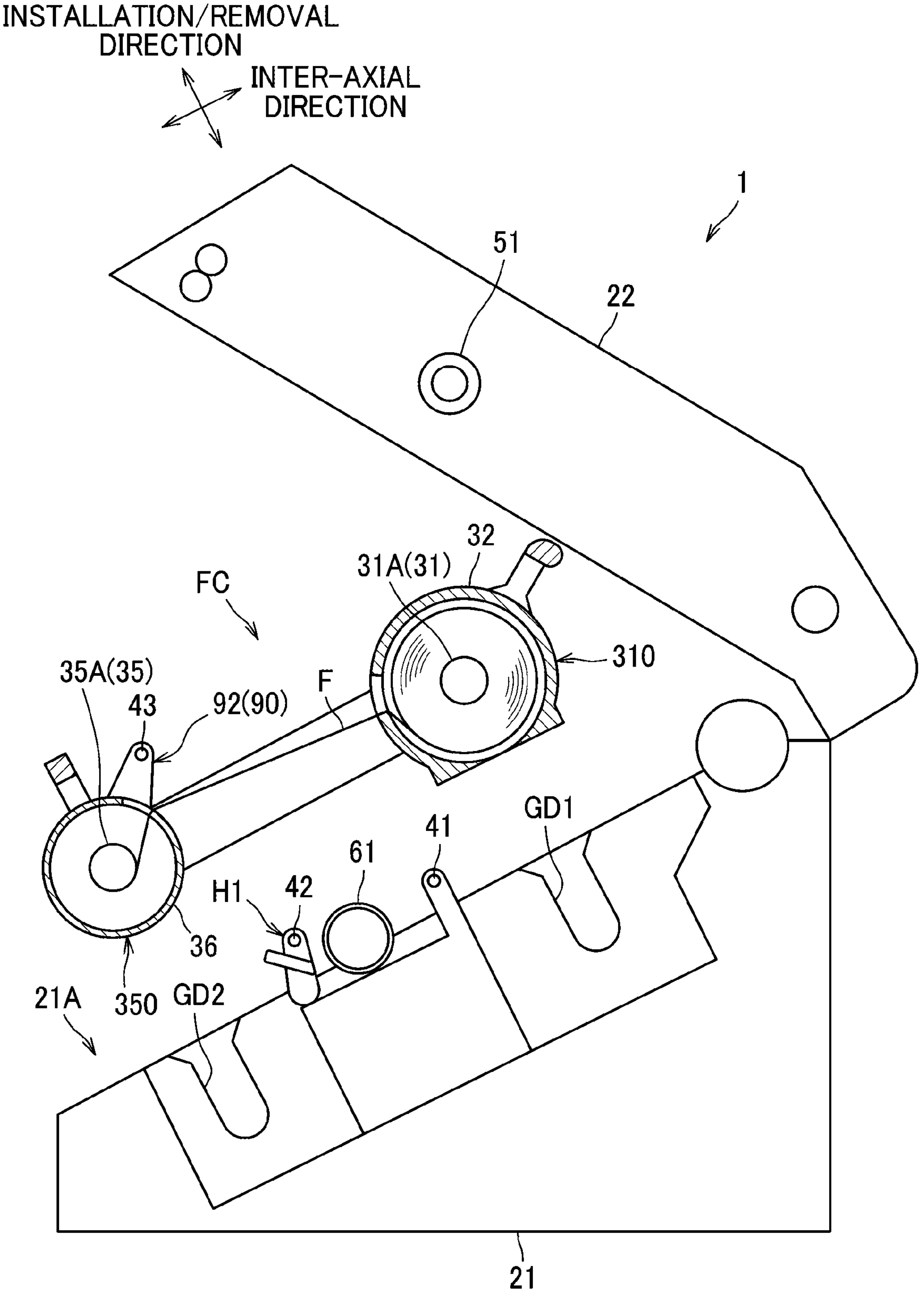
FIG. 23 is a view showing the layer transfer device in a state in which a cover is open.

As shown in FIG. 22 and FIG. 23, a housing main body 21 further comprises a retaining member H1. The retaining member H1 is a member that holds a second guide shaft 42 and is rotatably supported by the housing main body 21. The retaining member H1 will be explained in more detail below.

Figure 24:
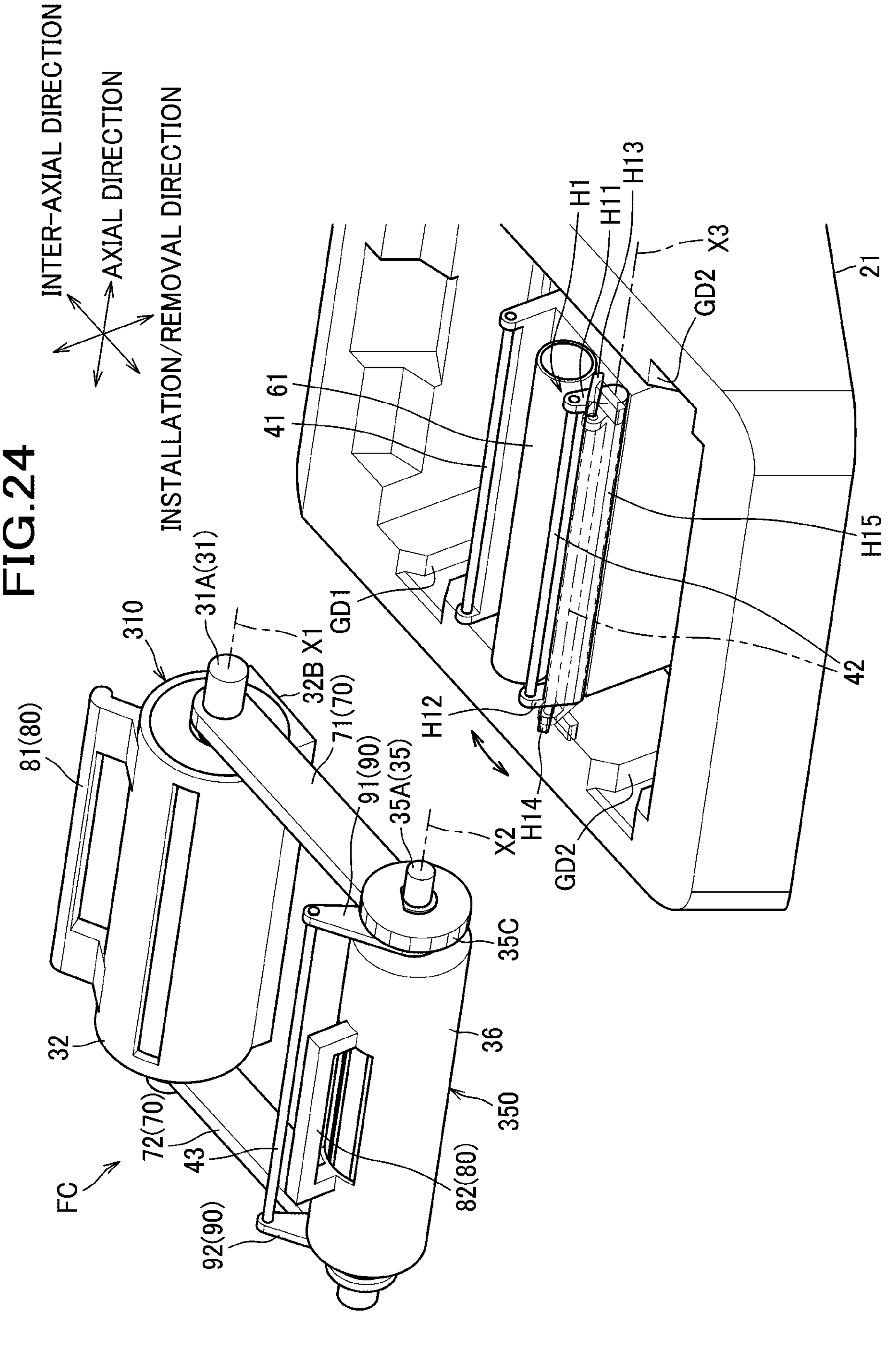
FIG. 24 is a perspective view of the layer transfer film cartridge and the housing main body.

As shown in FIG. 24, a layer transfer film cartridge FC comprises connecting portions 70, handles 80 and support members 90 in addition to the supply unit 310, the take-up unit 350, and the shaft 43 described above. The supply unit 310 includes a supply case 32 in addition to the supply reel 31 described above. Further, the take-up unit 350 includes a take-up case 36 in addition to the take-up reel 35 described above.

The supply case 32 is a case which houses the supply reel 31 and is formed in a hollow near cylindrical shape. More specifically, the supply case 32 houses a multilayer film F wound on a supply shaft 31A of the supply reel 31. The supply shaft 31A of the supply reel 31 protrudes outward from the end surfaces of the supply case 32 in the axial direction.

The supply case 32 is engaged with or fixed to the connecting portions 70 so that the supply case 32 does not rotate about a rotation axis X1 relative to the connecting portions 70. The supply case 32 has a flat surface 32B on a part of an outer peripheral surface thereof. The flat surface 32B extends in the axial direction and the inter-axial direction. The layer transfer film cartridge FC is supported in the housing main body 21, by the flat surface 32B contacting a flat-surfaced portion of the housing main body 21 (see FIG. 22). The supply reel 31 is rotatably supported by the supply case 32 and the connecting portions 70.

The take-up case 36 is a case which houses the take-up reel 35 and is formed in a hollow cylindrical shape. More specifically, the take-up case 36 houses a multilayer film F wound on a take-up shaft 35A of the take-up reel 35. The take-up shaft 35A of the take-up reel 35 protrudes outward from the end surfaces of the take-up case 32 in the axial direction.

The take-up case 36 is engaged with or fixed to the connecting portions 70 so that the supply case 32 does not rotate about a rotation axis X2 relative to the connecting portions 70. The take-up reel 35 is rotatably supported by the take-up case 36 and the connecting portions 70. The take-up reel 35 comprises the take-up shaft 35A described above and a take-up gear 35C. The take-up gear 35C is a gear for receiving a driving force from the main motor M. The take-up gear 35C is provided at an axial end of the take-up shaft 35A. More specifically, a part of the take-up shaft 35A is formed in a D-shape and fits into a D-shaped hole opened in the take-up gear; thus the take-up gear 35C is non-rotatably fixed to the take-up shaft 35A.

The connecting portions 70 are members that connect the supply unit 310 and the take-up unit 350. The connection portions 70 include a first connecting portion 71 and a second connecting portion 72. The first connecting portion 71 and the second connecting portion 72 extend in a direction perpendicular to the axial direction. More specifically, the first connecting portion 71 and the second connecting portion 72 are formed in shapes of a long plate elongate in the inter-axial direction along a straight line connecting the rotation axis X1 of the supply reel 31 and the rotation axis X2 of the take-up reel 35. The first connecting portion 71 and the second connecting portion 72 are located in positions apart from the multilayer film F.

The first connecting portion 71 connects one end of the supply unit 310 in the axial direction and one end of the take-up unit in the axial direction. Specifically, the first connecting portion 71 connects one end of the supply shaft 31A and one end of the take-up shaft 35A. More specifically, the first connecting portion 71 has holes on both ends in the inter-axial direction, through which the supply shaft 31A or the take-up shaft 35A extends. The first connecting portion 71 is located between the take-up gear 35C and the take-up case 36 in the axial direction.

The second connecting portion 72 connects another end of the supply unit 310 in the axial direction and another end of the take-up unit 350 in the axial direction. Specifically, the second connecting portion 72 connects another end of the supply shaft 31A and another end of the take-up shaft 35A. More specifically, the second connecting portion 72 has holes on both ends in the inter-axial direction, through which the supply shaft 31A or the take-up shaft 35A extends.

The supply case 32 and the take-up case 36 are located between the first connecting portion 71 and the second connecting portion 72 in the axial direction.

The handles 80 are parts which allow user's fingers to be hooked. The handles 80 includes a first handle 81 and a second handle 82 positioned apart from the first handle 81 in the inter-axial direction.

The first handle 81 is made of plastic or the like and is provided at the supply unit 310 in such a manner as to extend in the axial direction. Specifically, the first handle 81 is supported by the supply case 32. The first handle 81 protrudes from the outer peripheral surface of the supply case 32 in a direction non-parallel to the rotation axis X1, more specifically, in a direction perpendicular to the rotation axis X1.

The second handle 82 is made of plastic or the like and is provided at the take-up unit 350 in such a manner as to extend in the axial direction. Specifically, the second handle 82 is supported by the take-up case 36. The second handle 82 protrudes from the outer peripheral surface of the take-up case 36 in a direction non-parallel to the rotation axis X1, more specifically, in a direction perpendicular to the rotation axis X1.

The shaft 43 is positioned at the take-up unit 350. The shaft 43 has a circular shaft shape which extends along the axial direction. The shaft 43 is positioned apart from the take-up reel 35, more specifically, from the take-up case 36.

The support members 90 are members supporting the shaft 43. The support members 90 include a first side plate 91 and a second side plate 92. The first side plate 91 and the second side plate 92 are plate-shaped members that extend in a radial direction of the take-up reel 35 outward from the rotation axis X2 of the take-up reel 35, and are formed in a near-fan shape tapering toward an outer side in the radial direction. The first side plate 91 and the second side plate 92 each have a hole through which the take-up shaft 35A extends. The first side plate 91 and the second side plate 92 are fixed to the take-up shaft 35A or the connecting portions

70. Accordingly, the shaft 43 is unmovable in a direction in which the distance between the shaft 43 and the supply reel 31 changes.

The first side plate 91 supports one axial end of the shaft 43. The first side plate 91 is located between the take-up case 36 and the first connecting portion 71 in the axial direction.

The second side plate 92 supports another axial end of the shaft 43. The second side plate 92 is located between the take-up case 36 and the second connecting portion 72 in the axial direction.

The layer transfer film cartridge FC is installable into and removable from the housing main body 21 in a predetermined direction perpendicular to the axial direction and to the inter-axial direction. In the present embodiment, the direction perpendicular to the axial direction and to the inter-axial direction is referred to as an installation/removal direction; however, the installation/removal direction may, for example, be a direction somewhat oblique to (for example, within the range of ±20 degrees from) the direction perpendicular to the axial direction and to the inter-axial direction.

The housing main body 21 includes a first guide GD1 and a second guide GD2. The first guide GD1 is a groove that guides the supply shaft 31A of the supply reel 31 when the layer transfer film cartridge FC is installed into or removed from the housing main body 21. The first guide GD1 extends along the installation/removal direction described above and guides the supply shaft 31A in the installation/removal direction. The first guide GD1 is provided at one end and another end of the housing main body 21 in the axial direction.

The second guide GD2 is a groove that guides the take-up shaft 35A of the take-up reel 35 when the layer transfer film cartridge FC is installed into or removed from the housing main body 21. The second guide GD2 extends along the installation/removal direction described above and guides the take-up shaft 35A in the installation/removal direction. The second guide GD2 is provided at one end and another end of the housing main body 21 in the axial direction.

Here in, when the layer transfer film cartridge FC is installed in the housing main body 21, the second guide shaft 42, the heating roller 61 and a first guide shaft 41 extend along the axial direction.

The retaining member H1 is rotatable about a rotation axis X3 extending along the axial direction. More specifically, in the present embodiment, the retaining member H1 is capable of stopping at any position within a rotational range thereof by a frictional force between the retaining member H1 and the housing main body 21. In other words, if the user, for example, holds and rotates the retaining member H1 by his/her fingers and releases the retaining member H1 at a state in which the second guide shaft 42 is located between a third position and a fourth position, the retaining member H1 will stay in that position.

The retaining member H1 is made of plastic or the like. The retaining member H1 comprises a first arm H11, a second arm H12, a first lever H13, a second lever H14 and a connecting wall H1.

The first arm H11 extends along the installation/removal direction. The first arm H11 holds one end of the second guide shaft 42. More specifically, one end of the first arm H11, in a direction of extension of the first arm H11, holds one axial end of the second guide shaft 42. The first arm H11 is supported by the housing main body 21 rotatably about the rotation axis X3. More specifically, in the direction of extension of the first arm H11, another end of the first arm H11 is supported by the housing main body 21 rotatably about the rotation axis X3.

The second arm H12 extends along the installation/removal direction. The second arm H12 holds another end of the second guide shaft 42. More specifically, one end of the second arm H12, in a direction of extension of the second arm H12, holds another axial end of the second guide shaft 42. The second arm H12 is supported by the housing main body 21 rotatably about the rotation axis X3. More specifically, in the direction of extension of the second arm H12, another end of the second arm H12 is supported by the housing main body 21 rotatably about the rotation axis X3.

The first lever H13 is configured to protrude from the first arm H11 in an axial direction along the second guide shaft 42. The first lever H13 is positioned on a side of the first arm H11 which is a side opposite to a side on which the second arm H12 is positioned, in the axial direction along the second guide shaft 42. In other words, the first arm H11 is located between the first lever H13 and the second arm H12 in the axial direction along the second guide shaft 42.

The second lever H14 is configured to protrude from the second arm H12 in the axial direction along the second guide shaft 42. The second lever H14 is positioned on a side of the second arm H12 which is a side opposite to a side on which the first arm H11 is positioned, in the axial direction along the second guide shaft 42. In other words, the second arm H12 is located between the second lever H14 and the first arm H11 in the axial direction along the second guide shaft 42.

The connecting wall H15 connects the first arm H11 and the second arm H12. In a direction in which the first arm H11 and the second arm H12 extend, one end of the first arm H11 and one end of the second arm H12, holding corresponding axial ends of the second guide shaft 42, protrude from the connecting wall H15.

The second guide shaft 42 held by the retaining member H1 is movable between the third position shown by chain double-dashed lines and the fourth position shown by solid lines. More specifically, the second guide shaft 42 is movable between the third position and the fourth position closer than the third position to the heating roller 61. In other words, the second guide shaft 42 is movable between the third position shown in FIG. 26(*b*) and the fourth position shown in FIG. 26(*a*) farther than the third position from the shaft 43 in a state in which the layer transfer film cartridge FC is installed in the housing main body 21. The housing main body 21 is provided with a restriction portion (not shown) which restricts a moving range of the second shaft 42 within a range from the third position to the fourth position. Specifically, the restriction portion restricts a rotational range of the retaining member H1 such that the second guide shaft 42 can only move between the third position and the fourth position. The restriction portion contacts the retaining member H1 when the second guide shaft 42 is positioned in the third position, to stop the second guide shaft 42 in the third position from further moving in a direction from the fourth position toward the third position, i.e., in a direction away from the heating roller 61. The restriction portion also contacts the retaining member H1 when the second guide shaft 42 is positioned in the fourth position, to stop the second guide shaft 42 positioned in the fourth position from moving in a direction from the third position toward the fourth position, i.e., in a direction toward the heating roller 61.

Figure 26:
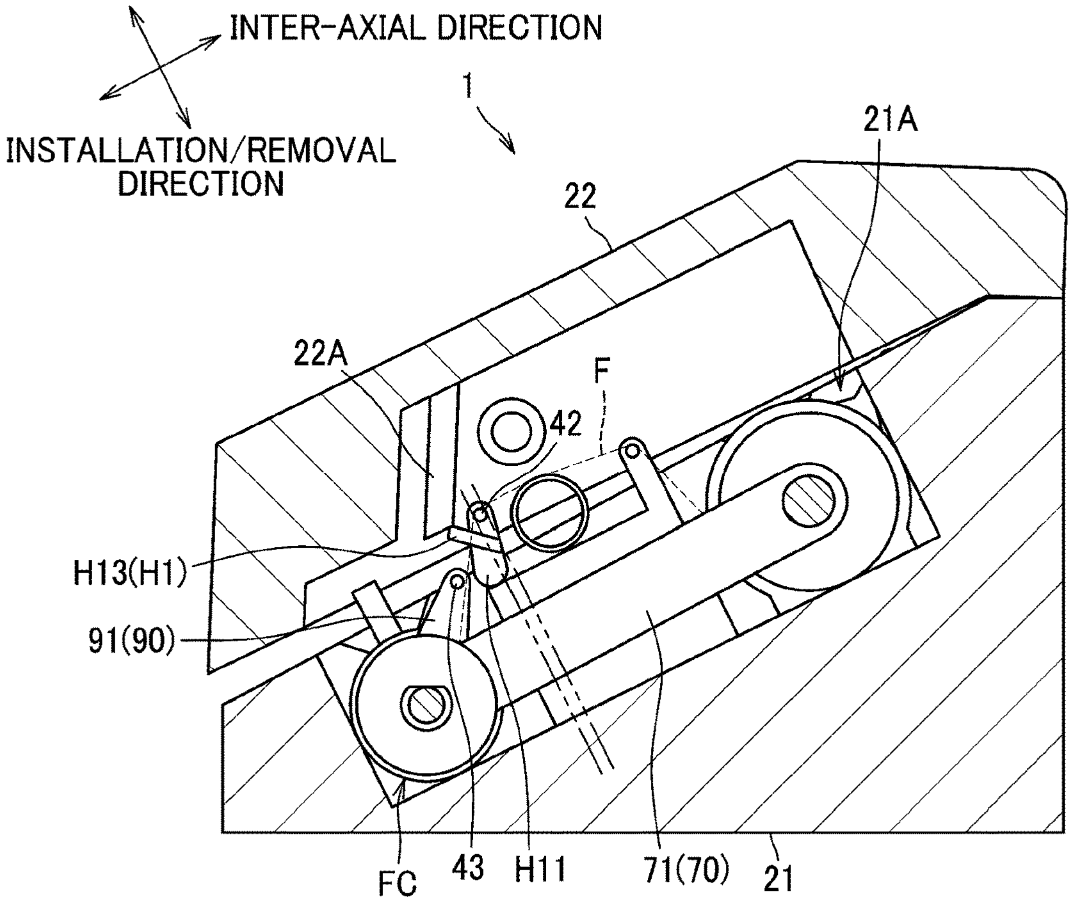
FIG. 26 includes a view (a) showing a state in which a second guide shaft is positioned in a fourth position, and a view (b) showing a state in which the second guide shaft is positioned in a third position.
Figure 26:
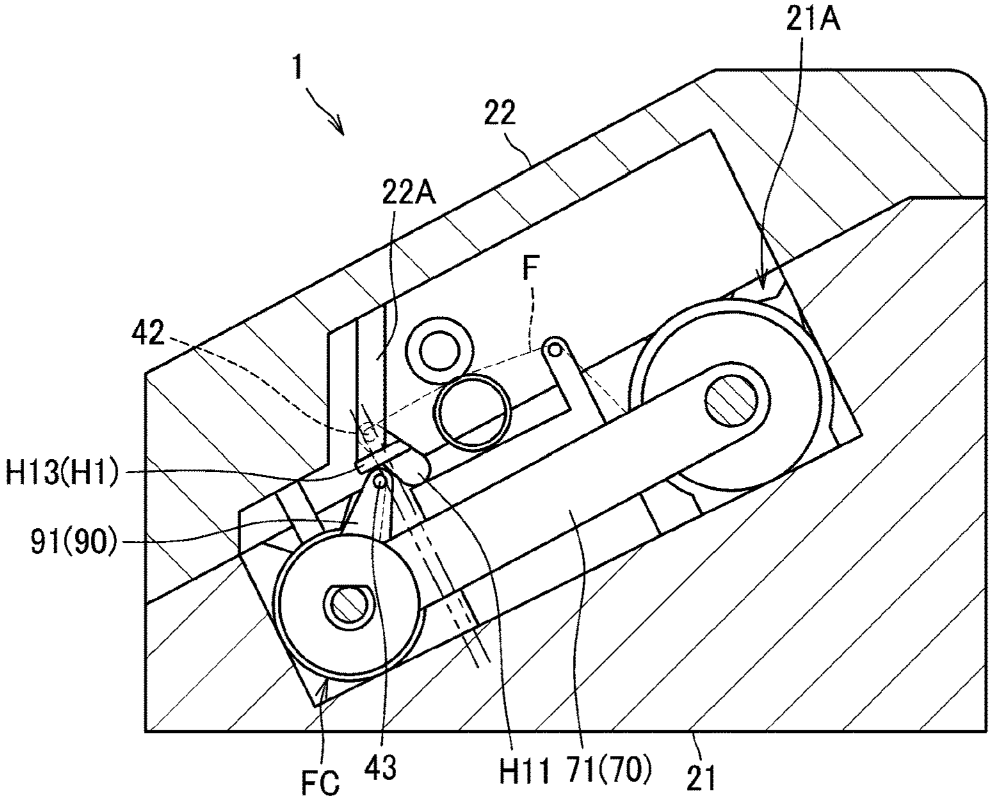

As shown in FIG. 26(*b*), the second guide shaft 42 positioned in the third position overlaps a part of the layer transfer film cartridge FC, specifically the shaft 43 when projected in the installation/removal direction. Accordingly, when the second guide shaft 42 is positioned in the third position, the peeling angle of the multilayer film F at the second guide shaft 42 can be set at an appropriate angle. The appropriate angle is an angle smaller than 90 degrees. Further, when the second guide shaft 42 is positioned in the third position, the retaining member H1 overlaps the support members 90 when projected in the installation/removal direction. In this way, when the layer transfer film cartridge FC is removed from the housing main body 21 with the second guide shaft 42 positioned in the third position, the retaining member H1 is lifted up by the support members 90, causing the second guide shaft 42 to move from the third position to the fourth position. That is, in the process of the layer transfer film cartridge FC being removed 20) from the housing main body 21, the layer transfer film cartridge FC presses the retaining member H1, causing the second guide shaft 42 to move from the third position toward the fourth position. In this way, the layer transfer film cartridge FC can be removed easily.

As shown in FIG. 26(*a*), the second guide shaft 42 positioned in the fourth position does not overlap the layer transfer film cartridge FC when projected in the installation/removal direction. Further, when the second guide shaft 42 is positioned in the fourth position, the retaining member H1 holding the second guide shaft 42 also does not overlap the layer transfer film cartridge FC when projected in the installation/removal direction.

Herein, as shown in FIG. 24, the distance between the first connecting portion 71 and the second connecting portion 72 in the axial direction is greater than the length of the second guide shaft 42 in the axial direction and the maximum dimension of the retaining member H1 in the axial direction. Therefore, as shown in FIG. 26(*a*), when the second guide shaft 42 is positioned in the fourth position, the second guide shaft 42 and the retaining member H1 do not overlap the layer transfer film cartridge FC when projected in the installation/removal direction. Therefore, when the second guide shaft 42 is positioned in the fourth position, the layer transfer film cartridge FC can be installed and removed without interfering with the second guide shaft 42 and the retaining member H1.

The cover 22 includes lugs 22A as a pressing member that presses the second guide shaft 42 from the fourth position shown in FIG. 26(*a*) toward the third position shown in FIG. 26(*b*).

The lugs 22A are fixed to the cover 22 and press the second guide shaft 42 from the fourth position toward the third position when the cover 22 is being closed. It is to be understood that the pressing member may be the cover 22 itself, for example, the lugs 22A may be formed by making a part of the cover 22 protrude.

The lugs 22A are positioned in positions corresponding to the first lever H13 and the second lever H14 of the retaining member H1 (see FIG. 24), in the axial direction. The lug 22A at one end is located in such a position as to be contactable with the first lever H13. The lug 22A at another end (not shown) is located in such a position as to be contactable with the second lever H14 (see FIG. 24). Thus, the lugs 22A are configured to press the first lever H13 and the second lever H14 to cause the second guide shaft 42 to move from the fourth position toward the third position in the process of the cover 22 being closed.

Next the operation and advantageous effects of the layer transfer device 1 of the present embodiment will be described.

Figure 25:
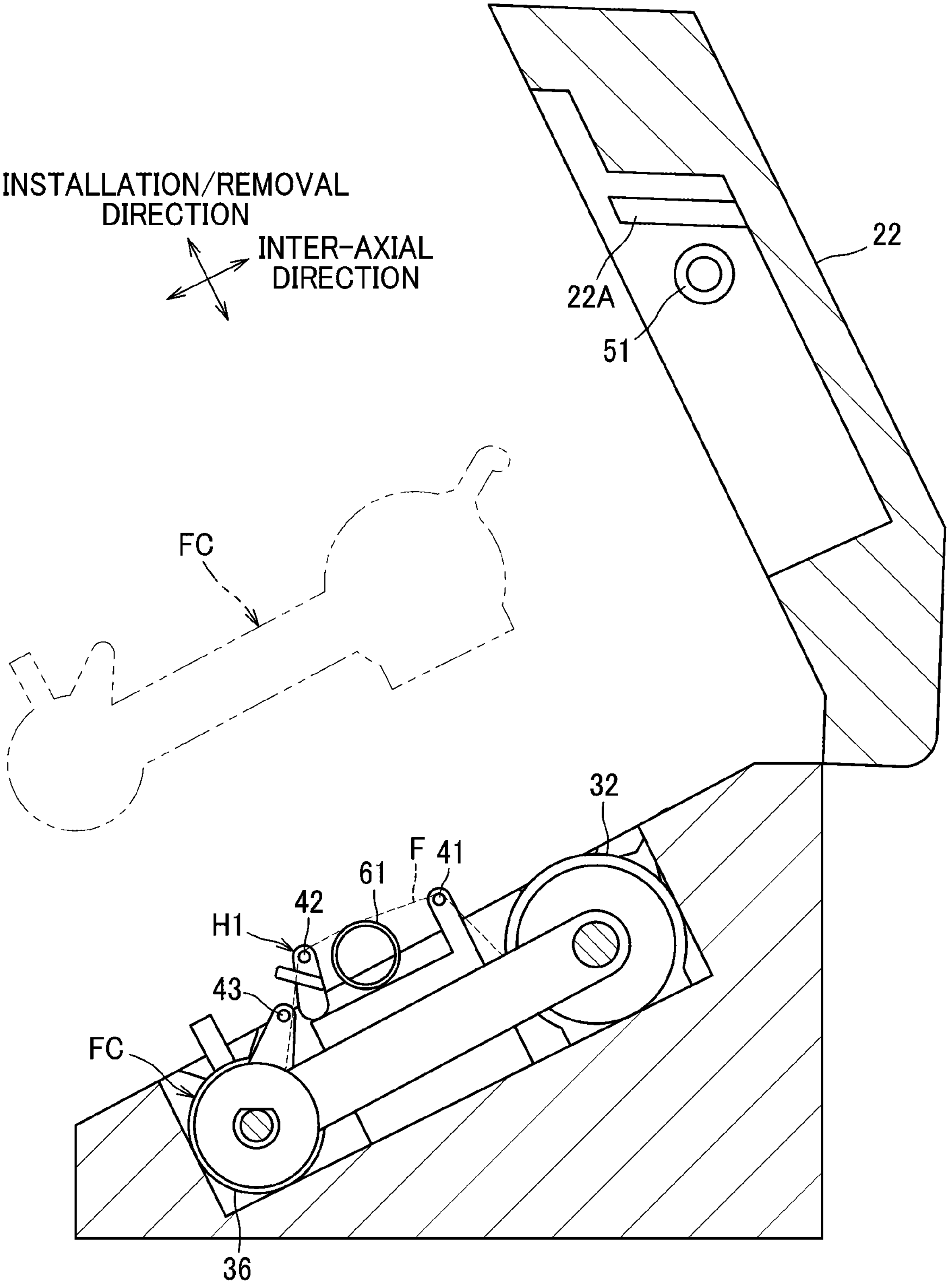
FIG. 25 is a view showing a motion of the layer transfer film cartridge being installed into the housing main body.

As shown in FIG. 25, when a user grasps the handle 80 and installs the layer transfer film cartridge FC into the housing main body 21 from above, the multilayer film F extended between the supply case 32 and the take-up case 36 (see FIG. 23) contacts the first guide shaft 41 and the second guide shaft 42 of the housing main body 21. After that, as the layer transfer film cartridge FC is being moved further toward an installation position, the multilayer film F is extended between adjacent members of the supply case 32, the first guide shaft 41, the second guide shaft 42 and the take-up case 36.

After the layer transfer film cartridge FC is installed in the housing main body 21, as the cover 22 is being closed, the lugs 22A, as shown FIG. 26(*a*), contact the respective levers H13, H14 of the retaining member H1. After that, as the user is further closing the cover 22, the lugs 22A press the respective levers H13, H14, causing the retaining member H1 to rotate and the second guide shaft 42 to move as shown in FIG. 26(*b*), from the fourth position toward the third position. When the cover 22 is completely closed, as the retaining member H1 pressed and rotated by the lugs 22A stops, the movement of the second guide shaft 42 also stops and the second guide shaft 42 stops in the third position.

By the multilayer film F being extended on the second guide shaft 42 which has reached the third position and the shaft 43, the peeling angle of the multilayer film F at the second guide shaft 42 can be set at an appropriate angle.

When removing the layer transfer film cartridge FC from the housing main body 21, the user, after opening the cover 22, rotates the retaining member H1 by his/her hand to thereby move the second guide shaft 42 from the third position to the fourth position. Thus when the layer transfer film cartridge FC is being removed, the layer transfer film cartridge FC and the retaining member H1 can be kept from interfering with each other. If the user draws out the layer transfer film cartridge FC without rotating the retaining member H1, the support members 90 of the layer transfer film cartridge FC contact the retaining member H1, whereby the retaining member H1 is pressed and rotated by the support members 90. As a result, the second guide shaft 42 moves from the third position toward the fourth position. Thus, when the layer transfer film cartridge FC is being removed, the layer transfer film cartridge FC can be restrained from getting caught on the retaining member H1 (second guide shaft 42) and difficult to remove.

According to the above, the following advantageous effects can be obtained by the present embodiment.

Since the second guide shaft 42 can be positioned in the fourth position, the layer transfer film cartridge FC can dodge interfering with the second guide shaft 42; thus, the layer transfer film cartridge FC can be installed and removed in the installation/removal direction. As a result, flexibility in design can be increased. It is to be understood that "the layer transfer film cartridge FC interfering with the second guide shaft 42" includes the layer transfer film cartridge FC contacting and interfering with the retaining member H1 holding the second guide shaft 42 without directly contacting the second guide shaft 42.

Since the second guide shaft 42 moves to the third position when the cover 22 is being closed, the second guide shaft 42 can be surely positioned in a proper position during layer transfer, and a proper peeling angle can be set by the second guide shaft 42 and the shaft 43.

Since the second guide shaft 42 moves toward the fourth position in the process of the layer transfer film cartridge FC being removed, the film cartridge FC can be removed from the housing main body 21 even if the user does not perform the procedure of moving the second guide shaft 42 to the fourth position.

It is to be understood that the third embodiment can be used in various embodiments as exemplified below. In the following description, the members with approximately the same structures as those of the above-described embodiment are identified by the same reference characters and explanation thereof is omitted.

Figure 27:
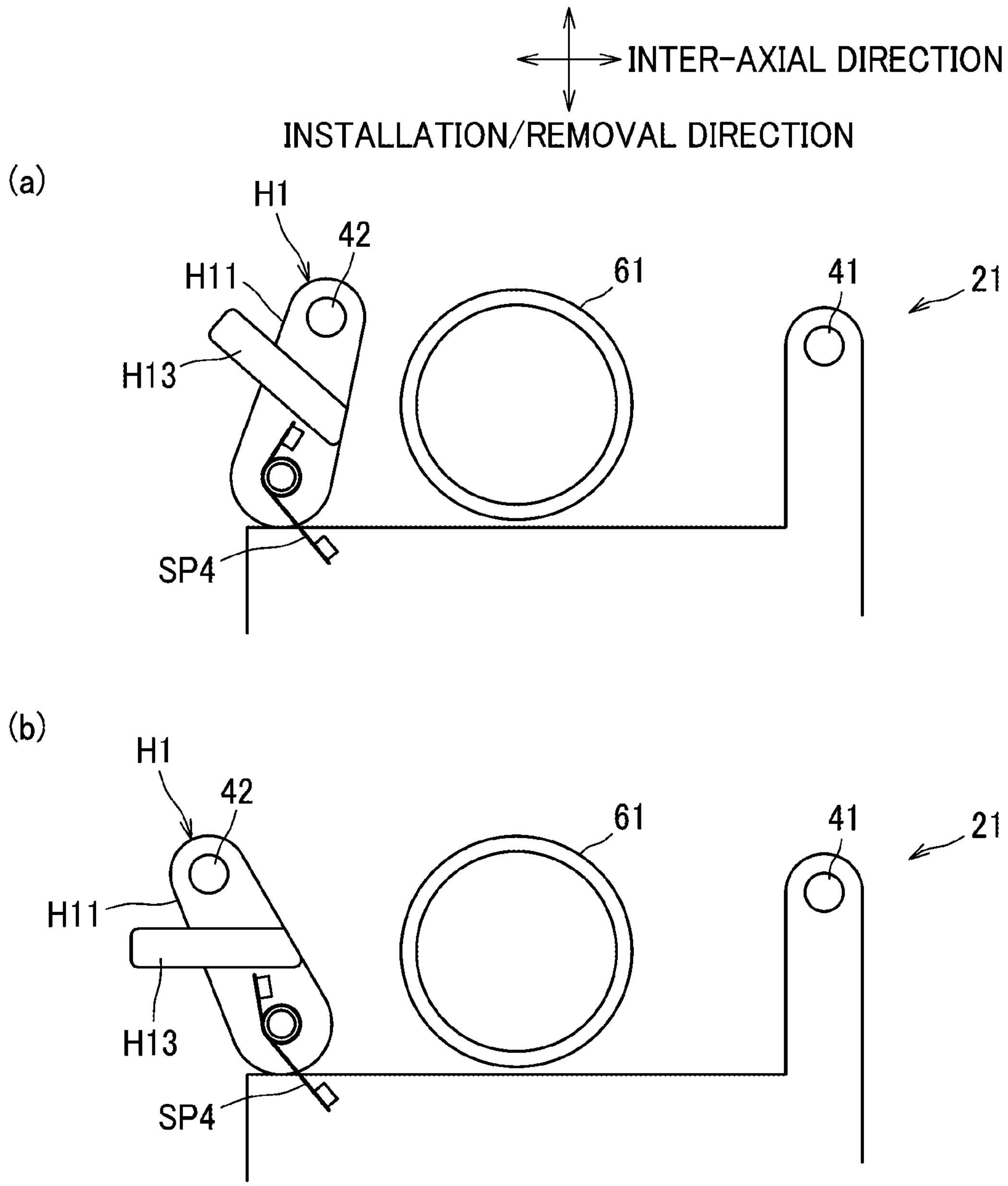
FIG. 27 includes views showing a modification of the layer transfer device including a view (a) showing a state in which the second guide shaft is positioned in the fourth position, and a view (b) showing a state in which the second guide shaft is positioned in the third position.

As shown in FIG. 27(*a*) and FIG. 27(*b*), the housing main body 21 may further include a fifth spring SP4 which biases the second guide shaft 42 from the third position shown in FIG. 27(*b*) to the fourth position shown in FIG. 27(*a*). Specifically, according to this configuration, the fifth spring SP4 is a torsion spring with one end engaging a part of the retaining member H1 and another end engaging a part of the housing main body 21. It is to be understood that, in the third embodiment, although the restriction portion stops the second guide shaft 42 positioned in the third position from further moving in a direction away from the heating roller 61 by contacting the retaining member H1 when the second guide shaft 42 is positioned in the third position, such stopping is not necessary according to this configuration.

According to this, when the lugs 22A press the retaining member H1 when the cover 22 is being closed, the second guide shaft 42 moves from the fourth position shown in FIG. 27(*a*) to the third position shown in FIG. 27(*b*) against the biasing force of the fifth spring SP4. When the cover is being opened, the cover 22 moves away from the retaining member H1, causing the second guide shaft 42 to move from the third position to the fourth position by the biasing force of the fifth spring SP4. Therefore, when installing or removing the layer transfer film cartridge FC, the second guide shaft 42 is positioned in the fourth position which is not in the way of installation and removal of the layer transfer film cartridge FC, thus the procedure of installing and removing the layer transfer film cartridge FC can be performed more easily.

The fifth spring SP4 is not limited to a torsion spring and may, for example, be a leaf spring, a coil spring, or a wire spring, etc.

Although the lugs 22A press the levers H13, H14 of the retaining member H1 in the third embodiment, the pressing member may, for example, be configured to press the arms H11, H12 of the retaining member H1. That is, in the process of the cover being closed, the second guide shaft may move from the fourth position to the third position by the pressing member pressing either part of the retaining member. Alternatively, the pressing member may directly press the second guide shaft 42.

Although a configuration in which the second guide shaft moves during the process of the cover being closed is given as an example in the third embodiment, the second guide shaft may move from the fourth position to the third position when the cover is being closed. For example, in a configuration further comprising an open/close sensor which detects that the cover is closed, and a driving source such as a motor or the like and a driving mechanism such as a train of gears or the like for moving the second guide shaft, the second guide shaft may be moved from the fourth position to the third position by driving the driving source on condition that the open/close sensor detects the cover has been closed.

Although the lugs 22A for pressing the retaining member H1 are provided at the cover 22 in the third embodiment, a pressing member may be provided at the housing main body. Specifically, for example, the pressing member may be configured to be movable relative to the housing main body, and a driving source and driving mechanism for moving the pressing member may be provided. Further, a configuration in which a user manually moves the second guide shaft without providing a pressing member on the housing is also possible.

Although the second guide shaft 42 is configured to be rotatable about the rotation axis X3 in the third embodiment, the second guide shaft may, for example, be slidably movable in a linear manner.

Although the second guide shaft 42 is given as an example of a guide shaft and the shaft 43 is given as an example of a portion of the layer transfer film cartridge in the third embodiment, the guide shaft may, for example, be the first guide shaft. Further, the portion of the layer transfer film cartridge may be a part that at least changes between a state overlapping the guide shaft and not overlapping the guide shaft, by movement of the guide shaft between the third position and the fourth position, and may, for example, be the take-up case 36.

Although a cylinder-shaped shaft 43 is given as an example of a film guide member in the third embodiment, the film guide member may, for example, be a plate-shaped blade BD1 such as shown in FIG. 10(*a*) and FIG. 10(*b*) similar to that of the first embodiment. Further, it may be, for example, a flat tube-shaped blade BD2 such as shown in FIG. 11(*a*) and FIG. 11(*b*).

Although the connecting portions 70 are comprised of two connecting portions 71, 72 in the third embodiment, there may be one connecting portion (for example, only a first connecting portion). Further, the connecting portion may be configured otherwise as long as it connects the supply unit and the take-up unit and may, for example, be a member that connects the supply case and the take-up case.

Although a device for transferring a transfer layer onto a toner image formed on a sheet S is given as an example of a layer transfer device in the third embodiment, the layer transfer device may, for example, be a device for transferring a transfer layer onto an ink image formed on a sheet or a device for transferring a transfer layer onto a sheet by a thermal head.

Although the transfer layer F22 containing foil is given as an example in the third embodiment, the transfer layer may, for example, not contain foil or colorant and may be formed of a thermoplastic resin.

Although the multilayer film F is formed of four layers in the third embodiment, the multilayer film may have any number of layers as long as it includes a transfer layer and a supporting layer.

The connecting portions may be indirectly connected to the supply reel or the take-up reel via the supply case or the take-up case by being integrally formed with the supply case or the take-up case. The connecting portions need not be formed in shapes of plates but may be formed in shapes of rods fixed to the supply case and the take-up case. The connecting portions may be made of plastic or metal.

The structure for fixing the take-up case or the supply case to the connecting portions may be any structure. For example, the take-up case and the supply case may be directly fixed to the connecting portions. Further, for example, the connecting portions 91, 92 and the take-up case 36, shown in FIG. 24, may be connected by a hollow member so that the take-up case 36 does not rotate relative to the connecting portions 91, 92, and an end of the take-up shaft 35A of the take-up reel 35 may be passed through the hollow member and connected to a take-up gear 35C or the like. In this case, the take-up reel 35 is rotatably supported by the hollow member.

A detailed description will be given of a fourth embodiment of the present invention with reference made to the drawings where appropriate. Although the fourth embodiment has a structure somewhat different from that of the first embodiment, since the structure thereof is basically approximately the same, the members approximately the same are identified by the same reference characters and explanation thereof is omitted as appropriate.

Figure 28:
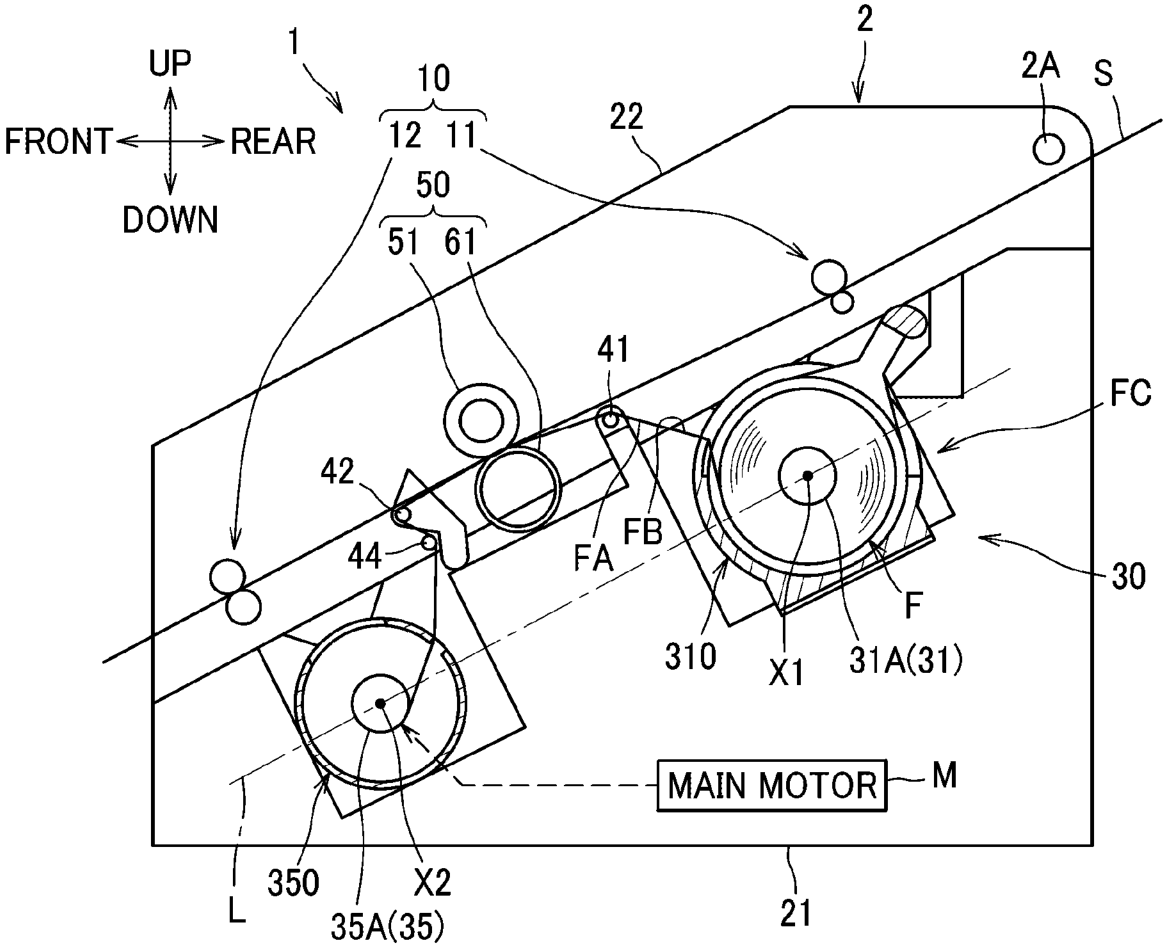
FIG. 28 is a view showing a layer transfer device.

As shown in FIG. 28(*a*), a cover 22 is rotatably supported by a housing main body 21. More specifically, the cover 22 is rotatable about a rotation axis 2A between a close position for covering an opening 21A (position of FIG. 28(*a*)) and an open position for uncovering the opening 21A (position of FIG. 29).

A film supply unit 30 includes a layer transfer film cartridge FC, a first guide shaft 41, a second guide shaft 42, a third guide shaft 44 and a main motor M.

A supply reel 31 is a reel for supplying a multilayer film F to the transfer unit 50, and a take-up reel 35 is a reel for taking up the multilayer film F having passed through the transfer unit 50. The multilayer film F is wound on the supply reel 31.

The second guide shaft 42 is a shaft for changing a traveling direction of the multilayer film F guided by the first guide shaft 41. The second guide shaft 42 contacts a first surface FA of the multilayer film F when the layer transfer film cartridge FC is installed in the housing main body 21.

When the layer transfer film cartridge FC is installed in the housing main body 21, a second surface FB facing away from the first surface FA and formed by a supported layer F2 including a transfer layer F22, of the surfaces of the multilayer film F extended and stretched between the first guide shaft 41 and the second guide shaft 42, contacts a sheet S conveyed by the sheet conveyor unit 10 and the pressure roller 51.

The third guide shaft 44 is a shaft for changing a traveling direction of the multilayer film F guided by the second guide shaft 42. More specifically, the third guide shaft 44 adjusts the angle of the multilayer film F at which the multilayer film F is peeled off from the sheet S. In a state in which the layer transfer film cartridge FC is installed in the housing main body 21 and the cover 22 is closed, the third guide shaft 44 contacts the second surface FB of the multilayer film F.

By the third guide shaft 44 being pressed against the second surface FB of the multilayer film F extended and stretched between the second guide shaft 42 and the take-up reel 35, a traveling direction of the multilayer film F guided by the second guide shaft 42 is changed in such a manner that an angle of the multilayer film F bent at the second guide shaft 42 (also referred to as "peeling angle" below) is adjusted to be relatively smaller. Specifically, the peeling angle is an angle formed by portions of the multilayer film F extended and stretched between the first guide shaft 41 and the second guide shaft 42, and extended and stretched between the second guide shaft 42 and the third guide shaft 44. The smaller the peeling angle, the easier the separation of the sheet S having passed the second guide shaft 42 from the multilayer film F.

Figure 30:
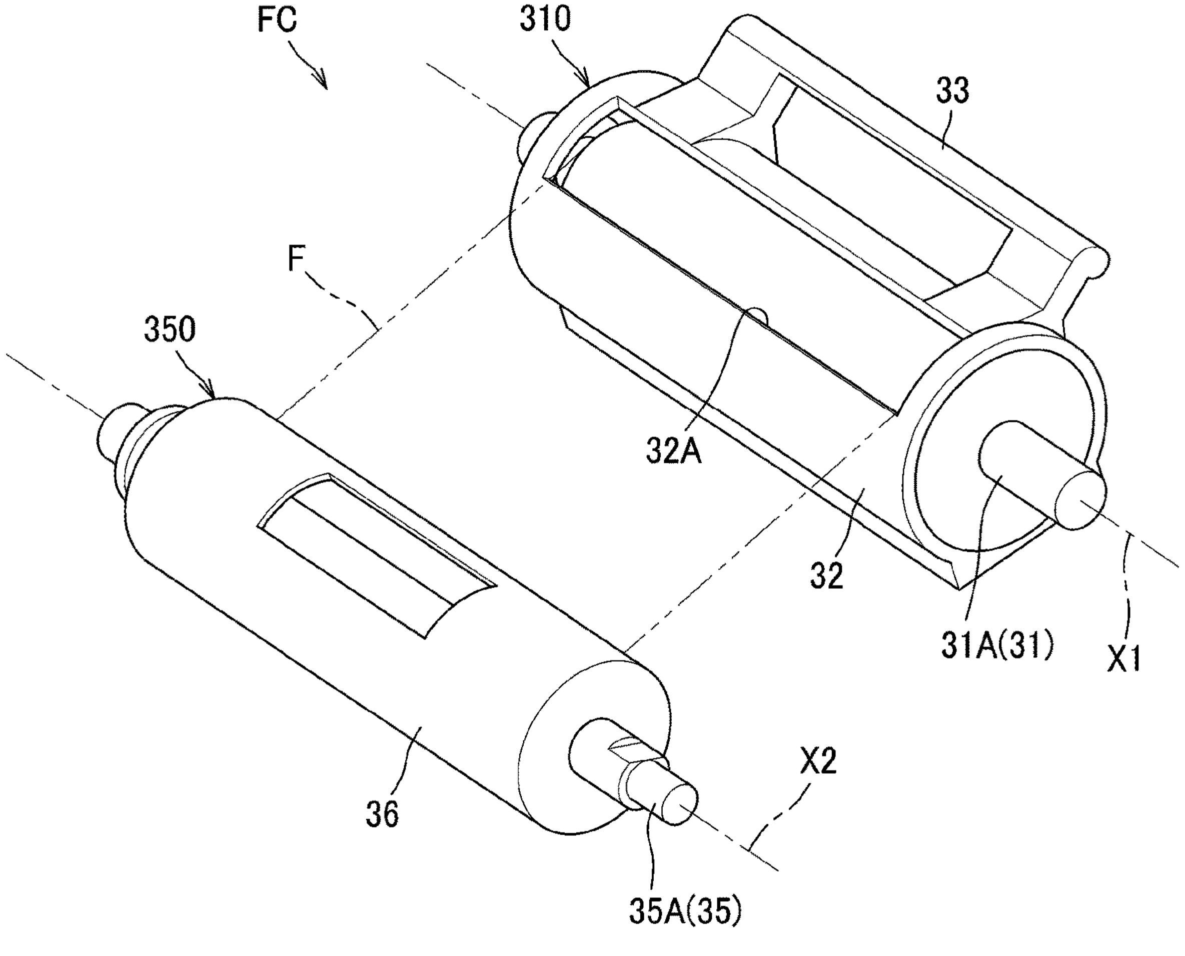
FIG. 30 is a perspective view of a layer transfer film cartridge.

The guide shafts 41, 42, 44 may be either rotatably supported or non-rotatably supported. As shown in FIG. 30, the layer transfer film cartridge FC includes a handle 33 in addition to the supply unit 310 and the take-up unit 350.

The supply unit 310 includes a supply case 32 in addition to the supply reel 31. Further, the take-up unit 350 includes a take-up case 36 in addition to the take-up reel 35. In the following description, a direction along a rotation axis X1 of the supply reel 31 is referred to as "first axial direction" and a direction along a rotation axis X2 of the take-up reel 35 is referred to as "second axial direction".

The supply case 32 is a case which houses the supply reel 31 and is formed in a hollow near cylindrical shape. More specifically, the supply case 32 houses the multilayer film F wound on the supply shaft 31A of the supply reel 31. The supply shaft 31A of the supply reel 31 protrudes outward from the end surfaces of the supply case 32 in the first axial direction. The supply reel 31 is rotatably supported by the supply case 32. The supply case 32 has a supply opening 32A through which the multilayer film F passes. The supply opening 32A guides the multilayer film F from an inside to an outside of the supply case 32.

The take-up case 36 is a case which houses the take-up reel 35 and is formed in a hollow cylindrical shape. More specifically, the take-up case 36 houses the multilayer film F wound on the take-up shaft 35A of the take-up reel 35. The take-up shaft 35A of the take-up reel 35 protrudes outward from the end surfaces of the take-up case 32 in the second axial direction. The take-up reel 35 is rotatably supported by the take-up case 36. A take-up gear (not shown) which receives a driving force from the main motor M is fixed to one end of the take-up shaft 35A in the second axial direction.

Figure 29:
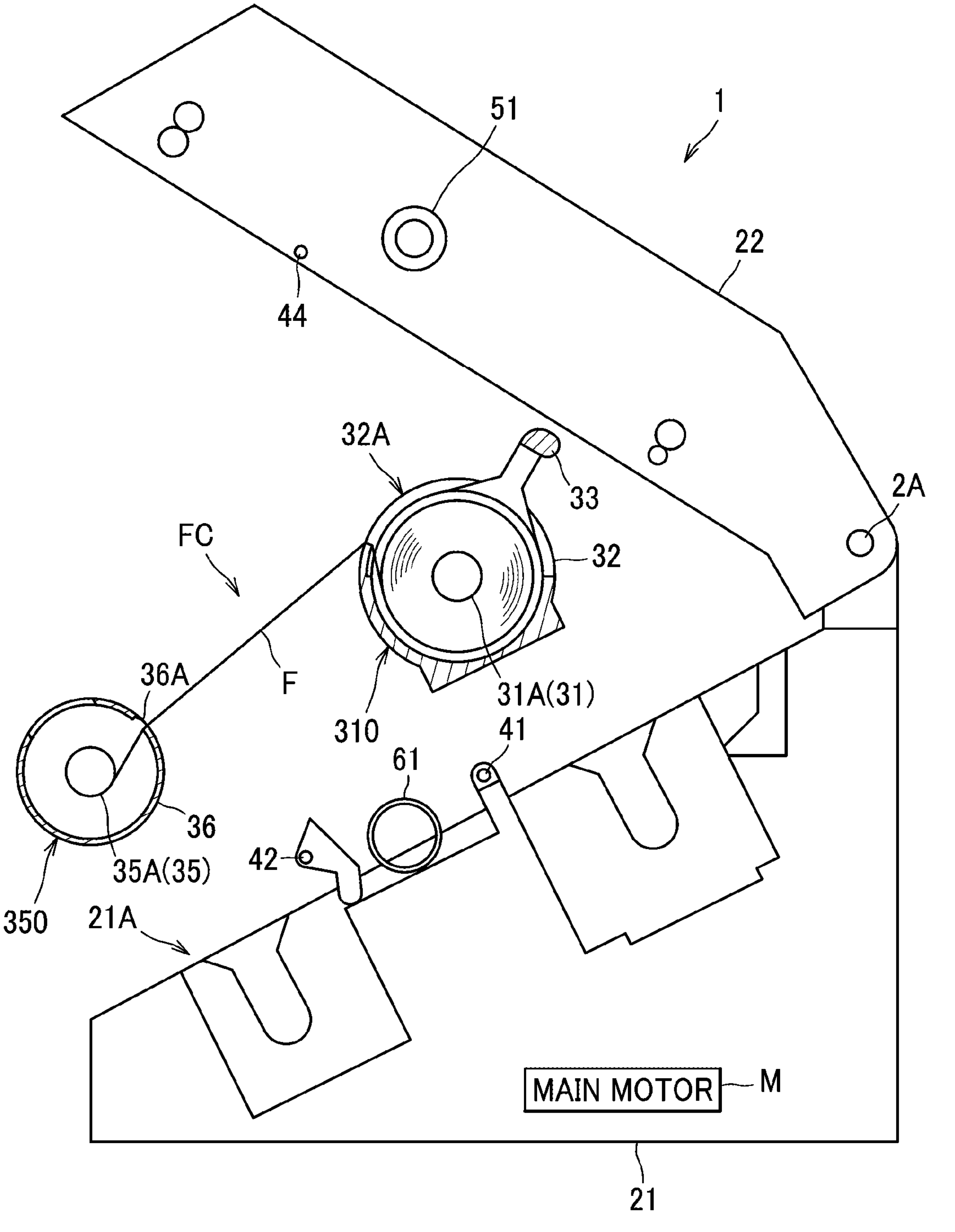
FIG. 29 is a view showing the layer transfer device in a state in which the cover is open.

As shown in FIG. 29, the take-up case 36 has a take-up opening 36A through which the multilayer film F passes. The take-up opening 36A guides the multilayer film F from an outside to an inside of the take-up case 36. The multilayer film F is supported by the edge of the supply opening 32A and the edge of the take-up opening 36A, so that it may be extended and stretched between the supply reel 31 and the take-up reel 35.

The handle 33 is a part which allows user's fingers to be hooked. The handle 33 is positioned at the supply unit 310 and extends in the first axial direction. More specifically, the handle 33 is supported by the supply case 32. The handle 33 protrudes from the outer peripheral surface of the supply case 32 in a direction non-parallel to, more specifically, in a direction that is perpendicular to the rotation axis X1 (see FIG. 30).

Figure 31:
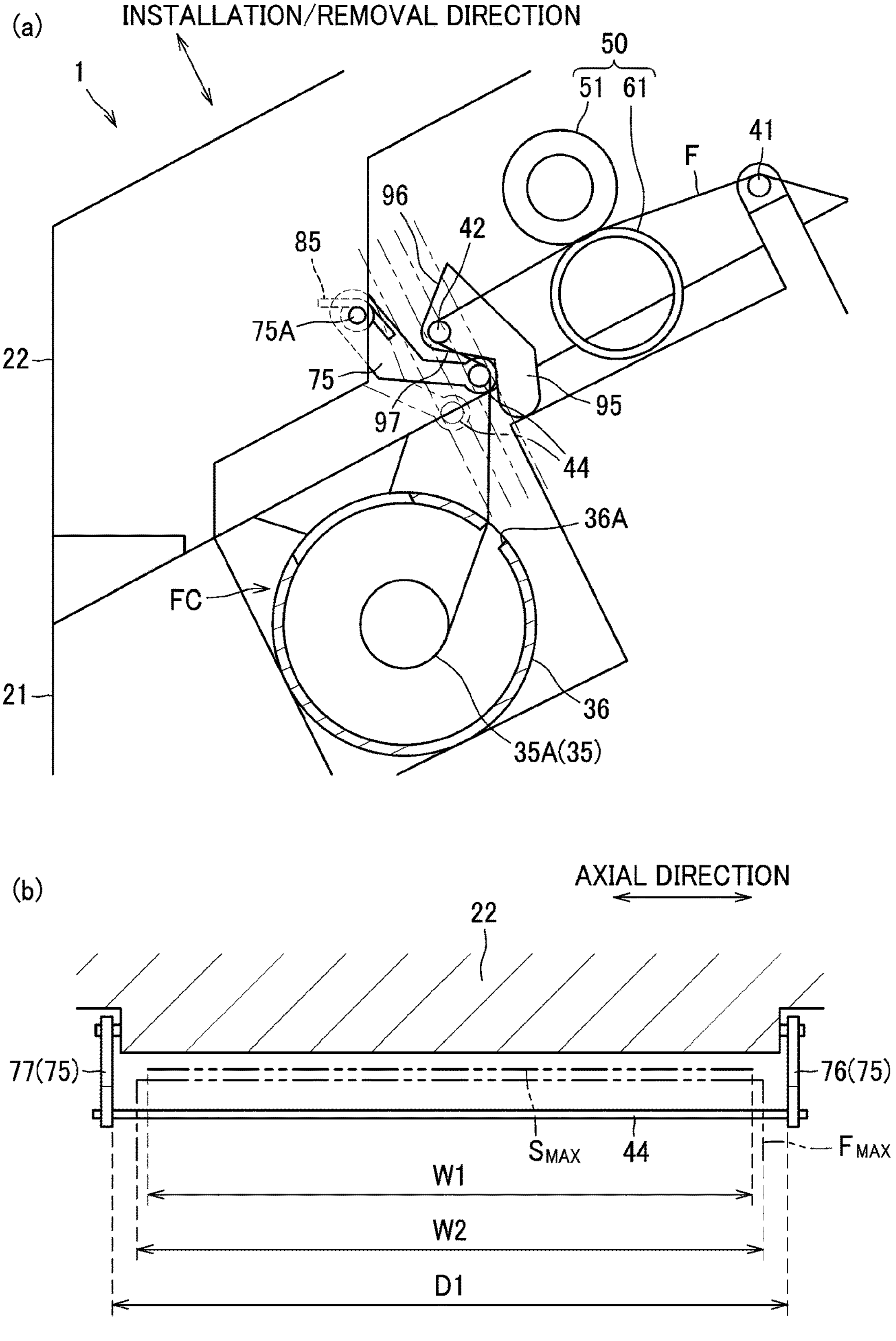
FIG. 31 includes views (a), (b) showing a supporting structure for a third guide shaft of a layer transfer device according to a fourth embodiment.

As shown in FIG. 31(*a*), the first guide shaft 41 and the second guide shaft 42 are supported by the housing main body 21, and the third guide shaft 44 is supported by the cover 22. That is, the housing main body 21 includes the first guide shaft 41 and the second guide shaft 42, and the cover 22 includes the third guide shaft 44. In other words, the housing 2 comprises the first guide shaft 41 and the second guide shaft 42 provided at the housing main body 21 and the third guide shaft 44 provided at the cover 22.

The first guide shaft 41 and the second guide shaft 42 are immovably supported by the housing main body 21. That is, the first guide shaft 41 and the second guide shaft 42 are fixed to the housing main body 21.

The third guide shaft 44 is immovably supported by the cover 22 and is movable with respect to the housing main body 21. Specifically, the third guide shaft 44 is supported by the cover 22 movably between a fifth position, shown by solid lines, in which the third guide shaft 44 contacts the multilayer film F guided by the second guide shaft 42 and changes a traveling direction of the multilayer film F, and a sixth position, shown by imaginary lines, different from the fifth position. In this way, the third guide shaft 44 is movable between the fifth position and the sixth position relative to the housing main body 21.

Herein, the supporting structure for the third guide shaft 44 will be explained in detail. In the following description, an axial direction in which the third guide shaft 44 extends, i.e., an axial direction of the third guide shaft 44 is simply referred to as “axial direction”, and an installation/removal direction of the layer transfer film cartridge FC relative to the housing main body 21 is simply referred to as “installation/removal direction”. In the present embodiment, the installation/removal direction is perpendicular to the axial direction. Further, the installation/removal direction is a direction perpendicular to a straight line L connecting the rotation axes X1, X2 (see FIG. 1) in a state in which the layer transfer film cartridge FC is installed in the housing main body 21.

The layer transfer device 1 comprises a first support member 75 and a sixth spring 85.

As shown in FIG. 31(*a*) and FIG. 31 (*b*), the first support member 75 is a member that supports the third guide shaft 44, and includes a third arm 76 and a fourth arm 77. The third arm 76 supports one end of the third guide shaft 44 in the axial direction, and the fourth arm 77 supports another end of the third guide shaft 44 in the axial direction. The third arm 76 and the fourth arm 77 are members with elongate shapes extending in the installation/removal direction each configured with one end in the longitudinal direction supporting the third guide shaft 44 and the other end in the longitudinal direction supported by the cover 22. Thus, the first support member 75 supports the third guide shaft 44 at a position spaced apart from the cover 22.

The first support member 75 supports the third guide shaft 44 at a position outward of a position of a sheet $S_{MAX}$ in the axial direction. The sheet $S_{MAX}$ is a sheet S with a maximum width in the axial direction, of the sheets S that are conveyable through the housing 2 of the layer transfer device 1. More specifically, the third arm 76 is positioned outward of one end of the sheet $S_{MAX}$ in the axial direction, and the fourth arm 77 is positioned outward of another end of the sheet $S_{MAX}$ in the axial direction. Thus, the distance DI between the third arm 76 and the fourth arm 77 is greater than the width W1 of the sheet $S_{MAX}$.

In further detail, the first support member 75 supports the third guide shaft 44 at a position outward of a multilayer film $F_{MAX}$ in the axial direction. The multilayer film $F_{MAX}$ is a multilayer film F with a maximum width in the axial direction, of the multilayer films F than are conveyable in the housing 2. The third arm 76 is positioned outward of one end of the multilayer film $F_{MAX}$ in the axial direction, and the fourth arm 77 is positioned outward of another end of the multilayer film $F_{MAX}$ in the axial direction. Therefore, the distance DI is greater than a width W2 of the multilayer film $F_{MAX}$. In the present embodiment, the width W2 of the multilayer film $F_{MAX}$ is greater that the width W1 of the sheet $S_{MAX}$.

The first support member 75 is configured in such a manner that the other end of the third arm 76 in the longitudinal direction and the other end of the fourth arm 77 in the longitudinal direction and are rotatably supported by the cover 22. More specifically, the third arm 76 and the fourth arm 77 are rotatable relative to the cover 22 about a rotation axis 75A parallel to the axial direction. Thus, the first support member 75 supports the third guide shaft 44 with respect to cover 22 rotatably between the fifth position shown by solid lines and the sixth position shown by imaginary lines.

The sixth spring 85 is a spring which biases the third guide shaft 44 from the sixth position toward the fifth position. Specifically, one sixth spring 85 is positioned to correspond to each of the third arm 76 and the fourth arm 77 and biases the third arm 76 and the fourth arm 77 in a counterclockwise direction of FIG. 31(*a*). As one example, the sixth spring 85 is a helical torsion spring.

Although not shown in the drawings, a restriction portion is provided at the cover 22 which restriction portion restricts further rotation of the third arm 76 and the fourth arm 77 and restricts the position of the third guide shaft 44 to the fifth position, by being contacted by the arms 76, 77 biased in the counterclockwise direction of FIG. 31(*a*).

The third guide shaft 44 in the fifth position shown by solid lines overlaps the second guide shaft 42 when projected in the installation/removal direction. This allows the peeling angle of the multilayer film F to be set at an appropriate angle. Further, the third guide shaft 44 in the sixth position shown by imaginary lines does not overlap the second guide shaft 42 when projected in the installation/removal direction. This allows the cover 22 to be opened or closed without interference of the third guide shaft 44 with the second guide shaft 42.

The housing main body 21 comprises pressing portions 95 which move the third guide shaft 44 from a fifth position to a sixth position when the cover is opened or closed. The pressing portions 95 are fixed to the housing main body 21. The pressing portions 95 are positioned at both axial ends of the second guide shaft 42; the pressing portion 95 positioned at one axial end supports the one axial end of the second guide shaft 42, and the pressing portion 95 positioned at another axial end supports another axial end of the second guide shaft 42.

Each pressing portion 95 has a first pressing surface 96 and a second pressing surface 97.

The first pressing surface 96 is a surface the first support member 75 contacts in the process of the cover 22 moving from an open position to a close position. The first pressing surface 96 is inclined in such a manner that it is positioned gradually farther from the first guide shaft 41 and the transfer unit 50, from an upstream side toward a downstream side (approximately from the top to the bottom in the drawings) in a direction that the layer transfer film cartridge FC is installed into the housing main body 21.

Accordingly, the first pressing surface 96 moves the third shaft 44 from the fifth position to the sixth position against the biasing force of the sixth spring 85, as the cover 22 moves from the open position to the close position. The third guide shaft 44 moves from the sixth position to the fifth position by the biasing force of the sixth spring 85, as the cover 22 moves from the open position to the close position and the tip portion of the first support member 75 moves out of contact with the first pressing surface 96 (the pressing portion 95).

The second pressing surface 97 is a surface the first support member 75 contacts in the process of the cover 22 moving from the close position to the open position. The second pressing surface 97 is inclined in such a manner that it is positioned gradually farther from the first guide shaft 41 and the transfer unit 50, from the downstream side toward the upstream side (approximately from the bottom to the top in the drawings) in the direction that the layer transfer film cartridge FC is installed into the housing main body 21.

Accordingly, the second pressing surface 97 moves the third shaft 44 from the fifth position to the sixth position against the biasing force of the sixth spring 85, as the cover 22 moves from the close position to the open position. The third guide shaft 44 moves from the sixth position to the fifth position by the biasing force of the sixth spring 85, as the cover 22 moves from the close position to the open position and the tip portion of the first support member 75 moves out of contact with the second pressing surface 97.

Next, the operation and advantageous effects of the layer transfer device 1 of the present embodiment will be described.

Figure 32:
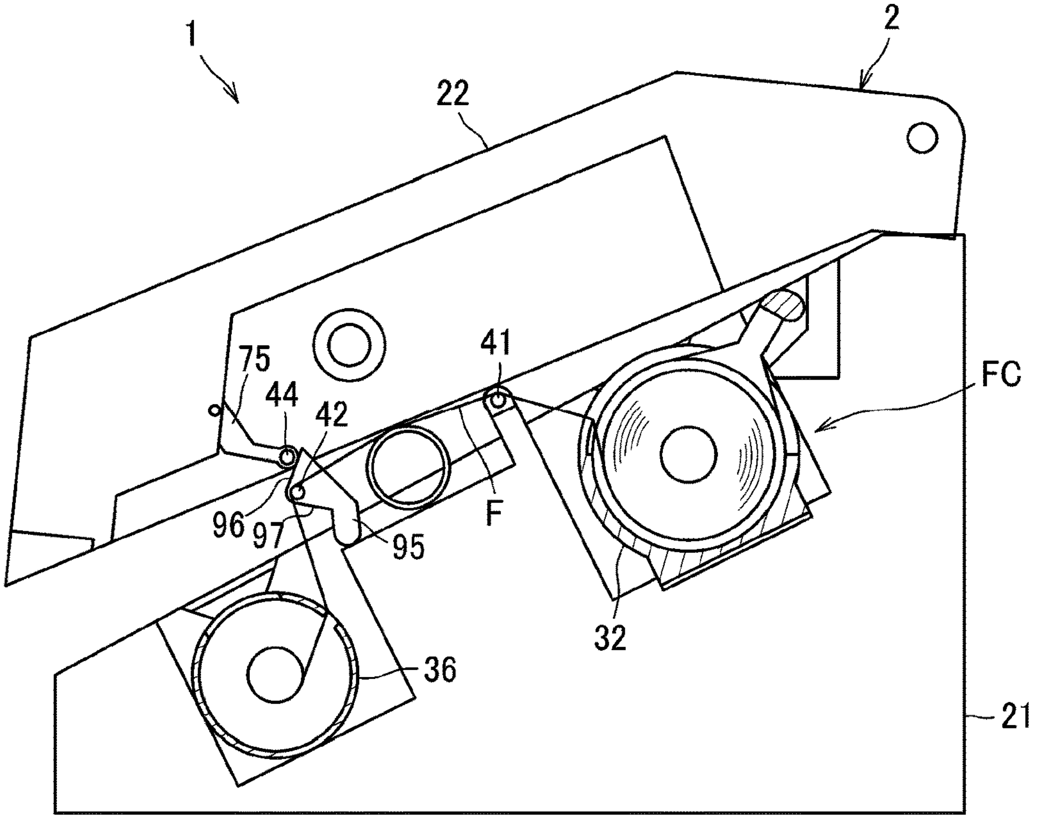
FIG. 32 includes views (a), (b) showing motions of the third guide shaft moving from a fifth position to a sixth position in conjunction with an action of closing a cover.
Figure 32:
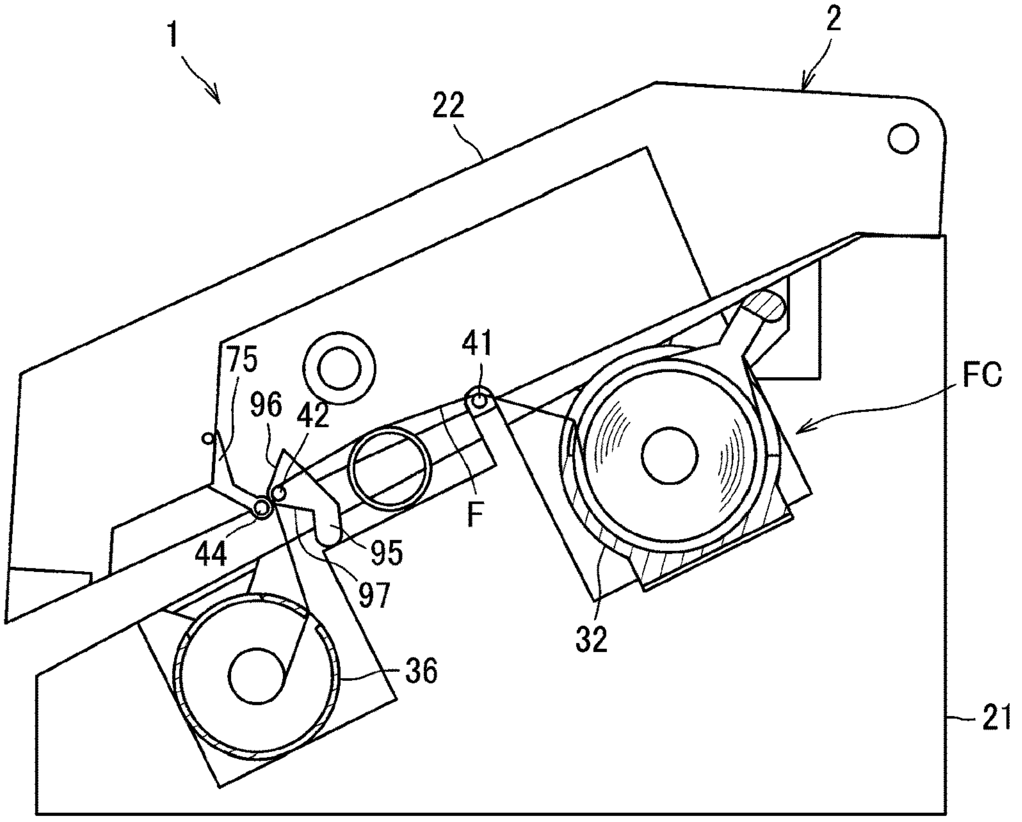

As shown in FIG. 29, as the layer transfer film cartridge FC is being installed into the housing main body 21, the multilayer film F extended between the supply case 32 and the take-up case 36 contacts the first guide shaft 41 and the second guide shaft 42. After that, as the layer transfer film cartridge FC is further installed, as shown in FIG. 32(*a*), the multilayer film F is extended between adjacent members of the supply case 32, the first guide shaft 41, the second guide shaft 42 and the take-up case 36.

After the layer transfer film cartridge FC is installed into the housing main body 21, as the cover 22 is closed from the open position, the tip portion of the first support member 75 contacts the first pressing surfaces 96 of the pressing portions 95. After that, as the cover 22 is being closed, the third guide shaft 44 moves, as shown in FIG. 32(*b*), via the first support member 75, from the fifth position to the sixth position by the reaction force of the first pressing surface 96 against the biasing force of the sixth spring 85 (see FIG. 31(*a*)). Accordingly, since the third guide shaft 44 moves out of the way of the second guide shaft 42, the third guide shaft 44 will no longer interfere with the second guide shaft 42.

After the third guide shaft 44 moves to the sixth position, as the cover 22 is being closed, the third guide shaft 44 moves, via the first support member 75, from the sixth position to the fifth position by the biasing force of the sixth spring 85, at a point where the tip portion of the first support member 75 no longer contacts the first pressing surface 96.

Figure 33:
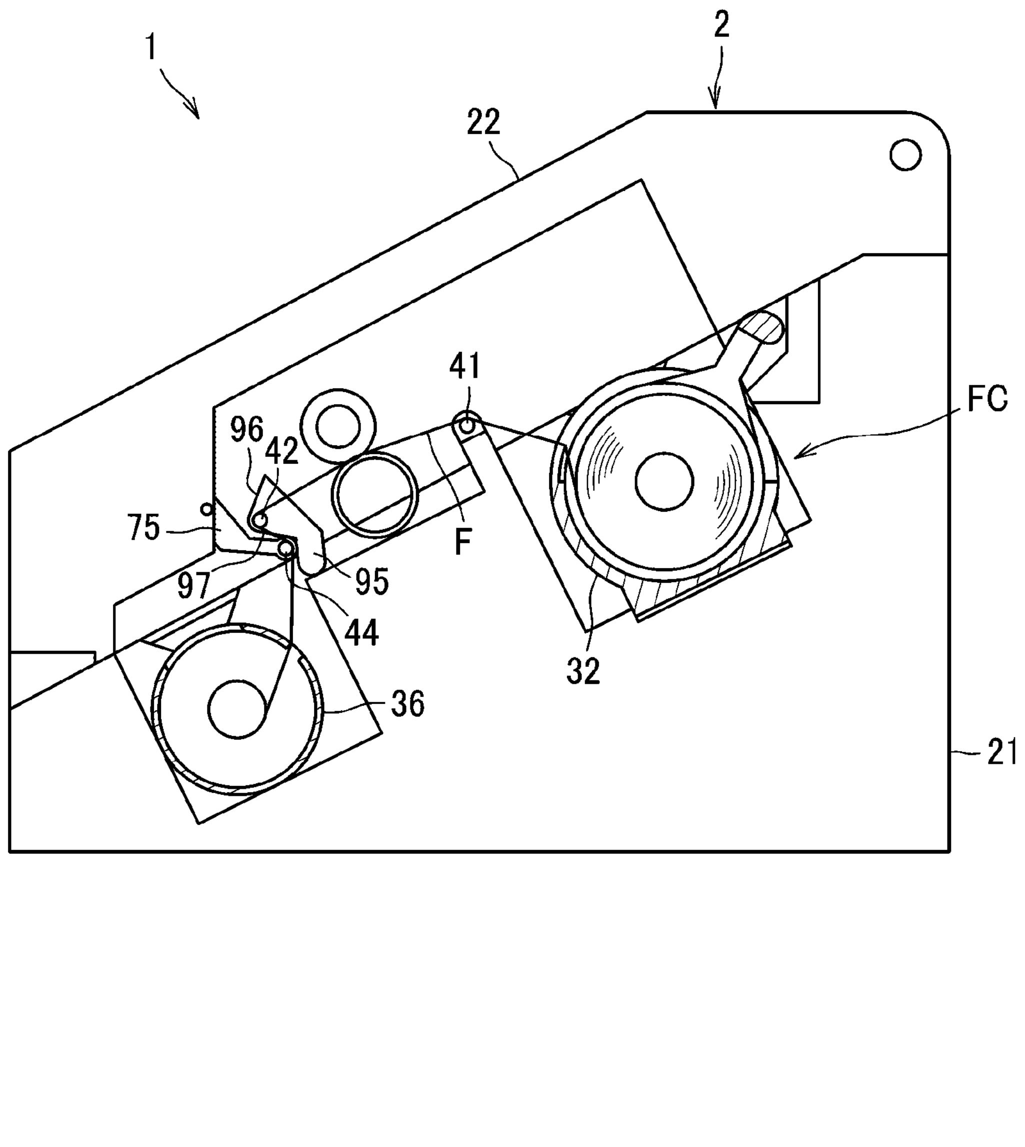
FIG. 33 is a view showing the cover in a closed state.

The third guide shaft 44 contacts the multilayer film F extended and stretched between the second guide shaft 42 and the take-up case 36 before reaching the fifth position. After that, as the cover 22 is being closed, the third guide shaft 44 presses the multilayer film F extended and stretched between the second guide shaft 42 and the take-up case 36 toward the supply case 32. As shown in FIG. 33, when the cover 22 reaches the close position and the third guide shaft 44 reaches the fifth position, the peeling angle of the multilayer film F is set at an appropriate angle.

To remove the layer transfer film cartridge FC from the housing main body 21, the cover 22 is opened from the close position. Then, the tip portion of the first support member 75 contacts the second pressing surfaces 97 of the pressing portions 95. After that, as the cover 22 is further opened, the third guide shaft 44 moves, as shown in FIG. 32(*b*), via the first support member 75, from the fifth position to the sixth position by the reaction force of the second pressing surface 97 against the biasing force of the sixth spring 85. Accordingly, the third guide shaft 44 will no longer interfere with the second guide shaft 42.

After the third guide shaft 44 moves to the sixth position, as the cover 22 is further opened, as shown in FIG. 32(*a*), the tip portion of the first support member 75 no longer contacts the second pressing surface 97, and the third guide shaft 44 moves, via the first support member 75, from the sixth position to the fifth position by the biasing force of the sixth spring 85. After the cover 22 reaches the open position, as shown in FIG. 29, the layer transfer film cartridge FC becomes removable from the housing main body 21.

According to the present embodiment described above, since the housing 2 comprising the housing main body 21 includes the guide shafts 41, 42, 44, the layer transfer film cartridge FC may be configured to have a simple structure compared to a configuration in which the layer transfer film cartridge includes the guide shafts. Thus, the cost, for example, of the layer transfer film cartridge FC which is a replacement member can be reduced.

Further, by the third guide shaft 44 moving from the fifth position which is a position for use, to the sixth position different from the fifth position, the layer transfer film cartridge FC and the third guide shaft 44 can be kept from interfering with each other during installation or removal of the layer transfer film cartridge FC. Accordingly, flexibility in design can be increased.

Since the third guide shaft 44 is supported by the cover 22, the third guide shaft 44 is retracted from an inside of the housing main body 21 by opening the cover 22. Accordingly, a structure provided in the housing main body 21 for installation and removal of the layer transfer film cartridge FC, for example, a guide or the like for installation and removal can be configured to have a simple structure.

Since the first support member 75 supports the third guide shaft 44 outward of the sheet $S_{MAX}$ in the axial direction and at a position spaced apart from the cover 22, a sheet S can be passed through between the third guide shaft 44 and the cover 22.

Since the distance DI between the third arm 76 and the fourth arm 77 of the first support member 75 is larger than the width W1 if the sheet $S_{MAX}$, the sheet S can be passed through between the third guide shaft 44 and the cover 22; at the same time, since one end and another end of the third guide shaft 44 are respectively supported by the arms 76, 77, the third guide shaft 44 can be made to uniformly contact the multilayer film F, compared to when only one end of the third guide shaft is supported.

Since the third guide shaft 44 is supported by the cover 22 movably between the fifth position and the sixth position in a configuration in which the second guide shaft 42 is fixed to the housing main body 21, the third guide shaft 44 dodges interfering with the second guide shaft 42 by movement of the third guide shaft 44 to the sixth position, when the cover 22 is being opened or closed. Accordingly, as in the fifth embodiment described below, for example, the cover itself does not have to move in such a manner as to cause the third guide shaft to move out of the way of the second guide shaft, the structure for supporting the cover 22 on the housing main body 21 can be configured in a simple structure and the cover 22 can be smoothly opened or closed.

Since the third guide shaft 44 is caused to move from the fifth position to the sixth position by the pressing portions 95 against the biasing force of the sixth spring 85, and to move from the sixth position to the fifth position by the biasing force of the sixth spring 85, for example, a procedure of moving the third guide shaft to the sixth position in advance and then moving the third guide shaft to the fifth position after closing the cover does not have to be performed when opening or closing the cover 22. Accordingly, the time it takes until the layer transfer device 1 is ready to be used can be made shorter. Further, the operability of the layer transfer device 1 can be improved compared to a configuration in which the third guide shaft is manually moved between the fifth position and the sixth position.

Although the present embodiment is configured such that the first support member 75 supporting the third guide shaft 44 with respect to the cover 22 in such a manner that the third guide shaft 44 is movable contacts the pressing portions 95, for example, an alternative configuration in which the third guide shaft directly contacts the pressing portions is also possible. In this case, the third guide shaft moves from the fifth position to the sixth position against the biasing force of the sixth spring as the cover moves from the open position to the close position, and thereafter when the third guide shaft moves out of contact with the pressing portions, it moves from the sixth position to the fifth position by the biasing force of the sixth spring.

Next, a description will be given of a fifth embodiment. In the following description, the members similar to those of the fourth embodiment are identified by the same reference characters and explanation thereof is omitted as appropriate; the points different from the fourth embodiment previously described will be described in detail.

Figure 34:
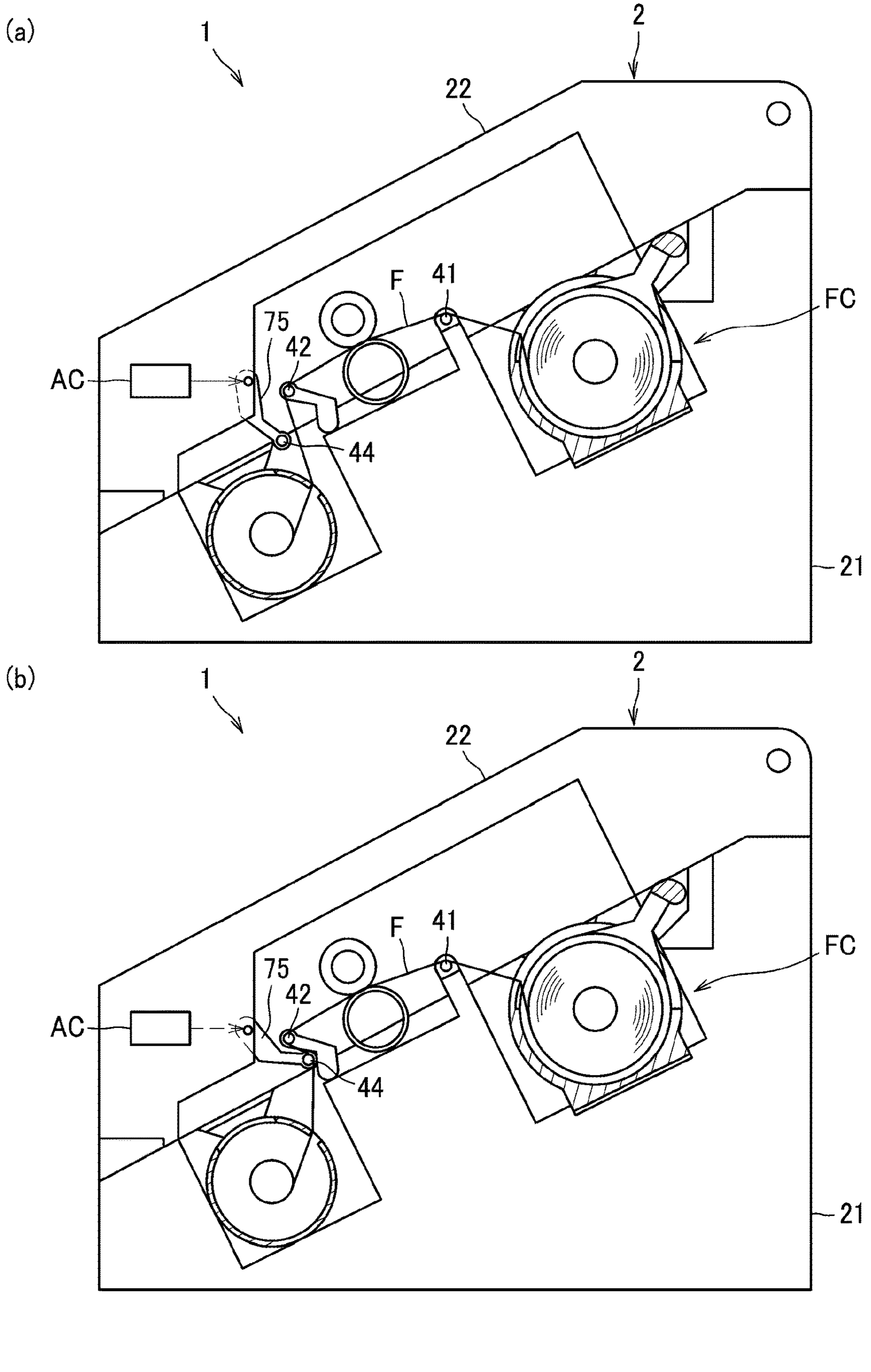
FIG. 34 includes views (a), (b) of a layer transfer device according to a fifth embodiment.

The layer transfer device 1 of the present embodiment does not comprise the pressing portion 95 described in the fourth embodiment. Instead, as shown in FIG. 34, the layer transfer device 1 of the present embodiment comprises a solenoid actuator AC as a driving source for moving the third guide shaft 44.

The solenoid actuator AC is provided at the cover 22. By applying power to the solenoid actuator AC to turn it on, a plunger (not shown) presses the first support member 75, and causes the first support member 75 to rotate in the clockwise direction of the drawings against the biasing force of the sixth spring 85 (see FIG. 31(*a*)). As a result, the third guide shaft 44 moves from the fifth position shown in FIG. 34(*b*) to the sixth position shown in FIG. 34(*a*). On the other hand, by stopping the power to the solenoid actuator AC to turn it off, the first support member 75 rotates in the counterclockwise direction of the drawings by the biasing force of the sixth spring 85 (see FIG. 31(*a*)). As a result, the third guide shaft 44 moves from the sixth position shown in FIG. 34(*a*) to the fifth position shown in FIG. 34(*b*).

In such a configuration, since the third guide shaft 44 can be caused to move to the sixth position when the cover 22 is opened or closed, by turning the solenoid actuator AC on, the cover 22 can be opened or closed without interference of the third guide shaft 44 with the second guide shaft 42. Further, since the third guide shaft 44 can be moved to the fifth position when the cover 22 is closed by turning the solenoid actuator AC off, the peeling angle of the multilayer film F can be set at an appropriate angle.

Although the solenoid actuator AC is given as an example of a driving source in the present embodiment, the driving source may, for example, be a motor or the like.

Next a sixth embodiment will be described.

Figure 35:
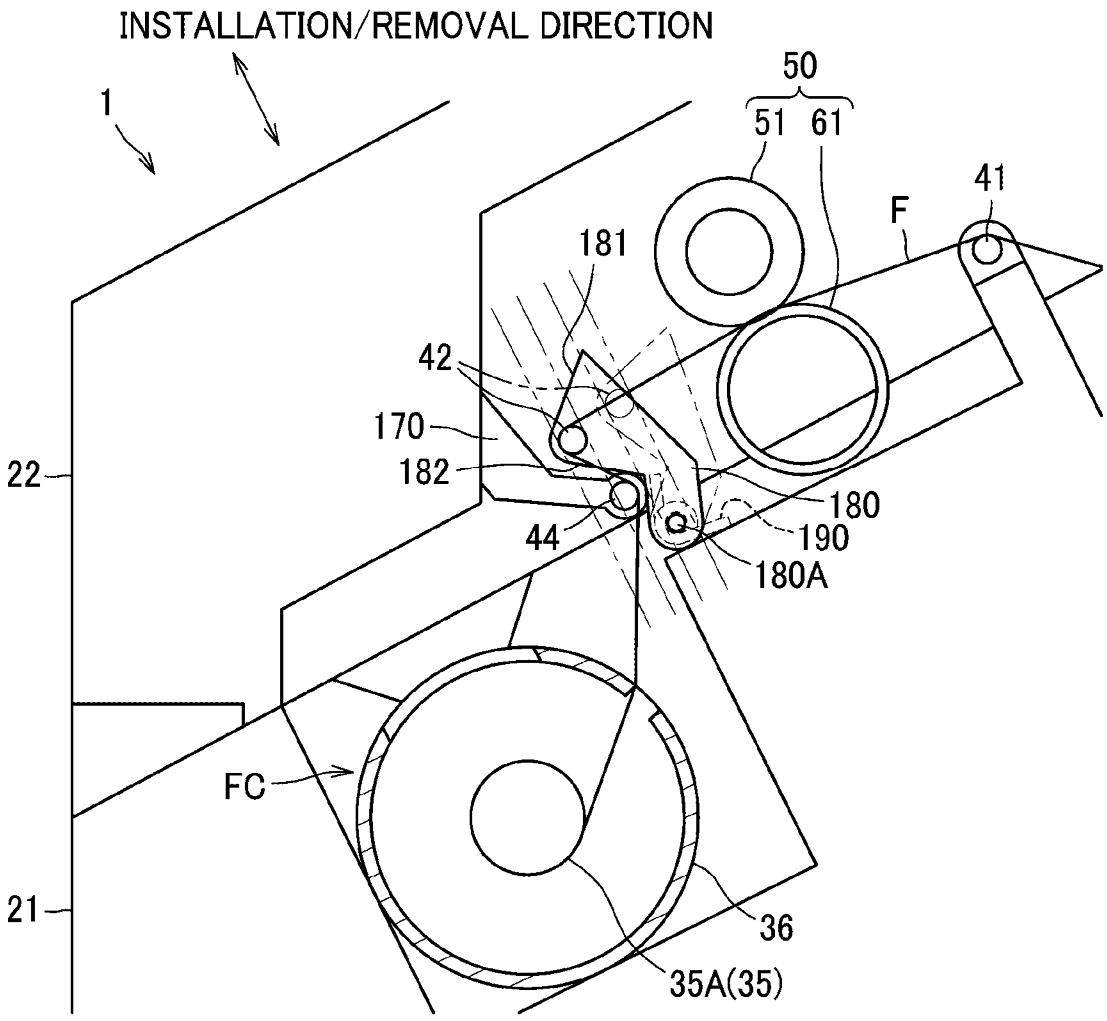
FIG. 35 is a view showing a supporting structure for a second guide shaft of a layer transfer device according to a sixth embodiment.

Although the third guide shaft 44 is movably supported by the cover 22 in the fourth embodiment, the third guide shaft 44 in the present embodiment, as shown in FIG. 35, is immovably supported by the cover 22. In other words, the third guide shaft 44 is fixed to the cover 22. On the other hand, in the present embodiment, the second guide shaft 42 is movably supported by the housing main body 21. Specifically, the layer transfer device 1 comprises third support members 170, second support members 180 and seventh springs 190.

The third support members 170 are members that support the third guide shaft 44. The third support members 170 are positioned at one axial end and another axial end of the third guide shaft 44; the third support member 170 positioned at the one axial end supports the one axial end of the third guide shaft 44, and the third support member 170 positioned at the another axial end supports the another axial end of the third guide shaft 44.

Each of the third support members 170 is a member with an elongate shape configured to extend in the installation/removal direction with one end in the longitudinal direction supporting the third guide shaft 44 and the other end in the longitudinal direction fixedly supported by the cover 22. The third support members 170 support the third guide shaft 44 at a position spaced apart from the cover 22, in a manner similar to the first support member 75 of the fourth embodiment. The distance between the two third support members 170 is greater than the width W1 of the sheet $S_{MAX}$ and the width W2 of the multilayer film $F_{MAX}$ (see FIG. 31(*b*)).

Figure 36:
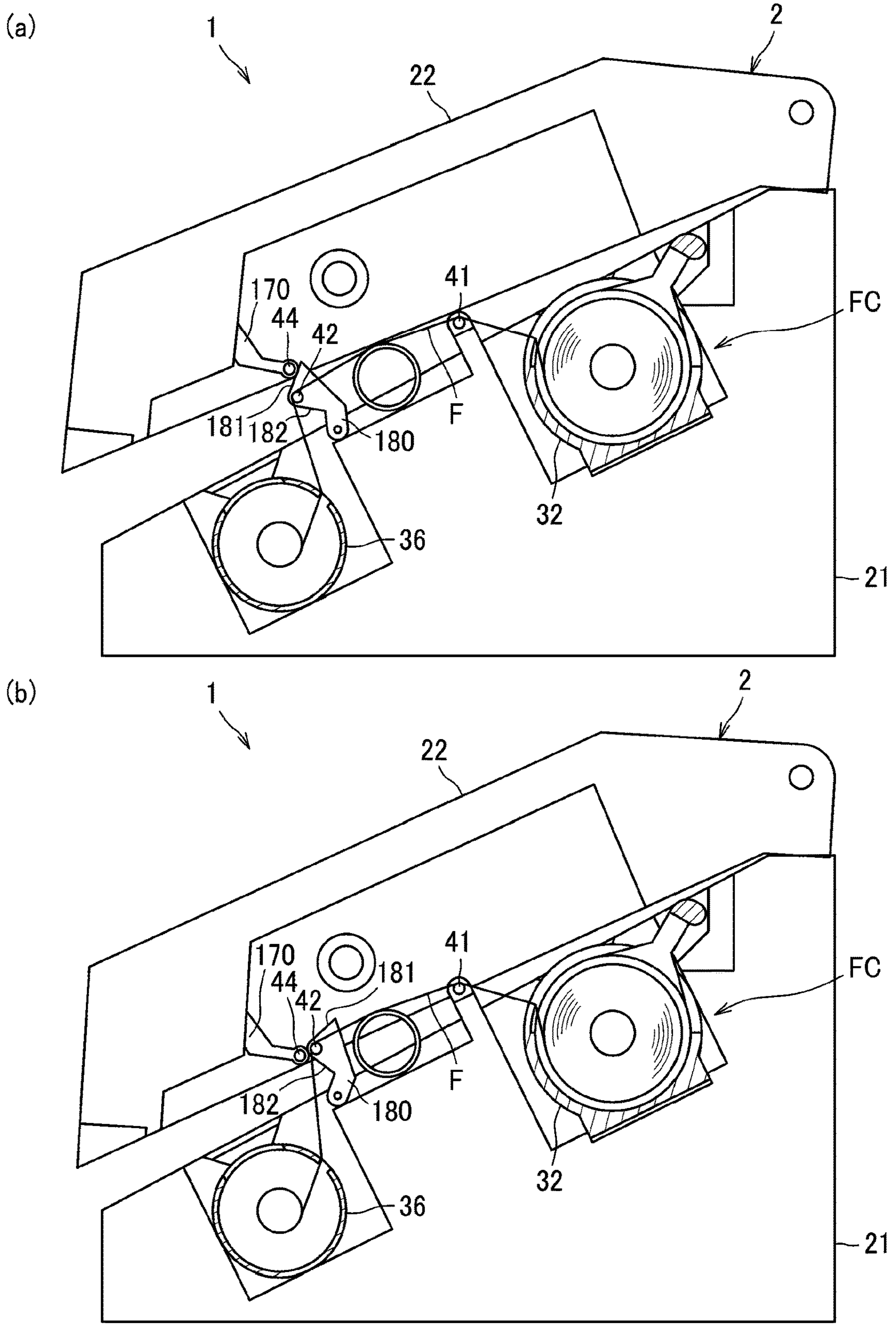
FIG. 36 includes views (a), (b) showing motions of a second guide shaft moving from a seventh position to an eighth position in conjunction with an action of closing a cover.
Figure 37:
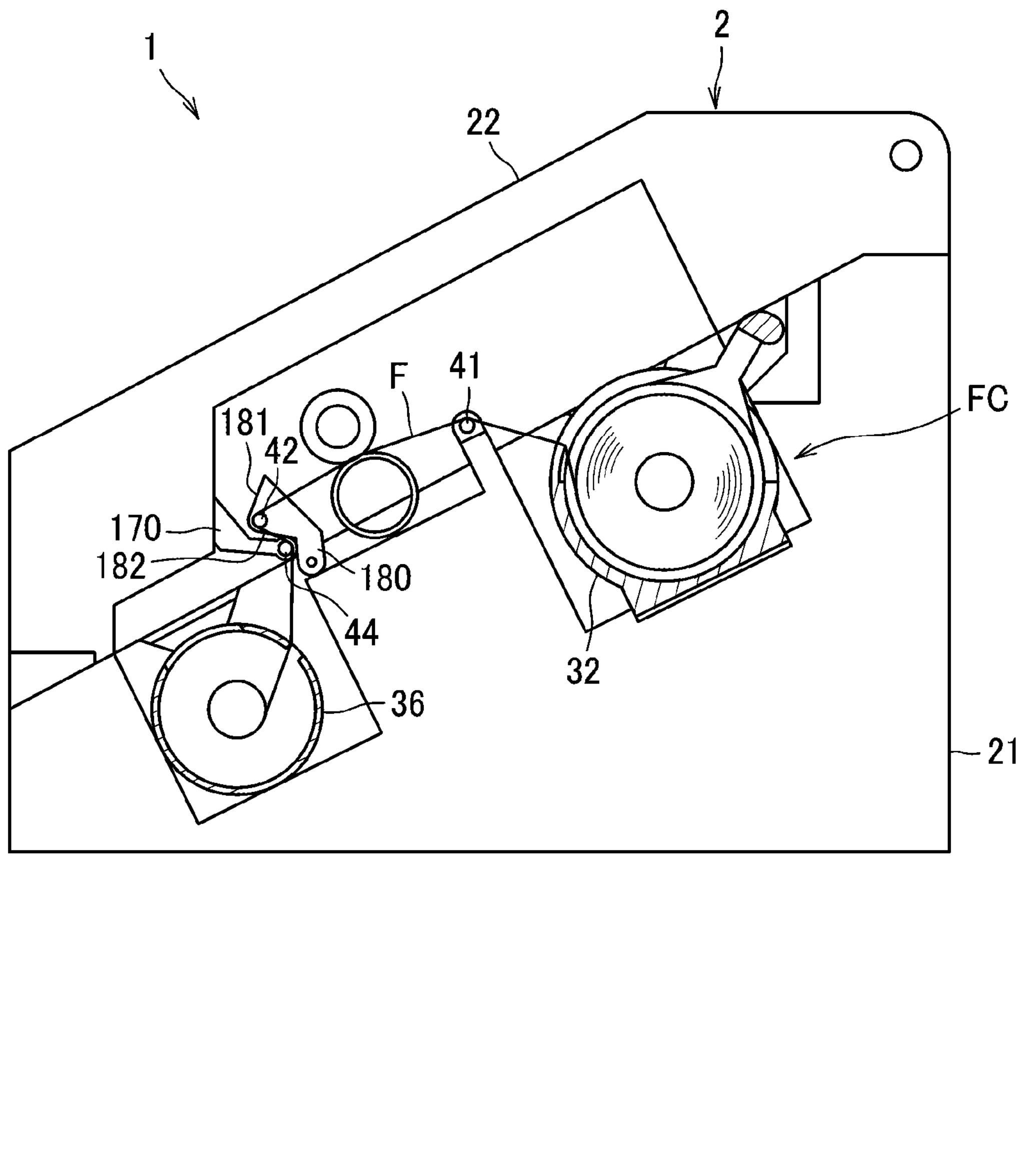
FIG. 37 is a view showing the cover in a closed state.

Since the third guide shaft 44 is immovably fixed to the cover 22, as the cover 22 moves from the close position to the open position, the third shaft 44 moves, relative to the housing main body 21, from the sixth position shown in FIG. 36 (*a*) and FIG. 36(*b*) which is an out-of-use position to the fifth position shown in FIG. 37 which is an in-use position. Further, the third guide shaft 44 moves from the fifth position to the sixth position relative to the housing main body 21.

As shown in FIG. 35, the second support members 180 are members that support the second guide shaft 42. The second support members 180 are positioned at one axial end and another axial end of the second guide shaft 42; the second support member 180 positioned at the one axial end supports the one axial end of the second guide shaft 42, and the second support member 180 positioned at the another axial end supports the another axial end of the second guide shaft 42.

The second support members 180 are supported by the housing main body 21 rotatably about a rotation axis 180A parallel to the axial direction. Thus, the second support members 180 support the second guide shaft 42 in such a manner that the second guide shaft 42 is movable, specifically rotatable, relative to the housing main body 21, between a seventh position shown by solid lines and an eighth position shown by imaginary lines.

The seventh springs 190 are springs that bias the second guide shaft 42 from the eighth position toward the seventh position. Specifically, the seventh springs 190 are respectively positioned at one axial end and another axial end of the second guide shaft 42, to bias the second support members 180 in the counterclockwise direction of the drawings. As one example, the seventh springs 190 are helical torsion springs.

It is to be understood that, although not shown in the drawings, the housing main body 21 is provided with a restriction portion which restricts further rotation of the second support members 180 and restricts the position of the second guide shaft 42 to the seventh position, when the second support members 180 biased in the counterclockwise direction of the drawings contact the restriction portion.

The second guide shaft 42 in the seventh position shown by solid lines overlaps the third guide shaft 44 in the fifth position when projected in the installation/removal direction. Accordingly, the peeling angle of the multilayer film F may be set at an appropriate angle by the third guide shaft 44. Further, the second guide shaft 42 in the eighth position shown by imaginary lines does not overlap the third guide shaft 44 in the fifth position when projected in the installation/removal direction. Accordingly, the cover 22 can be opened or closed without interference of the third guide shaft 44 with the second guide shaft 42.

The second support members 180 each have a first pressed surface 181 and a second pressed surface 182.

The first pressed surface 181 is a surface that is contacted by the third support member 170 provided at the cover 22 in the process of the cover 22 moving from an open position to a close position. The first pressed surface 181 is inclined in such a manner that it is positioned gradually farther from the first guide shaft 41 and the transfer unit 50, from an upstream side toward a downstream side (approximately from the top to the bottom in the drawings) in a direction that the layer transfer film cartridge FC is installed into the housing main body 21.

Accordingly, the first pressed surfaces 181 are pressed by the third support members 170 fixed to the cover 22 moving from the open position toward the close position, and thus causes the second guide shaft 42 to move from the seventh position to the eighth position against the biasing forces of the seventh springs 190. In other words, the first pressed surfaces 181 are pressed by the cover 22 moving from the open position toward the close position, via the third support members 170, and thus causes the second guide shaft 42 to move from the seventh position to the eighth position against the biasing forces of the seventh springs 190.

The second pressed surface 182 is a surface that is contacted by the third support member 170 in the process of the cover 22 moving from a close position to an open position. The second pressed surface 182 is inclined in such a manner that it is positioned gradually farther from the first guide shaft 41 and the transfer unit 50, from a downstream side toward an upstream side (approximately from the bottom to the top in the drawings) in the direction that the layer transfer film cartridge FC is installed into the housing main body 21. Accordingly, the second pressed surface 182 is pressed by the third support member 170 moving from the close position toward the open position, and thus causes the second guide shaft 42 to move from the seventh position to the eighth position against the biasing force of the seventh spring 190.

When the third support members 170 stop pressing the second support members 180, the second support members 180 allow the second guide shaft 42 to move from the eighth position to the seventh position by the biasing forces of the seventh springs 190. In other words, the second support members 180 no longer pressed by the cover 22 via the third support members 170 allows the second guide shaft 42 to move from the eighth position to the seventh position by the biasing forces of the seventh springs 190.

Next, the operation and advantageous effects of the layer transfer device 1 the present embodiment will be explained.

As shown in FIG. 36(*a*), after the layer transfer film cartridge FC is installed in the housing main body 21, as the cover 22 is being closed from the open position, the tip portions of the third support members 170 contact the first pressed surfaces 181 of the second support members 180.

As the cover 22 is being closed, as shown in FIG. 36(*b*), the first pressed surfaces 181 are pressed by the third support members 170, whereby the second support members 180 rotate in the clockwise direction of the drawings, and thus the second guide shaft 42 moves from the seventh position to the eighth position against the biasing forces of the seventh springs 190 (see FIG. 35). As a result, since the second guide shaft 42 moves out of the way of the third guide shaft 44, the third guide shaft 44 and the second guide shaft 42 will no longer interfere with each other.

After that, as the cover 22 is being closed, at the point where the tip portions of the third support members 170 move out of contact with the first pressed surfaces 181, the second support members 180 rotate in the counterclockwise direction of the drawings by the biasing forces of the seventh springs 190, and the second guide shaft 42 thereby moves from the eighth position to the seventh position. When the cover 22 reaches the close position and the third guide shaft 44 reaches the fifth position, as shown in FIG. 37, the second guide shaft 42 reaches the seventh position and the peeling angle of the multilayer film F is set at an appropriate angle.

As the cover 22 is being opened from the close position, the tip portions of the third support members 170 contact the second pressed surfaces 182 of the second support members 180. As the cover is further opened, as shown in FIG. 36(*b*), the second pressed surfaces 182 are pressed by the third support members 170 whereby the second support members 180 rotate in the clockwise direction of the drawings; as a result, the second guide shaft 42 moves from the seventh position to the eighth position against the biasing forces of the seventh springs 190. Accordingly, the third guide shaft 44 and the second guide shaft 42 will no longer interfere with each other.

After this, as the cover 22 is further opened, at the point where the tip portions of the third support members 170 move out of contact with the second pressed surfaces 182, the second support members 180 rotate in the counterclockwise direction of the drawings by the biasing forces of the seventh springs 190; as a result, as shown in FIG. 36(*a*), the second guide shaft 42 moves from the eighth position toward the seventh position. When the cover 22 reaches the open position, the layer transfer film cartridge FC becomes installable and removable.

According to the present embodiment described above, since the housing 2 includes the guide shafts 41, 42, 44, similar to that of the fourth embodiment, the layer transfer film cartridge FC can be configured to have a simple structure.

Since the third guide shaft 44 is fixed to the cover 22 and moves from the sixth position to the fifth position as the cover 22 moves from the open position to the close position, the structure for supporting the third guide shaft 44 on the cover 22 can be configured to have a simple structure.

Since the second guide shaft 42 is supported by the housing main body 21 movably between the seventh position and the eighth position in a configuration in which the third guide shaft 44 is fixed to the cover 22, the third guide shaft 44 does not interfere with the second guide shaft 42 by movement of the second guide shaft 42 to the eighth position, when the cover 22 is being opened or closed. Accordingly, since the cover itself does not have to move, for example, in such a manner as to move the third guide shaft out of the way of the second guide shaft, the structure for supporting the cover 22 on the housing main body 21 can be configured to have a simple structure, and the cover 22 can be smoothly opened and closed.

Since the third support members 170 move the second guide shaft 42 from the seventh position to the eighth position against the biasing forces of the seventh springs 190, when the cover 22 is opened or closed, and then move the second guide shaft 42 from the eighth position to the seventh position by the biasing forces of the seventh springs 190, it is not necessary to perform a procedure when opening or closing the cover such as, for example, moving the second guide shaft to the eighth position in advance, and moving the second guide shaft to the seventh position after closing the cover. As a result, the time it takes until the layer transfer device 1 is ready to be used can be made shorter. Further, compared to a configuration in which the second guide shaft is manually moved between the seventh position and the eighth position, the operability of layer transfer device 1 can be improved.

It is to be understood that although the second support members 180 are configured to be pressed by the cover 22 by being pressed by the third support members 170 fixed to the cover 22 in the present embodiment, the second support members may be configured to be pressed by the cover, for example, by being pressed by the third guide shaft fixed to the cover via the third support members.

Next, a seventh embodiment will be explained.

Figure 38:
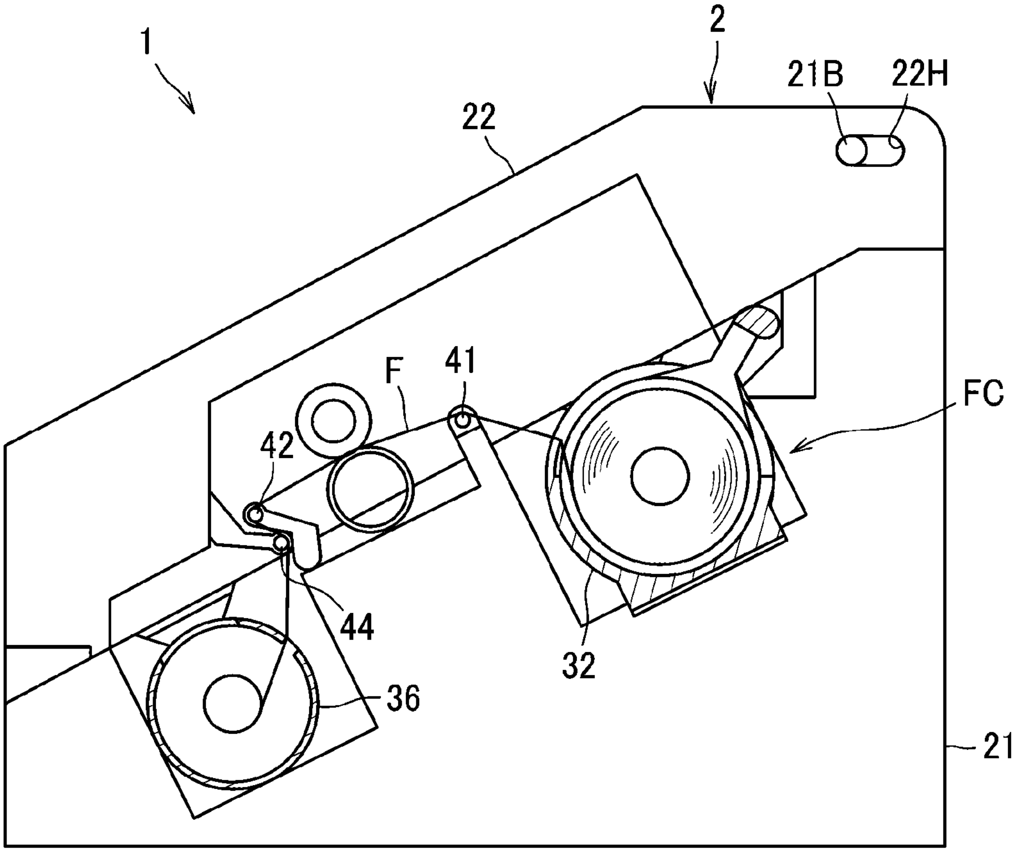
FIG. 38 is a view of a layer transfer device according to a seventh embodiment.

As shown in FIG. 38, in the present embodiment, the second guide shaft 42 is fixedly provided at the housing main body 21, and the third guide shaft 44 is fixedly provided at the cover 22. In the present embodiment, the cover 22 is supported by the housing main body 21 in such a manner that the cover 22 itself moves when closed or opened in such a manner that the third guide shaft 44 moves out of the way of the second guide shaft 42.

More specifically, the housing main body 21 includes a rotation shaft 21B which supports the cover 22 in a manner that permits the cover 22 to rotate, and the cover 22 has engagement holes 22H with which the rotation shaft 21B is engaged. The engagement holes 22H are long holes elongate in a direction perpendicular to the axial direction, specifically, in the front-to-back direction when the cover 22 is in the close position. In this way, the cover 22 is supported by the housing main body 21 rotatably between the close position and the open position, and movably along the longitudinal direction of the engagement holes 22H. When the cover 22 is in the close position, the rotation shaft 21B is shifted to the front of the engagement hole 22H.

Figure 39:
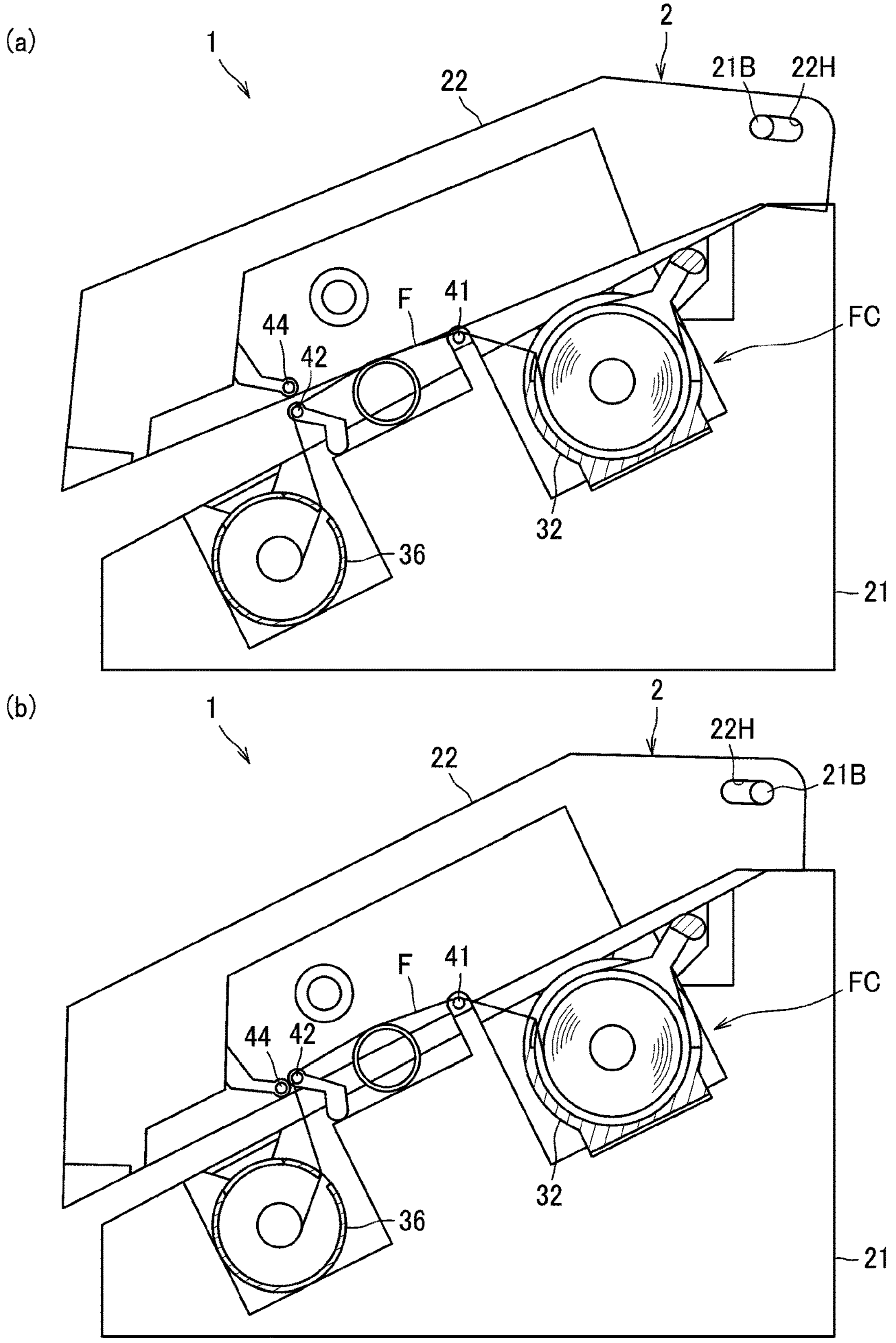
FIG. 39 includes views (a), (b) of motions of a third guide shaft in conjunction with an action of closing a cover.

In such a configuration, as shown in FIG. 39(*a*) and FIG. 39(*b*), when the cover 22 is moved from the open position to the close position, the cover 22 can be rotated in the counterclockwise direction of the drawings while moving the cover 22 forward, with respect to the housing main body 21, thus the third guide shaft 44 may be moved past the front side of the second guide shaft 42 to the fifth position shown in FIG. 38. Accordingly, the cover 52 can be closed without interference of the third guide shaft 44 with the second guide shaft 42.

Further, also when the cover 22 is moved from the close position to the open position, the cover 22 can be rotated in the clockwise direction of the drawings while moving the cover 22 forward, with respect to the housing main body 21, thus the third guide shaft 44 may be moved past the front side of the second guide shaft 42; thereby, the cover 22 can be opened without interference of the third guide shaft 44 with the second guide shaft 42.

Next, the eighth embodiment will be explained.

Figure 40:
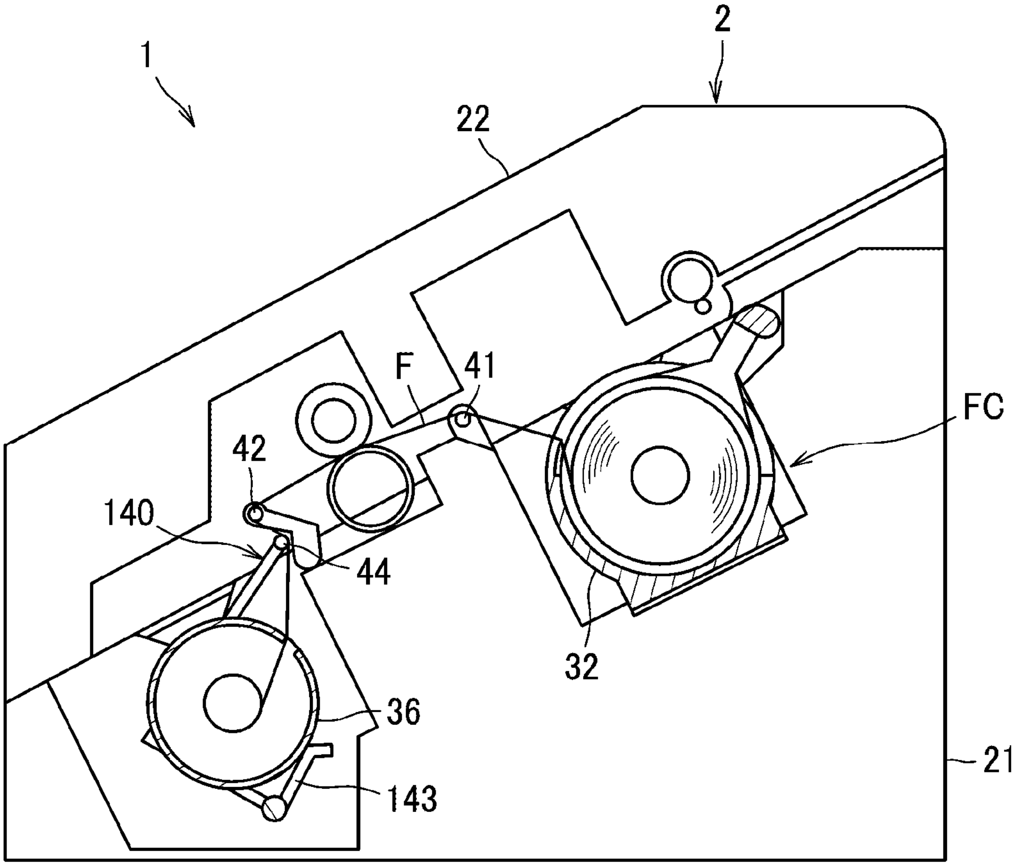
FIG. 40 is a view of a layer transfer device according to an eighth embodiment.
Figure 41:
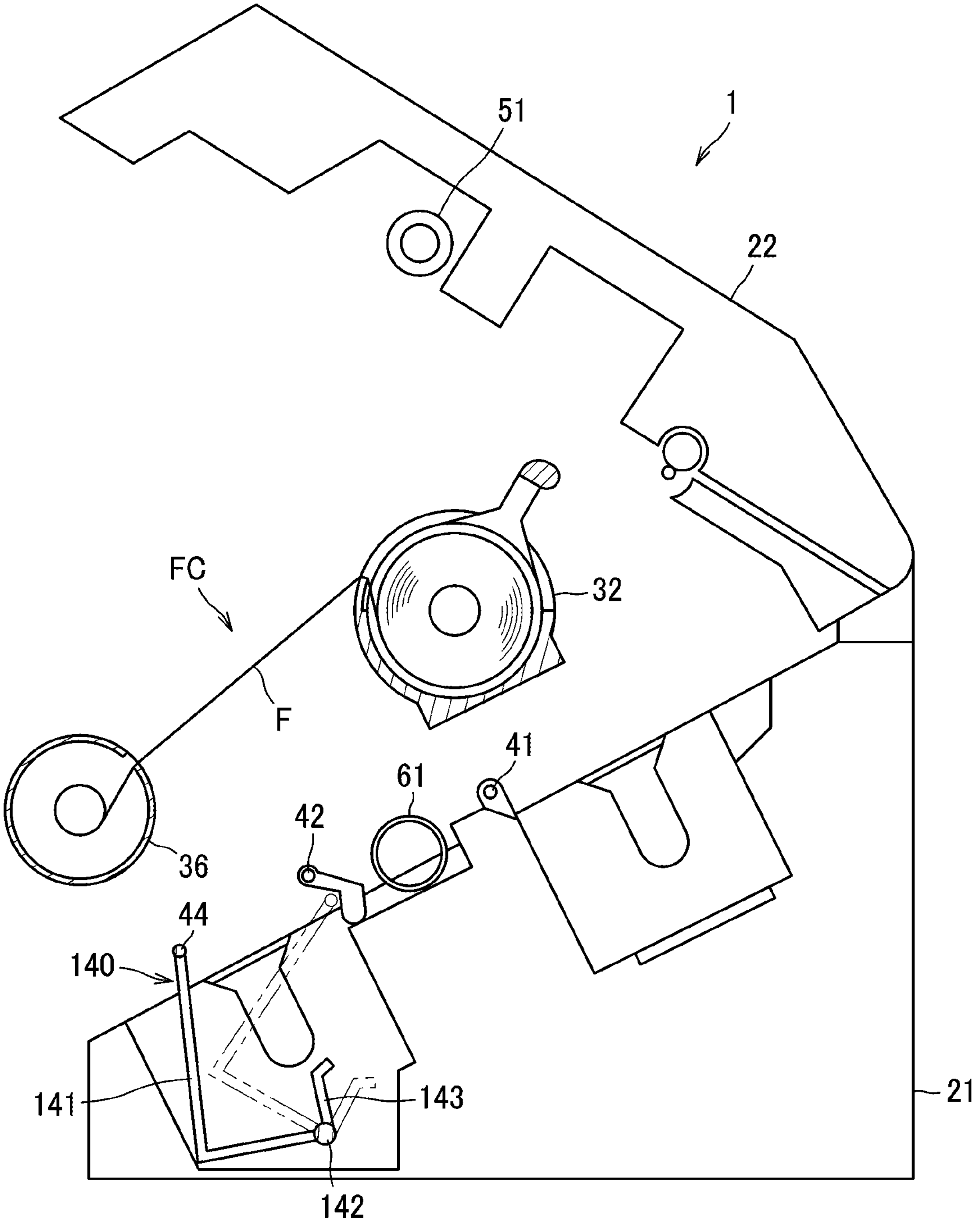
FIG. 41 is a view showing a state in which the cover is open.

Although the third guide shaft 44 is supported by the cover 22 in the fourth embodiment, the third guide shaft 44 in the present embodiment, as shown in FIG. 40 and FIG. 41, is supported by the housing main body 21, similar to the first guide shaft 41 and the second guide shaft 42.

Figure 42:
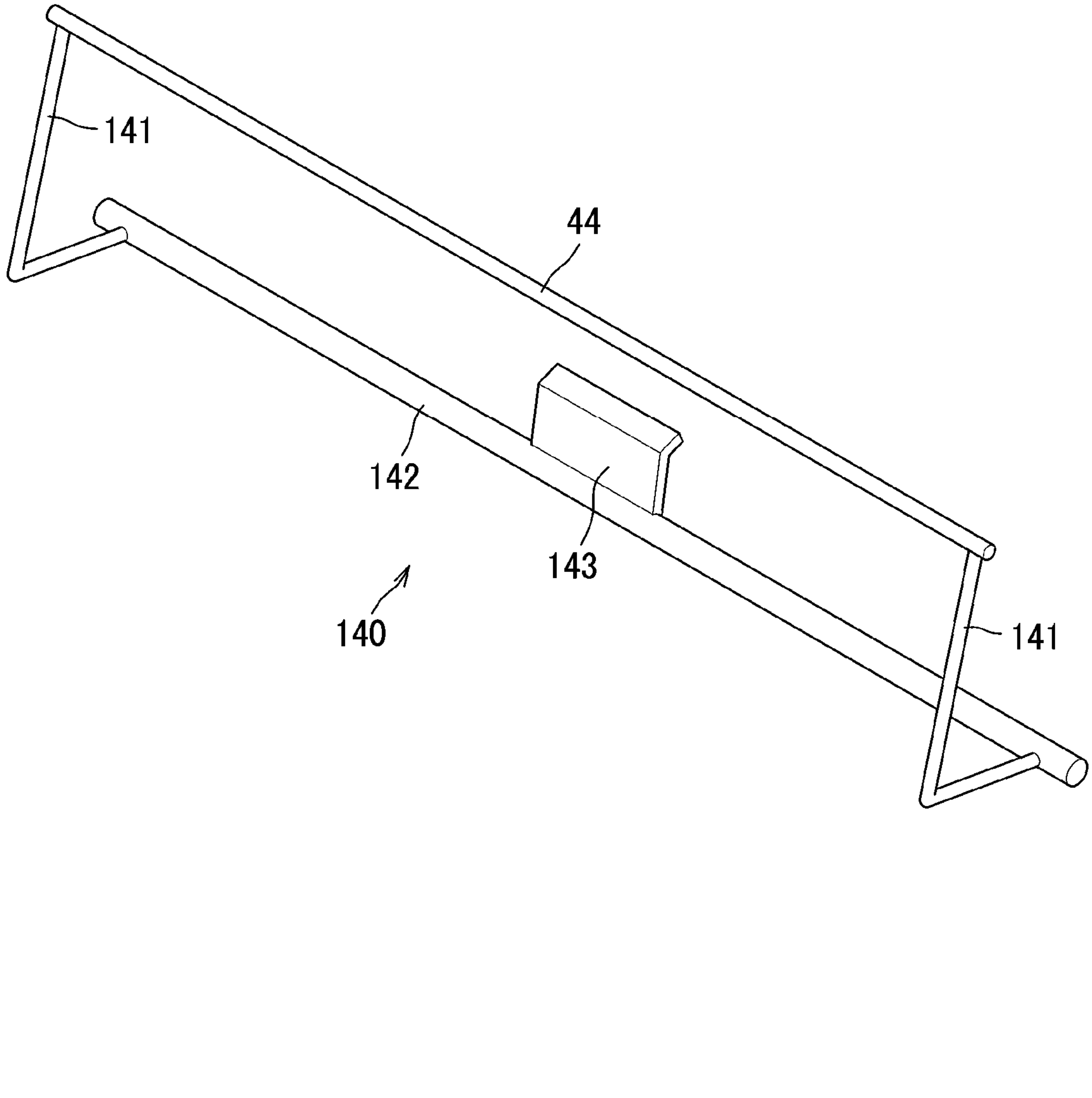
FIG. 42 is a perspective view of a third guide shaft and a fourth supporting member.

As shown in FIG. 41 and FIG. 42, the housing main body 21 comprises a fourth support member 140 that supports the third guide shaft 44. The fourth support member 140 includes a pair of support portions 141 that support the third guide shaft 44, a shaft 142, and a pressed portion 143.

The support portions 141 are positioned at one axial end and another axial end of the third guide shaft 44; the support portion 141 positioned at the one axial end supports the one axial end of the third guide shaft 44, and the support portion 141 positioned at the another axial end supports the another axial end of the third guide shaft 44.

The shaft 142 is configured to connect the pair of support portions 141 and extends along the axial direction parallel to the third guide shaft 44. The shaft 142 is rotatably supported by the housing main body 21. In this way, the third guide shaft 44 is movable, specifically, rotatable, with respect to the housing main body 21, between the fifth position shown in FIG. 40 in which a traveling direction of the multilayer film F is changed and the sixth position shown in FIG. 41 different from the fifth position.

The pressed portion 143 protrudes from an outer peripheral surface of the shaft 142 in a direction non-parallel to the axial direction, more specifically, a direction perpendicular to the axial direction. The fourth support member 140 is supported rotatably between a position shown by solid lines and a position shown by imaginary lines in FIG. 41; thereby the third guide shaft 44 moves between the sixth position and the fifth position. In this embodiment, only one pressed portion 143 is located near a center portion of the shaft 142 in the axial direction (see FIG. 42). The pressed portion 143 may also be configured such that two or more pressed portions 43 are provided and aligned in the axial direction.

As the take-up case 36 of the layer transfer film cartridge FC is being installed into the housing main body 21 through between the second guide shaft 42 and the third guide shaft 44, the take-up case 36 contacts and presses the pressed portion 143 of the fourth support member 140, causes the fourth support member 140 to rotate in the clockwise direction of the drawings, and moves the third guide shaft 44 from the sixth position toward the fifth position. When the take-up case 36 has been installed in the housing main body 21, as shown in FIG. 40, the third guide shaft 44 reaches the fifth position.

The fourth support member 140 may be configured to be manually rotated from the position shown in FIG. 40 to the position shown in FIG. 41 or may be configured to rotate from the position shown in FIG. 40 to the position shown in FIG. 41 by a spring, after the take-up case 36 is removed from the housing main body 21.

According to the present embodiment described above, since the housing 2 comprises the guide shafts 41, 42, 44 similar to those of the fourth embodiment, the layer transfer film cartridge FC may be configured to have a simple structure.

Since the third guide shaft 44 is supported by the housing main body 21, it is not necessary to provide the third guide shaft or a supporting structure for the third guide shaft on the cover 22, thus the weight of the cover 22 can be reduced. As a result, the opening and closing procedure of the cover 22 may be performed easily.

Although, the present embodiment is configured in such a manner that installation of the layer transfer film cartridge FC into the housing main body 21 causes the fourth support member 140 to rotate and the third guide shaft 44 to move from the sixth position to the fifth position, the fourth support member may, for example, be rotated by a driving source such as a motor or the like to move the third guide shaft between the fifth position and the sixth position independently of the installation of the layer transfer film cartridge.

Although the fourth to eighth embodiments have be described above, these embodiments may be modified and implemented as appropriate, as exemplified below Although a helical torsion spring is given as an example of the sixth spring 85 in the fourth embodiment, the sixth spring may be a spring other than a helical torsion spring, for example, it may be a helical extension spring or a leaf spring, etc. The same can be said regarding the seventh springs.

Although the third guide shaft 44 is configured such that both ends are supported by the arms 76, 77 (the first support member 75) in the fourth embodiment, the third guide shaft may be configured such that only one end is supported by the first support member.

Although the housing 2 comprises the housing main body 21 and the cover 22 in the fourth embodiment, in a configuration in which the third guide shaft is supported by the housing main body, for example, the housing may be configured such that it does not comprise a cover.

Although the third guide shaft 44 is movable, with respect to the housing main body 21, between the fifth position and the sixth position in the fourth embodiment, the third guide shaft may, for example, be immovably fixed to the housing main body.

The configuration of the layer transfer film cartridge FC described in the fourth embodiment is one example. The layer transfer film cartridge FC may, for example, be configured such that the supply unit 310 and the take-up unit 350 are connected by a connecting member. Further, the layer transfer film cartridge FC may be configured such that the handle is located at the take-up unit 350 but not at the supply unit 310, or located at both of the supply unit 310 and the take-up unit 350.

Although the layer transfer device 1 is configured to comprise three guide shafts, i.e., the first guide shaft 41, the second guide shaft 42 and the third guide shaft 44 in the fourth embodiment, the layer transfer device may be configured to comprise four or more guide shafts.

Although the layer transfer device 1 is a device separate from an image forming device such as a laser printer or the like in the fourth embodiment, the layer transfer device may be formed integrally with an image forming device. Although the layer transfer device 1 for transferring a transfer layer F22 onto a toner image formed on a sheet S is given as an example of a layer transfer device in the fourth embodiment, the layer transfer device may, for example, be a device for transferring a transfer layer onto an ink image formed on a sheet, or a device for transferring a transfer layer onto a sheet by a thermal head.

Although the transfer layer F22 containing foil is given as an example in the fourth embodiment, the transfer layer may, for example, not contain foil or colorant and may be formed of a thermoplastic resin. Further, although the multilayer film F is formed of four layers in the fourth embodiment, the multilayer film may have any number of layers as long as it includes a transfer layer and a supporting layer.

The elements described in the above embodiments and modifications may be implemented selectively and in combination.

The invention claimed is:

1. A foil transfer film cartridge comprising:
- a supply reel on which a foil film including a transfer layer containing foil is wound;
- a take-up reel on which to take up the foil film;
- a first connecting portion extending in a direction perpendicular to a first axial direction along a rotation axis of the supply reel, and connecting the supply reel and the take-up reel at a position apart from the foil film; and
- a film guide member extending in a second axial direction along a rotation axis of the take-up reel, the film guide member being capable of assuming an out-of-contact state and an in-contact state with the foil film extended between the supply reel and the take-up reel.

2. The foil transfer film cartridge according to claim 1, wherein the film guide member is movable between a first position and a second position closer, than the first position, to the supply reel.

3. The foil transfer film cartridge according to claim 2, wherein the film guide member is movable relative to the first connecting portion.

4. The foil transfer film cartridge according to claim 3, comprising a support member that supports the film guide member,
- wherein the support member is rotatably connected to the take-up reel.

5. The foil transfer film cartridge according to claim 4, wherein the film guide member is a shaft,
- wherein the foil transfer film cartridge comprises a take-up case which houses the take-up reel,
- wherein the support member comprises a first side plate that supports one axial end of the shaft, and a second side plate that supports another axial end of the shaft, and
- wherein the first side plate and the second side plate are connected to the take-up reel in such a manner that the first side plate and the second side plate are positioned on opposite sides of the take-up case in the second axial direction.

6. The foil transfer film cartridge according to claim 5, comprising:
- a supply case which houses the supply reel; and
- a second connecting portion extending in a direction perpendicular to the first axial direction, the second connecting portion connecting the supply reel and the take-up reel at a position apart from the foil film,
- wherein the first connecting portion and the second connecting portion are each formed in a shape of a plate,
- wherein the supply case and the take-up case are located between the first connecting portion and the second connecting portion in the first axial direction,
- wherein the first side plate is connected to the take-up reel at a position between the first connecting portion and the take-up case, and
- wherein the second side plate is connected to the take-up reel at a position between the second connecting portion and the take-up case.

7. The foil transfer film cartridge according to claim 4, comprising a take-up case which houses the take-up reel,
- wherein the take-up case is rotatably supported by the take-up reel, and
- wherein the support member is fixed to the take-up case and is thereby rotatably connected to the take-up reel.

8. The foil transfer film cartridge according to claim 7, wherein the film guide member is a shaft, and
- wherein the take-up case comprises a first side plate that is provided at one end of the take-up case in the second axial direction, protrudes therefrom and supports one axial end of the shaft, and a second side plate that is provided at another end of the take-up case in the second axial direction, protrudes therefrom and supports another axial end of the shaft.

9. The foil transfer film cartridge according to claim 3, comprising a support member that supports the film guide member,
- wherein the support member is movable in an inter-axial direction along a straight line connecting the rotation axis of the supply reel and the rotation axis of the take-up reel.

10. The foil transfer film cartridge according to claim 9, comprising a take-up case which houses the take-up reel,
- wherein the take-up case is supported by the first connecting portion movably in the inter-axial direction, and
- wherein the support member is fixed to the take-up case.

11. The foil transfer film cartridge according to claim 10, wherein the take-up case comprises a guided portion protruding from one end of the take-up case in the second axial direction, the guided portion having a first flat surface extending along the second axial direction and the inter-axial direction, and wherein the first connecting portion has a guide hole by which the guided portion is supported movably in the inter-axial direction, the guide hole including a second flat surface in contact with the first flat surface.

12. The foil transfer film cartridge according to claim 3, wherein a dimension of the film guide member in the second axial direction is greater than a dimension of the foil film in the second axial direction.

13. The foil transfer film cartridge according to claim 2, wherein the film guide member is movable in an inter-axial direction along a straight line connecting the rotation axis of the supply reel and the rotation axis of the take-up reel.

14. The foil transfer film cartridge according to claim 13, wherein the first connecting portion connects one axial end of the supply reel and one axial end of the take-up reel, and is movable in the inter-axial direction relative to the take-up reel.

15. The foil transfer film cartridge according to claim 14, comprising a take-up case which houses the take-up reel, wherein the first connecting portion supports the take-up case in such a manner that allows the take-up case to move in the inter-axial direction, and wherein the film guide member is provided at the take-up case.

16. The foil transfer film cartridge according to claim 15 wherein the film guide member is a shaft, wherein the foil transfer film cartridge comprises a support member that supports the shaft at a position apart from the take-up case, and wherein the support member is fixed to the take-up case.

17. The foil transfer film cartridge according to claim 14, wherein the film guide member is provided at the first connecting portion.

18. The foil transfer film cartridge according to claim 14, further comprising a first spring that biases the film guide member in a direction away from the supply reel.

19. The foil transfer film cartridge according to claim 14, further comprising a second connecting portion that connects another axial end of the supply reel and another axial end of the take-up reel.

20. The foil transfer film cartridge according to claim 13, wherein a dimension of the film guide member in an axial direction of the take-up reel is greater than a width of the foil film in the axial direction of the take-up reel.

21. A foil transfer device for transferring foil onto a sheet, comprising:

a housing including a housing main body having an opening; and the foil transfer film cartridge according to claim 2 installable into and removable from the housing main body through the opening;

wherein the housing comprises a pressing member that presses the film guide member from the first position toward the second position.

22. The foil transfer device according to claim 21, wherein the foil transfer film cartridge is installable into and removable from the housing main body in an installation/removal direction perpendicular to the axial direction.

23. The foil transfer device according to claim 22, wherein the housing main body comprises a guide shaft that changes a traveling direction of the foil film, wherein the film guide member contacts a surface formed by a supported layer including the transfer layer of the foil film bent at the guide shaft.

24. The foil transfer device according to claim 22, wherein the housing further comprises a cover to open and close the opening, wherein the pressing member presses the film guide member from the first position toward the second position when the cover is being closed.

25. The foil transfer device according to claim 21, wherein the housing main body comprises a driving mechanism configured to actuate the pressing member.

26. The foil transfer device according to claim 21, wherein the foil transfer film cartridge further comprises a rotatable support member that supports the film guide member, and wherein the pressing member presses the film guide member via the support member.

27. The foil transfer device according to claim 21, further comprising a fourth spring that biases the film guide member from the second position toward the first position.

28. A foil transfer device for transferring foil onto a sheet, comprising:

a housing main body having an opening; and the foil transfer film cartridge according to claim 1 installable into and removable from the housing main body through the opening;

wherein the housing main body comprises a guide shaft that guides the foil film and is movable between a third position and a fourth position farther, than the third position, from a portion of the foil transfer film cartridge, in a state in which the foil transfer film cartridge is installed in the housing main body.

29. The foil transfer device according to claim 28, wherein the guide shaft positioned in the third position overlaps a portion of the foil transfer film cartridge when projected in a direction perpendicular to an axial direction along the guide shaft, and wherein the guide shaft positioned in the fourth position does not overlap a portion of the foil transfer film cartridge when projected in the direction perpendicular to the axial direction along the guide shaft.

30. The foil transfer device according to claim 29, wherein the housing main body further comprises a holding member that holds the guide shaft, and wherein the holding member is rotatably supported by the housing main body.

31. The foil transfer device according to claim 30, further comprising a cover to open and close the opening, wherein the guide shaft moves from the fourth position to the third position when the cover is closed.

32. The foil transfer device according to claim 31, wherein, in a process of the cover being closed, the cover presses the holding member, causing the guide shaft to move from the fourth position to the third position.

33. The foil transfer device according to claim 28, wherein the housing main body comprises:

a first guide shaft that contacts the foil film and changes a traveling direction of the foil film; and a second guide shaft that contacts the foil film guided by the first guide shaft and changes a traveling direction of the foil film;

wherein the foil transfer film cartridge comprises a film guide member that contacts the foil film guided by the second guide shaft and changes a traveling direction of the foil film, wherein the guide shaft is the second guide shaft, and wherein the portion of the foil transfer film cartridge is the film guide member.

34. A layer transfer device for transferring a transfer layer onto a sheet, comprising:

a housing including a housing main body; and a layer transfer film cartridge installable into and removable from the housing main body and comprising a multilayer film including the transfer layer and a supporting layer that supports the transfer layer;

wherein the housing main body comprises:

a first guide shaft that contacts the multilayer film and changes a traveling direction of the multilayer film; and a second guide shaft that contacts the multilayer film guided by the first guide shaft and changes a traveling direction of the multilayer film; and wherein the housing comprises a third guide shaft that contacts the multilayer film guided by the second shaft and changes a traveling direction of the multilayer film.

35. The layer transfer device according to claim 34, wherein the third guide shaft is movable between a fifth position in which the third guide shaft contacts the multilayer film guided by the second guide shaft and changes a traveling direction of the multilayer film and a sixth position different from the fifth position.

36. The layer transfer device according to claim 35, wherein the housing main body has an opening through which the layer transfer film cartridge passes when the layer transfer film cartridge is installed into or removed from the housing main body, wherein the housing comprises a housing cover supported by the housing main body in such a manner that the housing cover is movable between an open position in which the opening is uncovered and a close position in which the opening is covered, and wherein the third guide shaft is supported by the housing cover.

37. The layer transfer device according to claim 36, comprising a first support member supported by the housing cover and supporting the third guide shaft, wherein the first support member supports the third guide shaft at a position outward, in an axial direction of the third guide shaft, of a position of a sheet with a maximum width in the axial direction among sheets conveyable in the housing, and supports the third guide shaft at a position apart from the housing cover.

38. The layer transfer device according to claim 36, wherein the second guide shaft is fixed to the housing main body, wherein the third guide shaft:

is supported by the housing cover movably between a fifth position and a sixth position;

overlaps the second guide shaft when the third guide shaft is located in the fifth position and projected in an installation/removal direction of the layer transfer film cartridge into or from the housing main body; and does not overlap the second guide shaft when the third guide shaft is located in the sixth position and projected in the installation/removal direction.

39. The layer transfer device according to claim 36, wherein the third guide shaft is fixed to the housing cover and moves from the sixth position to the fifth position in accordance with the movement of the housing cover from the open position to the close position.

40. The layer transfer device according to claim 34, wherein the third guide shaft is supported by the housing main body.

* * * * *